(12) United States Patent  
Egi et al.

(10) Patent No.: US 7,864,268 B2  
(45) Date of Patent: Jan. 4, 2011

(54) DISPLAY DEVICE WITH STACK OF POLARIZERS HAVING WAVELENGTH DISTRIBUTIONS OF EXTINCTION COEFFICIENT OF ABSORPTION AXES

(75) Inventors: Yuji Egi, Kanagawa (JP); Tetsuji Ishitani, Kanagawa (JP); Takeshi Nishi, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 269 days.

(21) Appl. No.: 11/677,252

(22) Filed: Feb. 21, 2007

(65) Prior Publication Data

US 2007/0200977 A1    Aug. 30, 2007

(30) Foreign Application Priority Data

Feb. 24, 2006   (JP)   ............... 2006-048063

(51) Int. Cl.  
*G02F 1/13* (2006.01)  
*G02F 1/1335* (2006.01)  
(52) U.S. Cl. ............... 349/96; 349/104; 349/105; 349/117; 349/119; 349/194
(58) Field of Classification Search ........... 349/96, 349/104, 105, 117–119, 194  
See application file for complete search history.

(56) References Cited

U.S. PATENT DOCUMENTS

| | | | |
|---|---|---|---|
| 4,592,623 A * | 6/1986 | Yamamoto et al. | ........ 359/491 |
| 4,769,242 A | 9/1988 | Shibanai | |
| 4,769,292 A | 9/1988 | Tang et al. | |
| 4,968,120 A | 11/1990 | Depp et al. | |
| 5,050,965 A | 9/1991 | Conner et al. | |
| 5,142,393 A | 8/1992 | Okumura et al. | |
| 5,237,438 A | 8/1993 | Miyashita et al. | |
| 5,283,132 A | 2/1994 | Ogura et al. | |
| 5,305,143 A | 4/1994 | Taga et al. | |
| 5,396,406 A | 3/1995 | Ketchpel | |
| 5,583,677 A | 12/1996 | Ito et al. | |

(Continued)

FOREIGN PATENT DOCUMENTS

EP    0 365 778 A    5/1990

(Continued)

OTHER PUBLICATIONS

European Search Report (Application No. 07002954.1-2205) mailed May 15, 2007, 10 pages.

(Continued)

*Primary Examiner*—Hoan C Nguyen  
(74) *Attorney, Agent, or Firm*—Fish & Richardson P.C.

(57) ABSTRACT

An object of the invention is to provide a display device having a high contrast ratio. Another object of the invention is to manufacture such a high-performance display device at low cost. In a display device having a display element between a pair of light-transmissive substrates, polarizer-including layers, which have different wavelength distributions of extinction coefficients, are stacked so that absorption axes are in a parallel nicol state, over each light-transmissive substrate. Absorption axes of one of a pair of stacks of polarizers and the other together which interpose the display element are deviated from a cross nicol state. A retardation plate may be provided between the stack of polarizing plates and the substrate.

15 Claims, 41 Drawing Sheets

U.S. PATENT DOCUMENTS

| | | | |
|---|---|---|---|
| 5,831,375 A | 11/1998 | Benson | |
| 5,856,819 A | 1/1999 | Vossler | |
| 6,011,580 A | 1/2000 | Hattori et al. | |
| 6,023,317 A | 2/2000 | Xu et al. | |
| 6,097,147 A | 8/2000 | Baldo et al. | |
| 6,147,734 A * | 11/2000 | Kashima | 349/113 |
| 6,201,592 B1 | 3/2001 | Terashita et al. | |
| 6,291,255 B1 | 9/2001 | Huang et al. | |
| 6,356,029 B1 | 3/2002 | Hunter | |
| 6,445,005 B1 | 9/2002 | Yamazaki et al. | |
| 6,577,361 B1 | 6/2003 | Sekiguchi et al. | |
| 6,583,770 B1 | 6/2003 | Antila et al. | |
| 6,621,508 B1 | 9/2003 | Shiraishi et al. | |
| 6,646,698 B2 | 11/2003 | Mori | |
| 6,656,608 B1 | 12/2003 | Kita et al. | |
| 6,657,260 B2 | 12/2003 | Yamazaki et al. | |
| 6,689,492 B1 | 2/2004 | Yamazaki et al. | |
| 6,706,339 B1 * | 3/2004 | Miyatake et al. | 428/1.31 |
| 6,762,436 B1 | 7/2004 | Huang et al. | |
| 6,765,721 B2 | 7/2004 | Kawazu et al. | |
| 6,774,877 B2 | 8/2004 | Nishitoba et al. | |
| 6,778,229 B2 | 8/2004 | Inoue et al. | |
| 6,784,457 B2 | 8/2004 | Yamazaki et al. | |
| 6,806,640 B2 | 10/2004 | Okada et al. | |
| 6,816,217 B2 | 11/2004 | Sone | |
| 6,830,828 B2 | 12/2004 | Thompson et al. | |
| 6,863,997 B2 | 3/2005 | Thompson et al. | |
| 6,869,695 B2 | 3/2005 | Thompson et al. | |
| 6,872,472 B2 | 3/2005 | Liao et al. | |
| 6,887,592 B2 | 5/2005 | Hieda et al. | |
| 6,893,743 B2 | 5/2005 | Sato et al. | |
| 6,894,312 B2 | 5/2005 | Yamazaki et al. | |
| 6,897,916 B2 | 5/2005 | Hamamoto | |
| 6,911,271 B1 | 6/2005 | Lamansky et al. | |
| 6,934,081 B2 | 8/2005 | Higashio et al. | |
| 6,939,624 B2 | 9/2005 | Lamansky et al. | |
| 6,942,931 B2 | 9/2005 | Lee | |
| 6,951,694 B2 | 10/2005 | Thompson et al. | |
| 6,970,144 B1 | 11/2005 | Swift et al. | |
| 6,970,218 B2 | 11/2005 | Fukuda et al. | |
| 6,985,291 B2 | 1/2006 | Watson et al. | |
| 6,995,816 B2 | 2/2006 | Mi et al. | |
| 6,998,772 B2 | 2/2006 | Terumoto | |
| 7,015,990 B2 | 3/2006 | Yeh et al. | |
| 7,034,451 B2 | 4/2006 | Senbonmatsu | |
| 7,057,682 B2 | 6/2006 | Watson et al. | |
| 7,059,718 B2 | 6/2006 | Masterson | |
| 7,060,370 B2 | 6/2006 | Kinoshita et al. | |
| 7,060,371 B2 | 6/2006 | Akiyama et al. | |
| 7,064,740 B2 | 6/2006 | Daly | |
| 7,126,659 B2 | 10/2006 | Fukuda et al. | |
| 7,139,053 B2 | 11/2006 | Yuuki et al. | |
| 7,144,608 B2 | 12/2006 | Paukshto et al. | |
| 7,148,502 B2 | 12/2006 | Yamazaki et al. | |
| 7,157,156 B2 | 1/2007 | Raychaudhuri et al. | |
| 7,161,185 B2 | 1/2007 | Yamazaki et al. | |
| 7,161,649 B2 | 1/2007 | Lee et al. | |
| 7,175,898 B2 | 2/2007 | Luhmann et al. | |
| 7,176,619 B2 | 2/2007 | Miyachi et al. | |
| 7,176,999 B2 | 2/2007 | Miyachi | |
| 7,211,823 B2 | 5/2007 | Tung et al. | |
| 7,218,365 B2 | 5/2007 | Chang et al. | |
| 7,265,383 B2 | 9/2007 | Yamazaki et al. | |
| 7,301,591 B2 | 11/2007 | Akiyama | |
| 7,307,679 B2 | 12/2007 | Toyooka et al. | |
| 7,315,338 B2 | 1/2008 | Yeh et al. | |
| 7,317,279 B2 | 1/2008 | Chen | |
| 7,324,180 B2 | 1/2008 | Kashima | |
| 7,327,335 B2 | 2/2008 | Yamazaki et al. | |
| 7,333,077 B2 | 2/2008 | Koyama et al. | |
| 7,339,316 B2 | 3/2008 | Adachi et al. | |
| 7,375,464 B2 | 5/2008 | Chin et al. | |
| 7,381,479 B2 | 6/2008 | Lamansky et al. | |
| 7,453,640 B2 | 11/2008 | Yeh et al. | |
| 7,468,769 B2 | 12/2008 | Nakagawa | |
| 2001/0048405 A1 | 12/2001 | Salley | |
| 2002/0025419 A1 | 2/2002 | Lee et al. | |
| 2002/0027416 A1 | 3/2002 | Kim et al. | |
| 2002/0093284 A1 | 7/2002 | Adachi et al. | |
| 2002/0113546 A1 | 8/2002 | Seo et al. | |
| 2002/0140343 A1 | 10/2002 | Hirabayashi | |
| 2002/0159003 A1 | 10/2002 | Sato et al. | |
| 2002/0186469 A1 | 12/2002 | Kawazu et al. | |
| 2003/0017361 A1 | 1/2003 | Thompson et al. | |
| 2003/0053011 A1 | 3/2003 | Mori | |
| 2003/0054199 A1 | 3/2003 | Oh | |
| 2003/0057419 A1 | 3/2003 | Murakami et al. | |
| 2003/0063456 A1 | 4/2003 | Katahira | |
| 2003/0103022 A1 | 6/2003 | Noguchi et al. | |
| 2003/0129452 A1 | 7/2003 | Tsuji et al. | |
| 2003/0147030 A1 | 8/2003 | Sone | |
| 2003/0210360 A1 | 11/2003 | Yoshida | |
| 2004/0105049 A1 | 6/2004 | Yeh et al. | |
| 2004/0141122 A1 | 7/2004 | Nakagawa | |
| 2004/0144974 A1 | 7/2004 | Lee et al. | |
| 2004/0146663 A1 | 7/2004 | Paukshto et al. | |
| 2004/0151829 A1 | 8/2004 | Boroson et al. | |
| 2004/0169461 A1 | 9/2004 | Moriyama et al. | |
| 2004/0169624 A1 | 9/2004 | Yamazaki et al. | |
| 2004/0183082 A1 | 9/2004 | Yamazaki | |
| 2004/0201341 A1 | 10/2004 | Miyachi et al. | |
| 2004/0202893 A1 | 10/2004 | Abe | |
| 2004/0227698 A1 | 11/2004 | Yamazaki et al. | |
| 2004/0233362 A1 | 11/2004 | Kashima | |
| 2004/0239658 A1 | 12/2004 | Koyama et al. | |
| 2004/0245529 A1 | 12/2004 | Yamazaki et al. | |
| 2004/0251823 A1 | 12/2004 | Park et al. | |
| 2004/0257497 A1 | 12/2004 | Paukshto et al. | |
| 2004/0262576 A1 | 12/2004 | Thompson et al. | |
| 2004/0263056 A1 | 12/2004 | Seo et al. | |
| 2004/0263066 A1 | 12/2004 | Abe et al. | |
| 2004/0263069 A1 | 12/2004 | Yamazaki et al. | |
| 2005/0012686 A1 | 1/2005 | Osame et al. | |
| 2005/0024339 A1 | 2/2005 | Yamazaki et al. | |
| 2005/0073627 A1 * | 4/2005 | Akiyama | 349/65 |
| 2005/0077817 A1 | 4/2005 | Yamazaki et al. | |
| 2005/0093438 A1 | 5/2005 | Chen | |
| 2005/0100660 A1 | 5/2005 | Ito et al. | |
| 2005/0123791 A1 | 6/2005 | Deaton et al. | |
| 2005/0127820 A1 | 6/2005 | Yamazaki et al. | |
| 2005/0140895 A1 | 6/2005 | Watson et al. | |
| 2005/0157225 A1 | 7/2005 | Toyooka et al. | |
| 2005/0157255 A1 | 7/2005 | Masterson | |
| 2005/0162092 A1 | 7/2005 | Yamazaki et al. | |
| 2005/0179835 A1 | 8/2005 | Lee et al. | |
| 2005/0202278 A1 | 9/2005 | Mishima et al. | |
| 2005/0253789 A1 | 11/2005 | Ikeda | |
| 2006/0007376 A1 | 1/2006 | Fukuda et al. | |
| 2006/0024526 A1 | 2/2006 | Thompson et al. | |
| 2006/0055847 A1 | 3/2006 | Yamazaki et al. | |
| 2006/0114375 A1 | 6/2006 | Yeh et al. | |
| 2006/0114376 A1 | 6/2006 | Yeh et al. | |
| 2006/0114384 A1 | 6/2006 | Yeh et al. | |
| 2006/0158096 A1 | 7/2006 | Adachi et al. | |
| 2006/0164571 A1 | 7/2006 | Broer et al. | |
| 2006/0215096 A1 | 9/2006 | Iwamoto et al. | |
| 2007/0014009 A1 * | 1/2007 | Cross et al. | 359/498 |
| 2007/0054066 A1 | 3/2007 | Usukura et al. | |
| 2007/0120475 A1 | 5/2007 | Ishitani et al. | |
| 2007/0121033 A1 | 5/2007 | Ishitani et al. | |
| 2007/0126962 A1 | 6/2007 | Egi et al. | |
| 2007/0146579 A1 | 6/2007 | Egi et al. | |
| 2007/0146580 A1 | 6/2007 | Ishitani et al. | |
| 2007/0159044 A1 | 7/2007 | Ishitani et al. | |

| | | | |
|---|---|---|---|
| 2007/0177071 A1 | 8/2007 | Egi et al. | |
| 2007/0177084 A1 | 8/2007 | Ishitani et al. | |
| 2007/0177086 A1 | 8/2007 | Ishitani et al. | |
| 2007/0182885 A1 | 8/2007 | Egi et al. | |
| 2007/0200977 A1 | 8/2007 | Egi et al. | |
| 2007/0200978 A1 | 8/2007 | Ishitani et al. | |
| 2007/0285777 A1 | 12/2007 | Toyoshima et al. | |
| 2009/0179549 A1 | 7/2009 | Abe et al. | |

FOREIGN PATENT DOCUMENTS

| | | |
|---|---|---|
| EP | 1 152 282 | 11/2001 |
| JP | 62-206524 A | 9/1987 |
| JP | 64-82014 | 3/1989 |
| JP | 64-082014 | 3/1989 |
| JP | 3-257429 | 11/1991 |
| JP | 05-034731 A | 2/1993 |
| JP | 05-100114 A | 4/1993 |
| JP | 06-222357 A | 8/1994 |
| JP | 7-142170 | 6/1995 |
| JP | 7-181476 | 7/1995 |
| JP | 2761453 | 6/1998 |
| JP | 10-255976 A | 9/1998 |
| JP | 2000-180843 A | 6/2000 |
| JP | 2000-249832 A | 9/2000 |
| JP | 3174367 | 6/2001 |
| JP | 2001-242320 | 9/2001 |
| JP | 2002-277867 A | 9/2002 |
| JP | 2003-172819 | 6/2003 |
| JP | 2003-172819 A | 6/2003 |
| JP | 2003-279963 A | 10/2003 |
| JP | 2004-354818 | 12/2004 |
| WO | WO 00/34821 | 6/2000 |
| WO | 2004/036272 | 4/2004 |
| WO | WO2005/050269 | 6/2005 |

OTHER PUBLICATIONS

Pavel Lazarev et al., "P-116: Thin Crystal Films (TCF) for LCD Contrast Enhancement", SID 03 DIGEST, pp. 669-671, 2003.

Chen.J et al., "21.2: Optimum Film Compensation Modes for TN and VA LCDS,", SID Digest '98 : SID International Symposium Digest of Technical Papers, 1998, pp. 315-318.

* cited by examiner

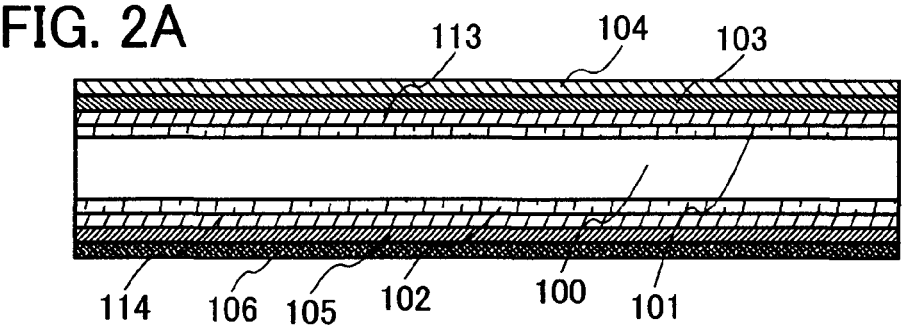
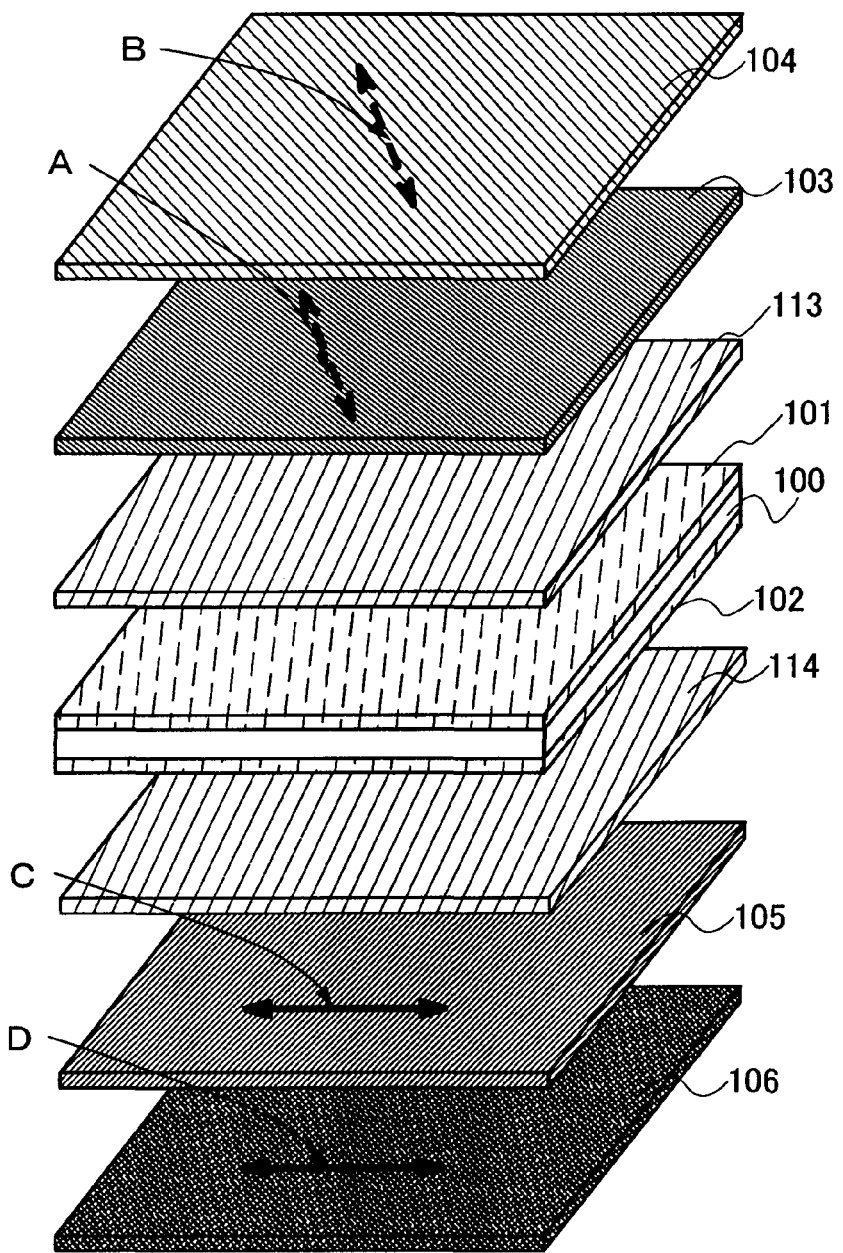

FIG. 10A1
FIG. 10A2
FIG. 10B1
FIG. 10B2
FIG. 10C1
FIG. 10C2
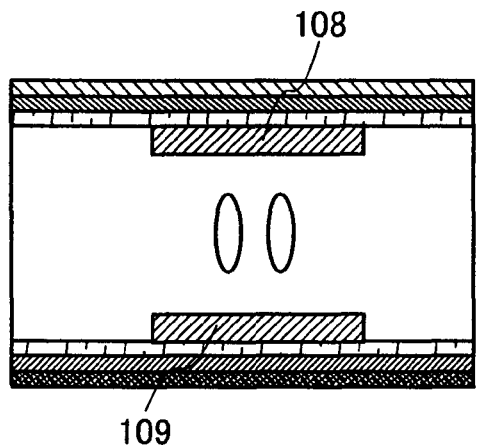
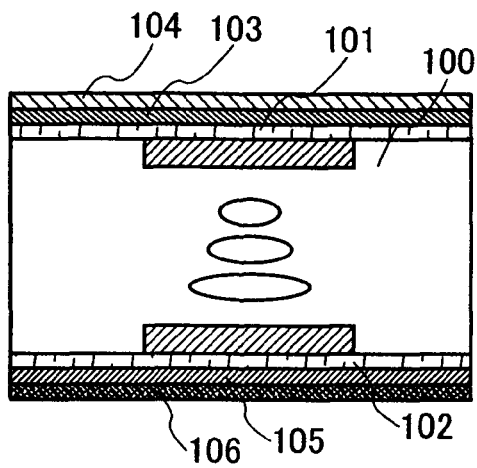
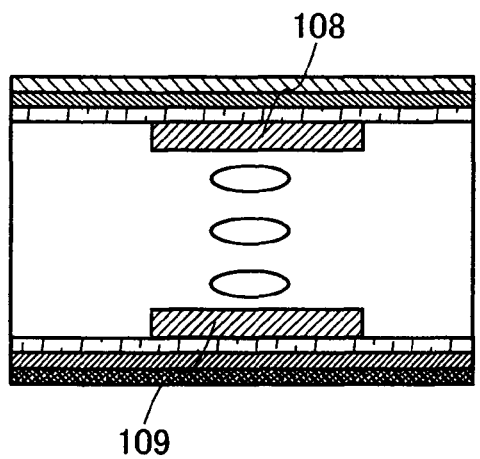
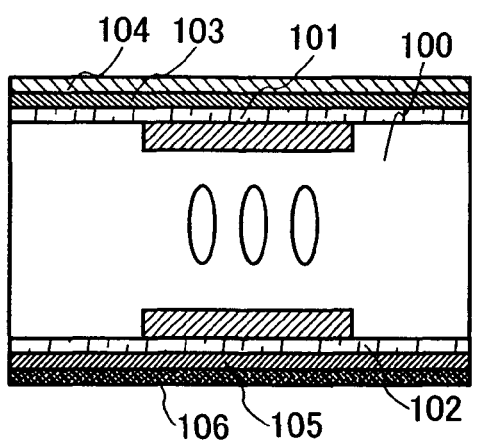
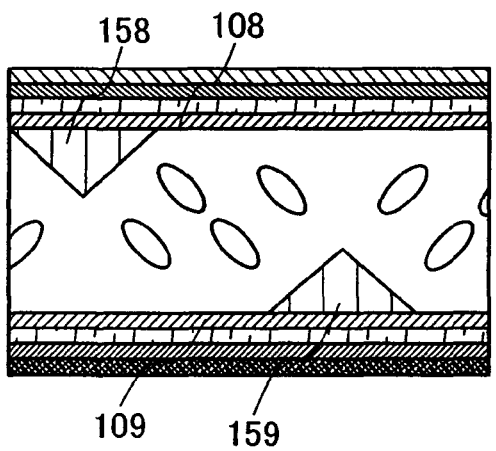
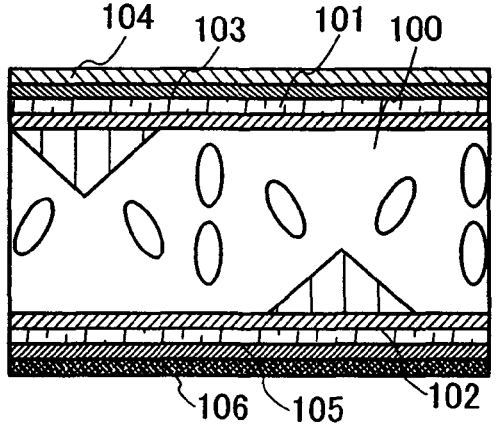

FIG. 11A1
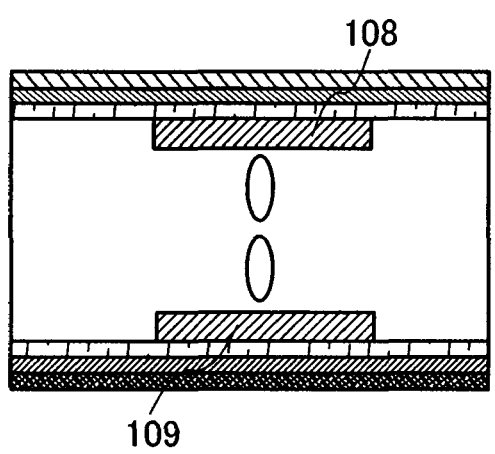
FIG. 11A2
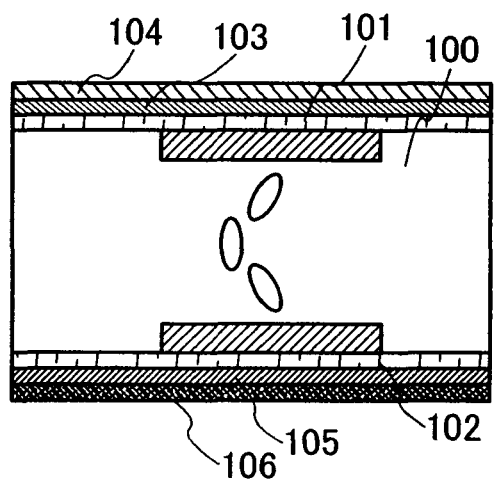
FIG. 11B1
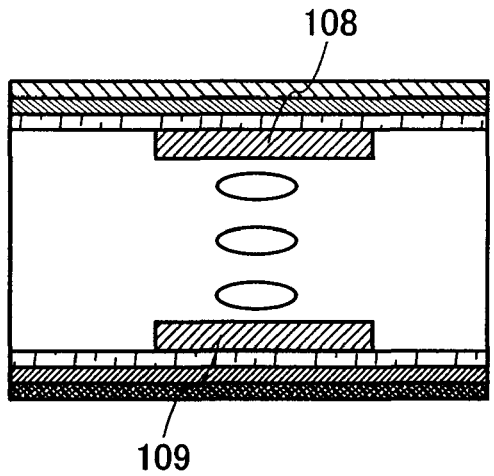
FIG. 11B2
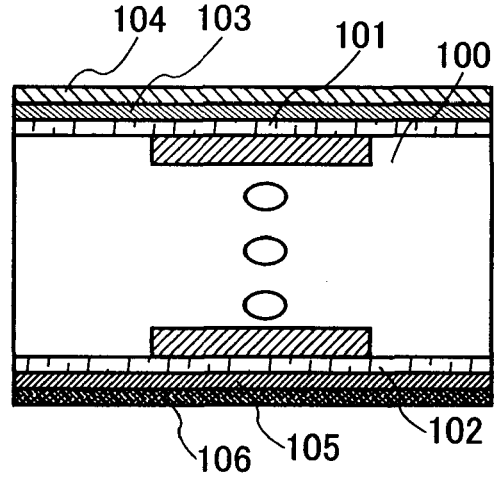

FIG. 12A1
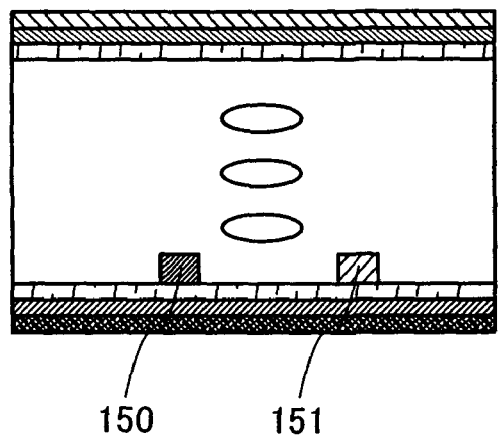
150  151
FIG. 12A2
104 103 101 100
106 105 102
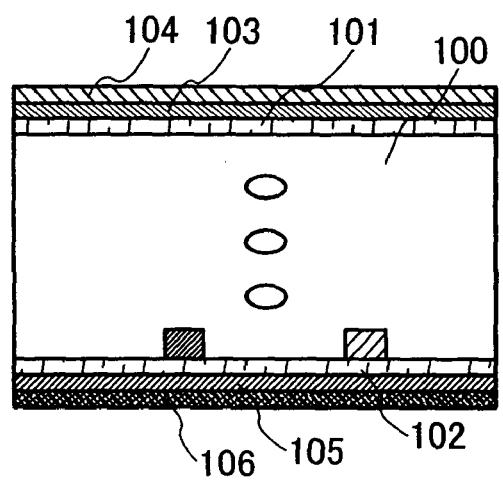
FIG. 12B1
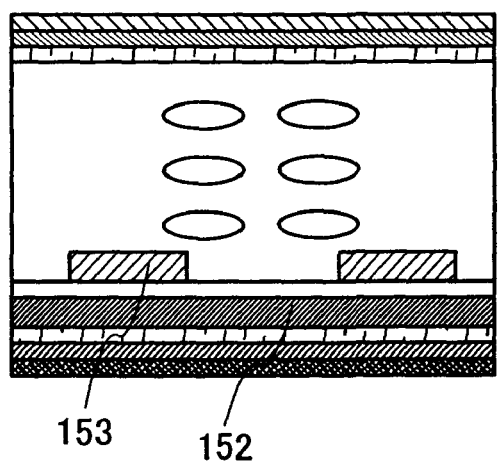
153 152
FIG. 12B2
104 103 101 100
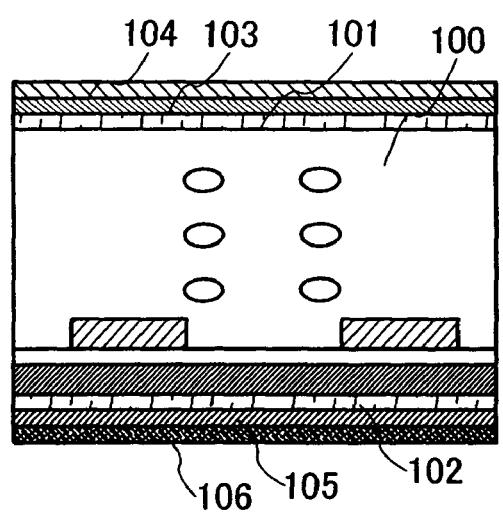
106 105 102

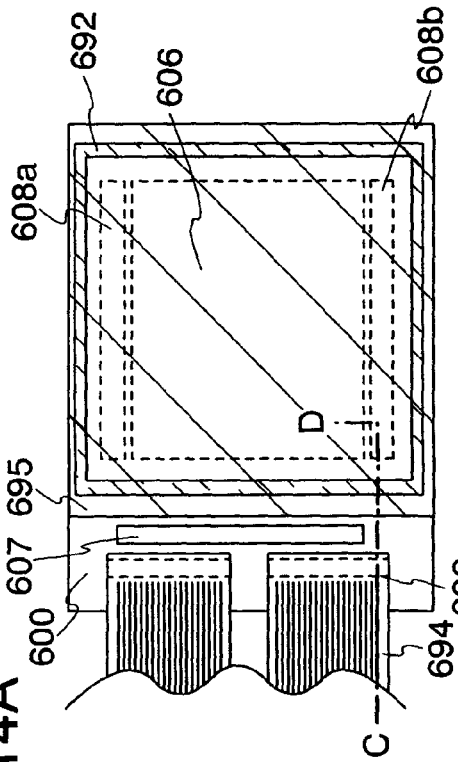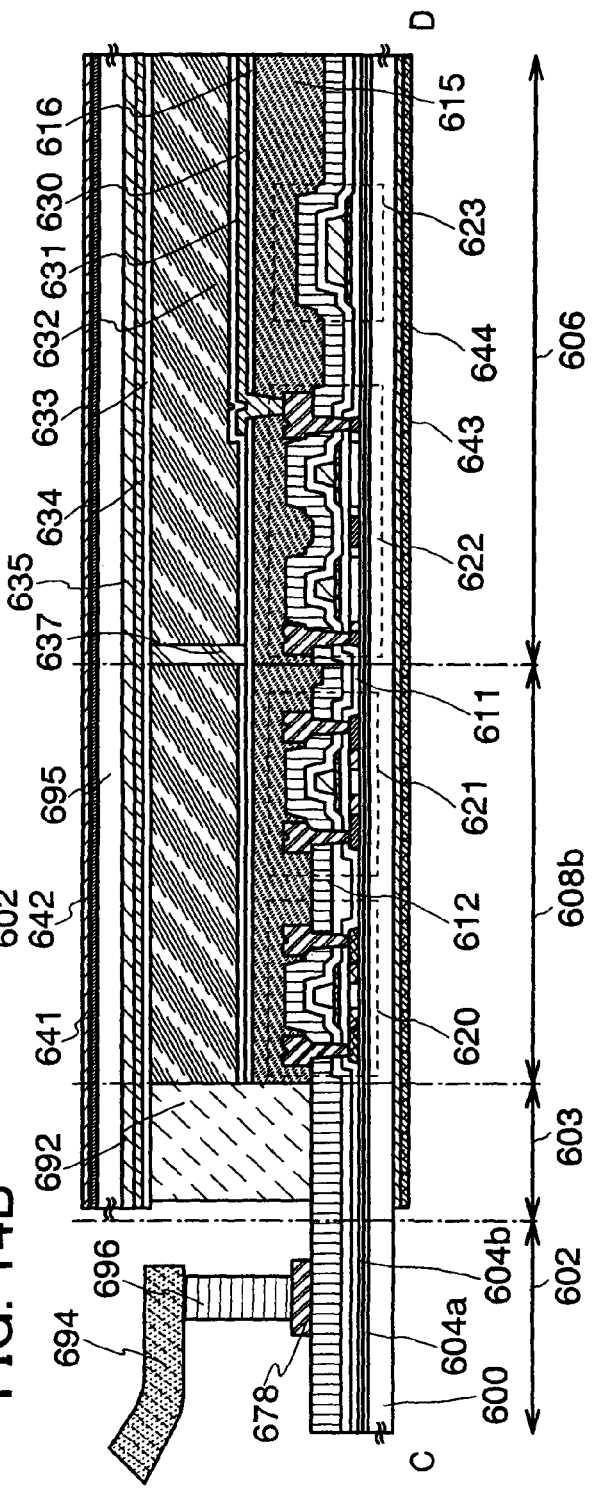

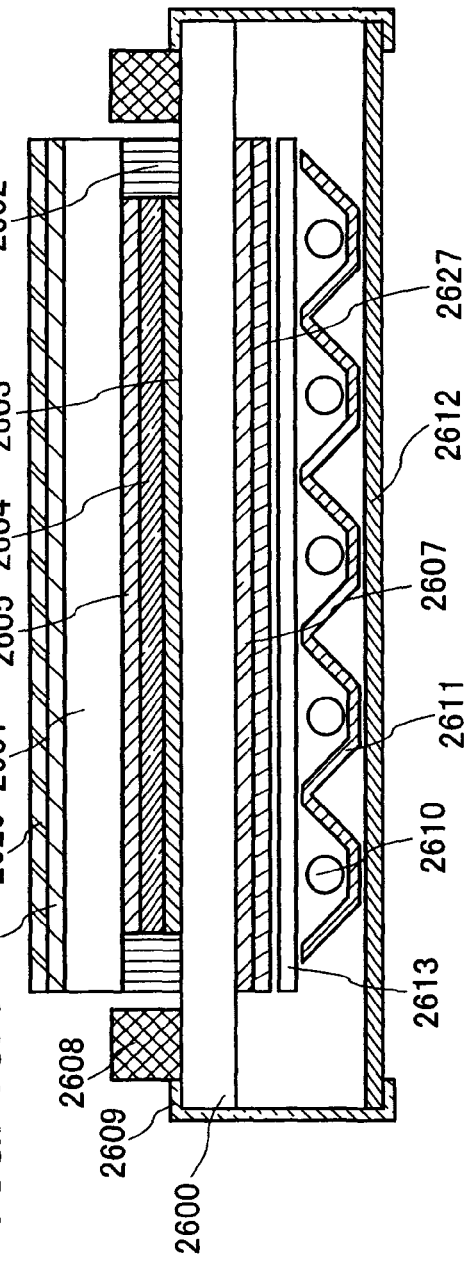
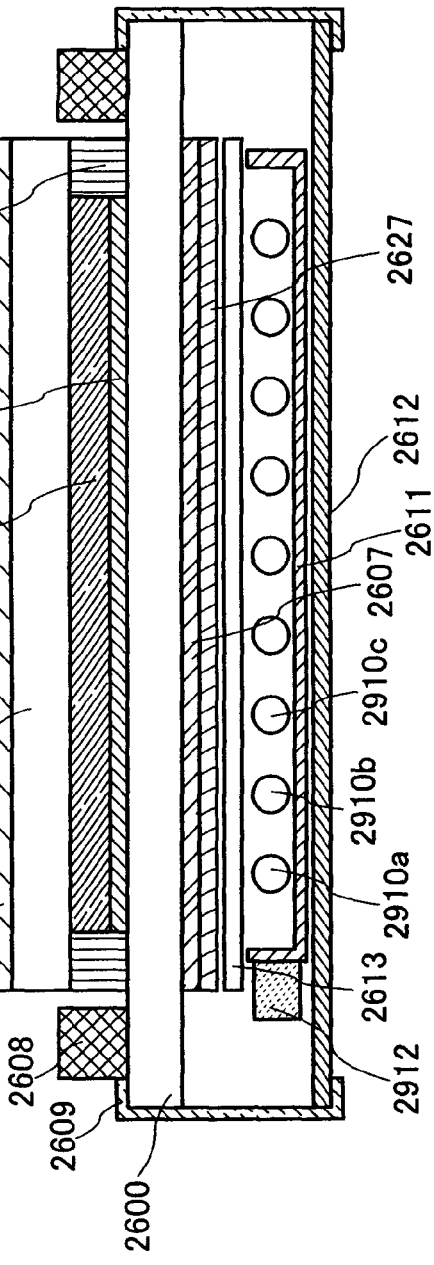
FIG. 18A
FIG. 18B

FIG. 29A

| POLARIZER 1 (ABSORPTION AXIS 44.9°) |
|---|
| RETARDATION PLATE B1 |
| RETARDATION PLATE A1 |
| GLASS SUBSTRATE |
| LIQUID CRYSTAL |
| GLASS SUBSTRATE |
| RETARDATION PLATE A2 |
| RETARDATION PLATE B2 |
| POLARIZER 2 (ABSORPTION AXIS 135°) |
| BACKLIGHT |

STRUCTURE A

FIG. 29B

| POLARIZER 1 (ABSORPTION AXIS 44.9°) |
|---|
| RETARDATION PLATE B1 |
| RETARDATION PLATE A1 |
| GLASS SUBSTRATE |
| LIQUID CRYSTAL |
| GLASS SUBSTRATE |
| RETARDATION PLATE A2 |
| RETARDATION PLATE B2 |
| POLARIZER 2 (ABSORPTION AXIS 135°) |
| POLARIZER 3 (ABSORPTION AXIS 135°) |
| BACKLIGHT |

STRUCTURE B

FIG. 29C

| POLARIZER 4 (ABSORPTION AXIS 44.9°) |
|---|
| POLARIZER 1 (ABSORPTION AXIS 44.9°) |
| RETARDATION PLATE B1 |
| RETARDATION PLATE A1 |
| GLASS SUBSTRATE |
| LIQUID CRYSTAL |
| GLASS SUBSTRATE |
| RETARDATION PLATE A2 |
| RETARDATION PLATE B2 |
| POLARIZER 2 (ABSORPTION AXIS 135°) |
| POLARIZER 3 (ABSORPTION AXIS 135°) |
| BACKLIGHT |

STRUCTURE C

| Structure D (FIG. 32A) | Structure E (FIG. 32B) | Structure F (FIG. 32C) |
|---|---|---|
| VIEWING SIDE | VIEWING SIDE | VIEWING SIDE |
| POLARIZER 1 (ABSORPTION AXIS 44.9°) | POLARIZER 4 (ABSORPTION AXIS 44.9°) | POLARIZER 1 (ABSORPTION AXIS 44.9°) |
| POLARIZER 4 (ABSORPTION AXIS 44.9°) | POLARIZER 1 (ABSORPTION AXIS 44.9°) | POLARIZER 4 (ABSORPTION AXIS 44.9°) |
| RETARDATION PLATE B1 | RETARDATION PLATE B1 | RETARDATION PLATE B1 |
| RETARDATION PLATE A1 | RETARDATION PLATE A1 | RETARDATION PLATE A1 |
| GLASS SUBSTRATE | GLASS SUBSTRATE | GLASS SUBSTRATE |
| LIQUID CRYSTAL | LIQUID CRYSTAL | LIQUID CRYSTAL |
| GLASS SUBSTRATE | GLASS SUBSTRATE | GLASS SUBSTRATE |
| RETARDATION PLATE A2 | RETARDATION PLATE A2 | RETARDATION PLATE A2 |
| RETARDATION PLATE B2 | RETARDATION PLATE B2 | RETARDATION PLATE B2 |
| POLARIZER 2 (ABSORPTION AXIS 135°) | POLARIZER 3 (ABSORPTION AXIS 135°) | POLARIZER 3 (ABSORPTION AXIS 135°) |
| POLARIZER 3 (ABSORPTION AXIS 135°) | POLARIZER 2 (ABSORPTION AXIS 135°) | POLARIZER 2 (ABSORPTION AXIS 135°) |
| BACKLIGHT | BACKLIGHT | BACKLIGHT |

FIG. 32A  STRUCTURE D

FIG. 32B  STRUCTURE E

FIG. 32C  STRUCTURE F

FIG. 37A

Structure A (viewing side → backlight):
- POLARIZER 1 (ABSORPTION AXIS 135.1°)
- RETARDATION PLATE C1
- GLASS SUBSTRATE
- LIQUID CRYSTAL
- GLASS SUBSTRATE
- RETARDATION PLATE C2
- POLARIZER 2 (ABSORPTION AXIS 45°)
- BACKLIGHT

FIG. 37B

Structure B (viewing side → backlight):
- POLARIZER 1 (ABSORPTION AXIS 135.1°)
- RETARDATION PLATE C1
- GLASS SUBSTRATE
- LIQUID CRYSTAL
- GLASS SUBSTRATE
- RETARDATION PLATE C2
- POLARIZER 2 (ABSORPTION AXIS 45°)
- POLARIZER 3 (ABSORPTION AXIS 45°)
- BACKLIGHT

FIG. 37C

Structure C (viewing side → backlight):
- POLARIZER 4 (ABSORPTION AXIS 135.1°)
- POLARIZER 1 (ABSORPTION AXIS 135.1°)
- RETARDATION PLATE C1
- GLASS SUBSTRATE
- LIQUID CRYSTAL
- GLASS SUBSTRATE
- RETARDATION PLATE C2
- POLARIZER 2 (ABSORPTION AXIS 45°)
- POLARIZER 3 (ABSORPTION AXIS 45°)
- BACKLIGHT

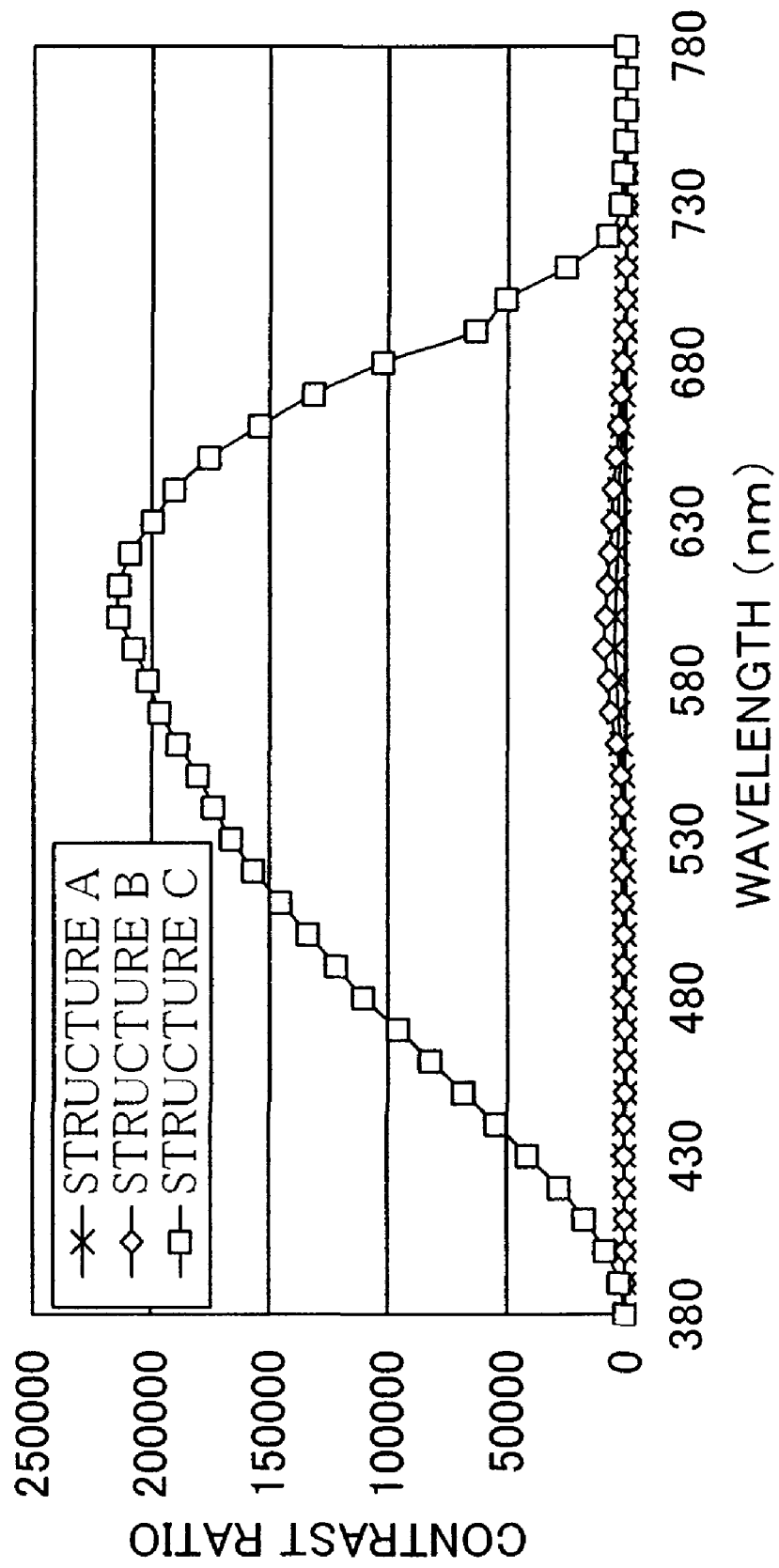

FIG. 40A

VIEWING SIDE

| POLARIZER 1 (ABSORPTION AXIS 135.1°) |
| POLARIZER 4 (ABSORPTION AXIS 135.1°) |
| RETARDATION PLATE C1 |
| GLASS SUBSTRATE |
| LIQUID CRYSTAL |
| GLASS SUBSTRATE |
| RETARDATION PLATE C2 |
| POLARIZER 2 (ABSORPTION AXIS 45°) |
| POLARIZER 3 (ABSORPTION AXIS 45°) |
| BACKLIGHT |

STRUCTURE D

FIG. 40B

VIEWING SIDE

| POLARIZER 4 (ABSORPTION AXIS 135.1°) |
| POLARIZER 1 (ABSORPTION AXIS 135.1°) |
| RETARDATION PLATE C1 |
| GLASS SUBSTRATE |
| LIQUID CRYSTAL |
| GLASS SUBSTRATE |
| RETARDATION PLATE C2 |
| POLARIZER 3 (ABSORPTION AXIS 45°) |
| POLARIZER 2 (ABSORPTION AXIS 45°) |
| BACKLIGHT |

STRUCTURE E

FIG. 40C

VIEWING SIDE

| POLARIZER 1 (ABSORPTION AXIS 135.1°) |
| POLARIZER 4 (ABSORPTION AXIS 135.1°) |
| RETARDATION PLATE C1 |
| GLASS SUBSTRATE |
| LIQUID CRYSTAL |
| GLASS SUBSTRATE |
| RETARDATION PLATE C2 |
| POLARIZER 3 (ABSORPTION AXIS 45°) |
| POLARIZER 2 (ABSORPTION AXIS 145°) |
| BACKLIGHT |

STRUCTURE F

DISPLAY DEVICE WITH STACK OF POLARIZERS HAVING WAVELENGTH DISTRIBUTIONS OF EXTINCTION COEFFICIENT OF ABSORPTION AXES

BACKGROUND OF THE INVENTION

1. Field of the Invention

The present invention relates to a structure of a display device including a liquid crystal element.

2. Description of the Related Art

A so-called flat panel display, which is a display device that is very thin and lightweight as compared to the conventional cathode-ray tube display device, has been developed. A liquid crystal display device having a liquid crystal element as a display element, a light emitting device having a self-light emitting element, an FED (field emission display) using an electron beam, and the like compete in the market of flat panel displays. Therefore, lower power consumption and higher contrast ratio are demanded in order to increase the added value and to differentiate from other products.

In general, a liquid crystal display device is provided with one polarizing plate over each of substrates to keep the contrast ratio. The higher the contrast ratio is, the more clearly black display is performed. Therefore, higher display quality can be provided when an image is seen in a dark room such as a home theater room.

For example, it is suggested that a first polarizing plate is provided outside a substrate on a viewing side of a liquid crystal cell, a second polarizing plate is provided outside a substrate on a side opposite the viewing side, and a third polarizing plate is provided for heightening the polarization degree when light from an auxiliary light source provided on the substrate side opposite the viewing side polarizes through the second polarizing plate and passes the liquid crystal cell, in order to improve unevenness of display as well as the contrast ratio which are caused due to shortage of polarization degree and polarization distribution of polarizing plates (see Patent Document 1).

[Patent Document 1] PCT International Publication No. 00/34821

SUMMARY OF THE INVENTION

However, the contrast ratio still has been demanded to be enhanced and researches have been done to enhance the contrast ratio in liquid crystal display devices. Further, it is a problem that a polarizing plate having a high polarization degree is expensive.

A method for improving the contrast ratio by using three polarizing plates as described in Patent Document 1 can be realized by using an inexpensive polarizing plate; however, it is difficult to perform display with a higher contrast ratio by the method. Further, a polarizing plate has unstable wavelength dependency of an absorption property, that is, an absorption property of a polarizing plate in a specific wave length region is lower than that in another wave length region. In other words, light is not easily absorbed only in the specific region. Therefore, even if the same kind of plural polarizing plates are used to attempt improvement in contrast, a wavelength region in which light is not easily absorbed remains as it is. This causes the aforementioned slight light leakage. The light leakage prevents the contrast ratio from being enhanced.

In view of the aforementioned problems, an object of the invention is to provide a display device having a high contrast ratio. Another object of the invention is to manufacture a high-performance display device at low cost.

According to the invention, in a display device having a display element between a pair of light-transmissive substrates, polarizer-including layers each having a different wavelength distribution of extinction coefficient are stacked over each light-transmissive substrate so that absorption axes are in a parallel nicol state. Absorption axes of one of a pair of stacks of polarizers and the other together which interpose the display element, are arranged deviating from a cross nicol state. A retardation plate may be provided between the stack of polarizing plates and the substrate.

In the invention, a pair of stacks of polarizers are arranged to be deviated from each other so that black display is performed most clearly (that is, so that transmissivity of a backlight is lower), which realizes a high contrast ratio. The state where black display is performed most clearly is a non-lighting state, and direction thereof is also referred to as an extinction level.

A polarizer has an absorption axis. When stacking polarizers, a case where absorption axes of stacked polarizers are parallel to each other is referred to as a parallel nicol state, whereas a case where those are perpendicular to each other is referred to as a cross nicol state. Note that a polarizer characteristically has a transmissive axis in a perpendicular direction to an absorption axis. Therefore, the case where transmissive axes are parallel to each other can also be referred to as a parallel nicol state, whereas the case where transmissive axes are perpendicular to each other can also be referred to as a cross nicol state.

Further, a polarizer has a specific extinction coefficient with respect to the wavelength of light. This is because a polarizer has unstable wavelength dependency of an absorption property: an absorption property of a polarizing plate in a specific wave length region is lower than that in another wave length region, in other words, light is not easily absorbed only in the specific region. In the invention, each of the stacked polarizers has an extinction coefficient of an absorption axis which is different from that of an absorption axis of another polarizer.

Polarizers each having a different wavelength distribution of extinction coefficient of an absorption axis are stacked to be combined using the invention, thereby eliminating or reducing a wavelength region in which light is not easily absorbed. Accordingly, even slight light leakage can be prevented and the contrast ratio can be further improved.

One mode of the invention is a display device including a first light-transmissive substrate and a second light-transmissive substrate which are provided so as to face each other; a display element interposed between the first light-transmissive substrate and the second light-transmissive substrate; a first layer including first stack of polarizers outside the first light-transmissive substrate; and a second layer including second stack of polarizers outside the second light-transmissive substrate, in which each of the first stack of polarizers and the second stack of polarizers has a different wavelength distribution of extinction coefficient of an absorption axis; absorption axes of the first stack of polarizers and those of the second stack of polarizers are in a parallel nicol state respectively; and absorption axis of the first stack of polarizers and that of the second stack of polarizers are arranged deviating from a cross nicol state.

Another mode of the invention is a display device including a first light-transmissive substrate and a second light-transmissive substrate which are provided so as to face each other; a display element interposed between the first light-transmissive substrate and the second light-transmissive substrate; a first layer including first stack of polarizers outside the first light-transmissive substrate; a second layer including second stack of polarizers outside the second light-transmissive substrate; a first retardation plate between the first light-transmissive substrate and the first layer including the first stack of polarizers; and a second retardation plate between the second light-transmissive substrate and the second layer including the second stack of polarizers, in which polarizers in each of the first stack of polarizers and the second stack of polarizers have different wavelength distribution of extinction coefficients of absorption axes; absorption axes of the first stack of polarizers and those of the second stack of polarizers are in a parallel nicol state respectively; and absorption axis of the first stack of polarizers and that of the second stack of polarizers are arranged deviating from a cross nicol state.

Another mode of the invention is a display device including a first light-transmissive substrate and a second light-transmissive substrate which are provided so as to face each other; a display element interposed between the first light-transmissive substrate and the second light-transmissive substrate; a first layer including first stack of polarizers outside the first light-transmissive substrate; and a second layer including second stack of polarizers outside the second light-transmissive substrate, in which a first polarizer, a second polarizer, and a third polarizer are stacked in this order on a first light-transmissive substrate side to form the first stack of polarizers; polarizers in each of the first stack of polarizers and the second stack of polarizers have different wavelength distribution of extinction coefficients of absorption axes; absorption axes of the first stack of polarizers and those of the second stack of polarizers are in a parallel nicol state respectively; and absorption axis of the first stack of polarizers and that of the second stack of polarizers are arranged deviating from a cross nicol state.

Another mode of the invention is a display device including a first light-transmissive substrate and a second light-transmissive substrate which are provided so as to face each other; a display element interposed between the first light-transmissive substrate and the second light-transmissive substrate; a first layer including first stack of polarizers outside the first light-transmissive substrate; a second layer including second stack of polarizers outside the second light-transmissive substrate; a first retardation plate between the first light-transmissive substrate and the first layer including the first stack of polarizers; and a second retardation plate between the second light-transmissive substrate and the second layer including the second stack of polarizers, in which a first polarizer, a second polarizer, and a third polarizer are stacked in this order on a first light-transmissive substrate side to form the first stack of polarizers; polarizers in each of the first stack of polarizers and the second stack of polarizers have different wavelength distribution of extinction coefficients of absorption axes; absorption axes of the first stack of polarizers and those of the second stack of polarizers are in a parallel nicol state respectively; and an absorption axis of the first stack of polarizers and that of the second stack of polarizers are arranged deviating from a cross nicol state.

In a display device of the invention, when light is made to pass through a display element from a stack of polarizer-including layers on a side opposite a viewing side by using a light source which is a backlight, to be extracted from a stack of polarizer-including layers on the viewing side, it is preferable that absorption axes of the stack of polarizers on the side opposite the viewing side (backlight side) be in a parallel nicol state since light transmissivity from the backlight is improved.

Further, in a display device of the invention, a stack of polarizer-including layers may have a structure where a stack of a plurality of polarizers is provided between a pair of protective layers, or a structure where each polarizer is interposed between a pair of protective layers. The stack of polarizer-including layers may be provided with an antireflective film or an antidazzle film on the viewing side. In the invention, a pair of stacks of polarizers in a parallel nicol state are arranged to be deviated from a cross nicol state by −3° to +3°, more preferably, −0.5° to +0.5°, which leads to a non-lighting state where black display is performed most clearly.

A structure where an extinction coefficient of an absorption axis is different from that of another absorption axis and a pair of stacks of polarizers in a parallel nicol state are provided to be deviated from a cross nicol state can prevent light leakage and further improve the contrast ratio of a display device. Further, such a high performance display device can be manufactured at low cost.

BRIEF DESCRIPTION OF DRAWINGS

FIGS. 2A and 2B are a cross sectional view and a perspective view showing a dipslay device of the invention, respectively.

FIGS. 10A1 to 10C2 are cross sectional views each showing a liquid crystal mode of the invention.

FIGS. 11A1 to 11B2 are cross sectional views each showing a liquid crystal mode of the invention.

FIGS. 12A1 to 12B2 are cross sectional views each showing a liquid crystal mode of the invention.

FIGS. 14A and 14B are a top plan view and a cross sectional view showing a display device of the invention, respectively.

FIGS. 18A and 18B are cross sectional views each showing a display device of the invention.

FIGS. 29A to 29C are views each showing an experiment condition of Embodiment 1.

FIGS. 32A to 32C are views each showing an experiment condition of Embodiment 1.

FIGS. 37A to 37C are views each showing an experiment condition of Embodiment 2.

FIG. 39 is a graph showing an experiment result of Embodiment 2.

FIGS. 40A to 40C are views each showing an experiment condition of Embodiment 2.

DETAILED DESCRIPTION OF THE INVENTION

Figure 1A:
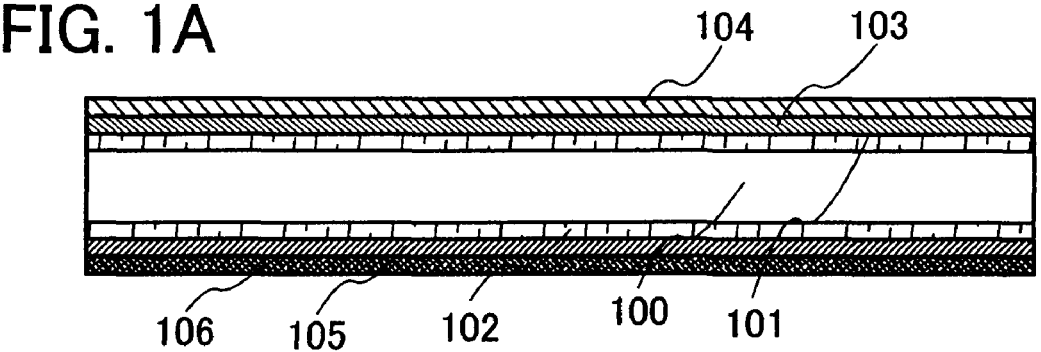
FIGS. 1A and 1B are a cross sectional view and a perspective view showing a dipslay device of the invention, respectively.

Although the invention will be fully described by way of embodiment modes and embodiments with reference to the accompanying drawings, it is to be understood that various changes and modifications will be apparent to those skilled in the art. Therefore, unless such changes and modifications depart from the spirit and the scope of the invention, they should be construed as being included therein. Note that common portions and portions having a similar function are denoted by the same reference numerals in all diagrams for describing embodiment modes, and description thereof is omitted.

Embodiment Mode 1

In this embodiment, a concept of a display device provided with a pair of stacks of polarizer-including layers, which uses the invention, is described.

Figure 1B:
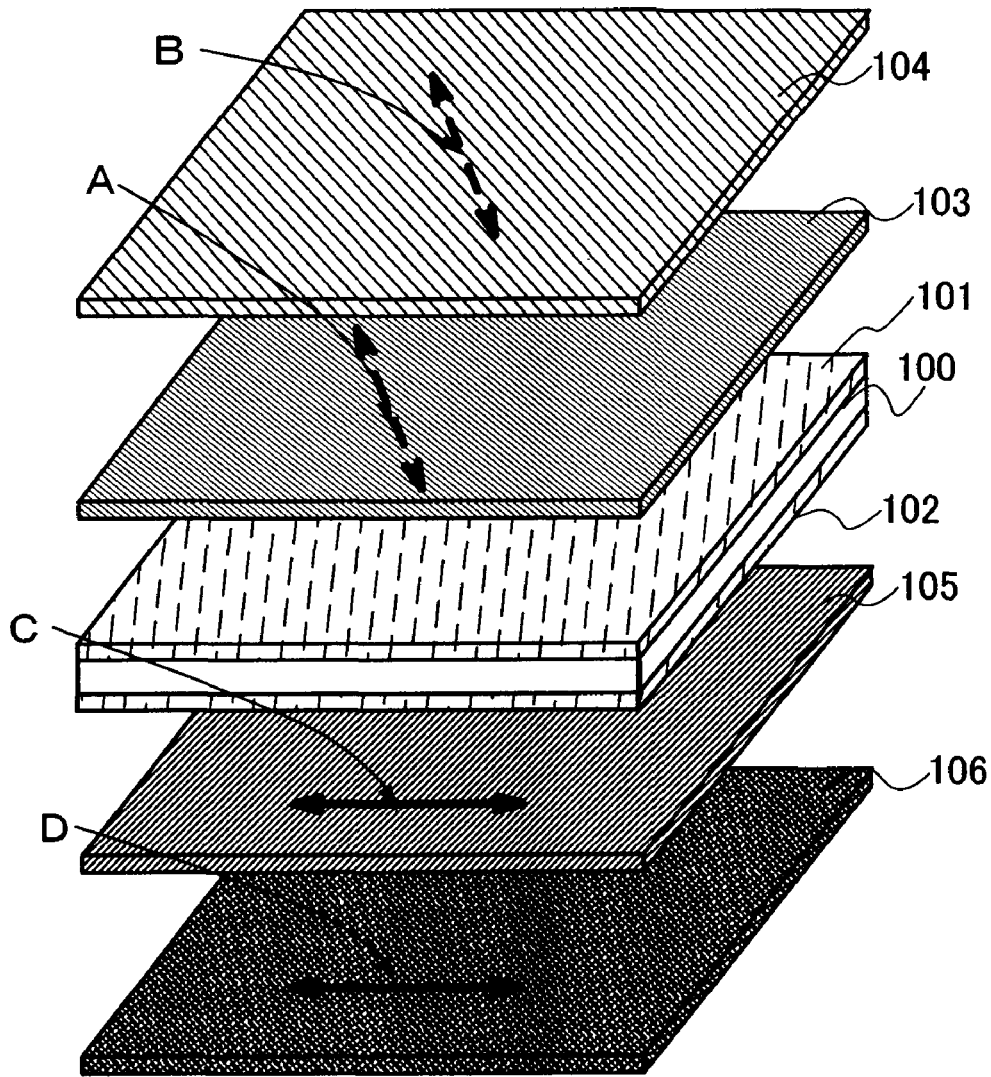

FIG. 1A shows a cross sectional view of a display device which is provided with a pair of stacks of polarizer-including layers in a parallel nicol state, in which each polarizer-including layer has a different wavelength distribution of extinction coefficient of an absorption axis, and which has a structure where one stack of polarizers and the other stack of polarizers that interpose a display element are provided so that their absorption axes are deviated from a cross nicol state, and FIG. 1B shows a perspective view of the display device. In this embodiment mode, description is made using a liquid crystal display device having a liquid crystal element as a display element, as an example.

As shown in FIG. 1A, a layer 100 including a liquid crystal element is interposed between a first substrate 101 and a second substrate 102 that are arranged so as to face each other.

In this embodiment mode, polarizer-including layers each having a different wavelength distribution of extinction coefficient of an absorption axis stacked in a parallel nicol state are provided outside a pair of substrates, that is, on sides which are not in contact with the layer having a display element. Specifically, as shown in FIG. 1A, a first polarizer-including layer 103 and a second polarizer-including layer 104 are provided in a parallel nicol state on the first substrate 101 side. In addition, a third polarizer-including layer 105 and a fourth polarizer-including layer 106 are provided in a parallel nicol state on the second substrate 102 side. In this embodiment mode, each of stacked polarizers has a different wavelength distribution of extinction coefficient of an absorption axis, and one stack of polarizers and the other stack of polarizers that interpose a display element are arranged so that their absorption axes are deviated from a cross nicol state.

Specifically, as shown in FIG. 1B, the first polarizer-including layer 103 and the second polarizer-including layer 104, which have different wavelength distributions of extinction coefficients of absorption axes, are stacked so that absorption axis A of the first polarizer-including layer 103 and absorption axis B of the second polarizer-including layer 104 are arranged in parallel, that is, arranged so as to be in a parallel nicol state. In a similar manner, the third polarizer-including layer 105 and the fourth polarizer-including layer 106, which have different wavelength distributions of extinction coefficients of absorption axes, are stacked so that absorption axis C of the third polarizer-including layer 105 and absorption axis D of the fourth polarizer-including layer 106 are arranged in parallel, that is, arranged so as to be in a parallel nicol state. Further, an absorption axis of the first polarizer-including layer 103 and the second polarizer-including layer 104 and that of the third polarizer-including layer 105 and the fourth polarizer-including layer 106 are deviated from a cross nicol state.

In this embodiment mode, a pair of stacks of polarizers are arranged to be deviated so that black display is performed most clearly (that is, so that black transmissivity of a backlight is lower), which realizes a high contrast ratio.

A polarizer has unstable wavelength dependency of an absorption property, that is, an absorption property of a polarizer in a specific wave length region is lower than that in another wave length region. In other words, light is not easily absorbed only in the specific region. Therefore, even if the same kind of plural polarizers are used to attempt an improvement in the contrast ratio, a wavelength region in which light is not easily absorbed remains as it is. Thus, polarizers each having a different wavelength distribution of extinction coefficient of an absorption axis are stacked to be combined using the invention, thereby eliminating or reducing a wavelength region in which light is not easily absorbed. Accordingly, even slight light leakage can be prevented and the contrast ratio can be further improved.

Each of the substrates is a light-transmissive insulating substrate (hereinafter also referred to as a light-transmissive substrate). The substrates can be formed of, for example, a glass substrate such as barium borosilicate glass or aluminoborosilicate glass, a quartz substrate, or the like. Further, a substrate formed of plastic represented by polyethylene terephthalate (PET), polyethylene naphthalate (PEN), polyether sulfone (PES), and polycarbonate (PC) or a synthetic resin having flexibility such as acrylic can be applied to the substrates. Alternatively, a film (containing polypropylene, polyester, vinyl, a poly vinyl fluoride, vinyl chloride, or the like), or an inorganic vapor deposition film may be used.

Although not shown in FIGS. 1A and 1B, an irradiation unit such as a backlight is arranged under the fourth polarizer-including layer 106.

Figure 5:
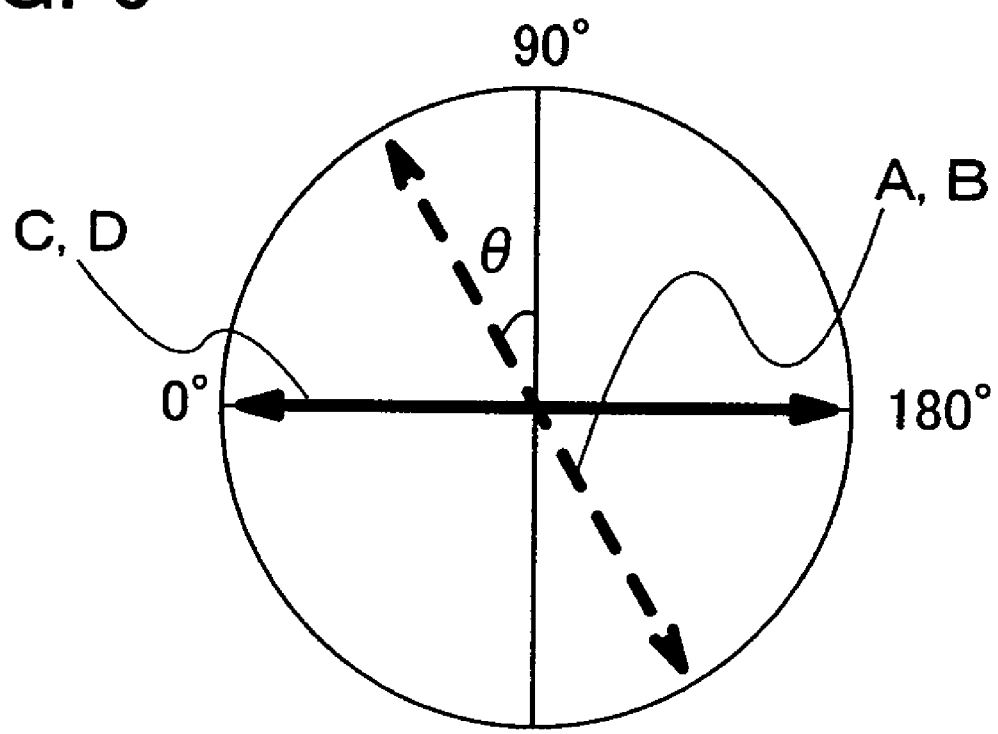
FIG. 5 is a view showing a display device of the invention.

FIG. 5 shows a top plan view of an angle made by absorption axes A and B of the first polarizer-including layer 103 and the second polarizer-including layer 104 respectively; and absorption axes C and D of the third polarizer-including layer 105 and the fourth polarizer-including layer 106 respectively. The first polarizer-including layer 103 and the second polarizer-including layer 104 are stacked so that the absorption axis A and the absorption axis B are in a parallel nicol state, and the third polarizer-including layer 105 and the fourth polarizer-including layer 106 are stacked so that the absorption axis C and the absorption axis D are in a parallel nicol state. The stack of the first polarizer-including layer 103 and the second polarizer-including layer 104 and the stack of the third polarizer-including layer 105 and the fourth polarizer-including layer 106 are arranged so that the absorption axes A and B and the absorption axes C and D are deviated from a cross nicol state by θ degrees.

Note that a polarizer characteristically has a transmissive axis in a direction perpendicular to an absorption axis. Therefore, the case where transmissive axes are parallel to each other can also be referred to as a parallel nicol state. Meanwhile, the case where transmissive axes are perpendicular to each other can also be referred to as a cross nicol state.

Figure 3A:
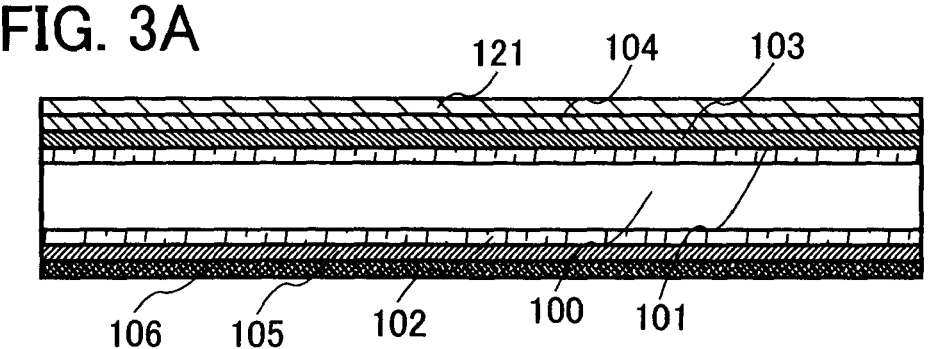
FIGS. 3A and 3B are a cross sectional view and a perspective view showing a dipslay device of the invention, respectively.
Figure 3B:
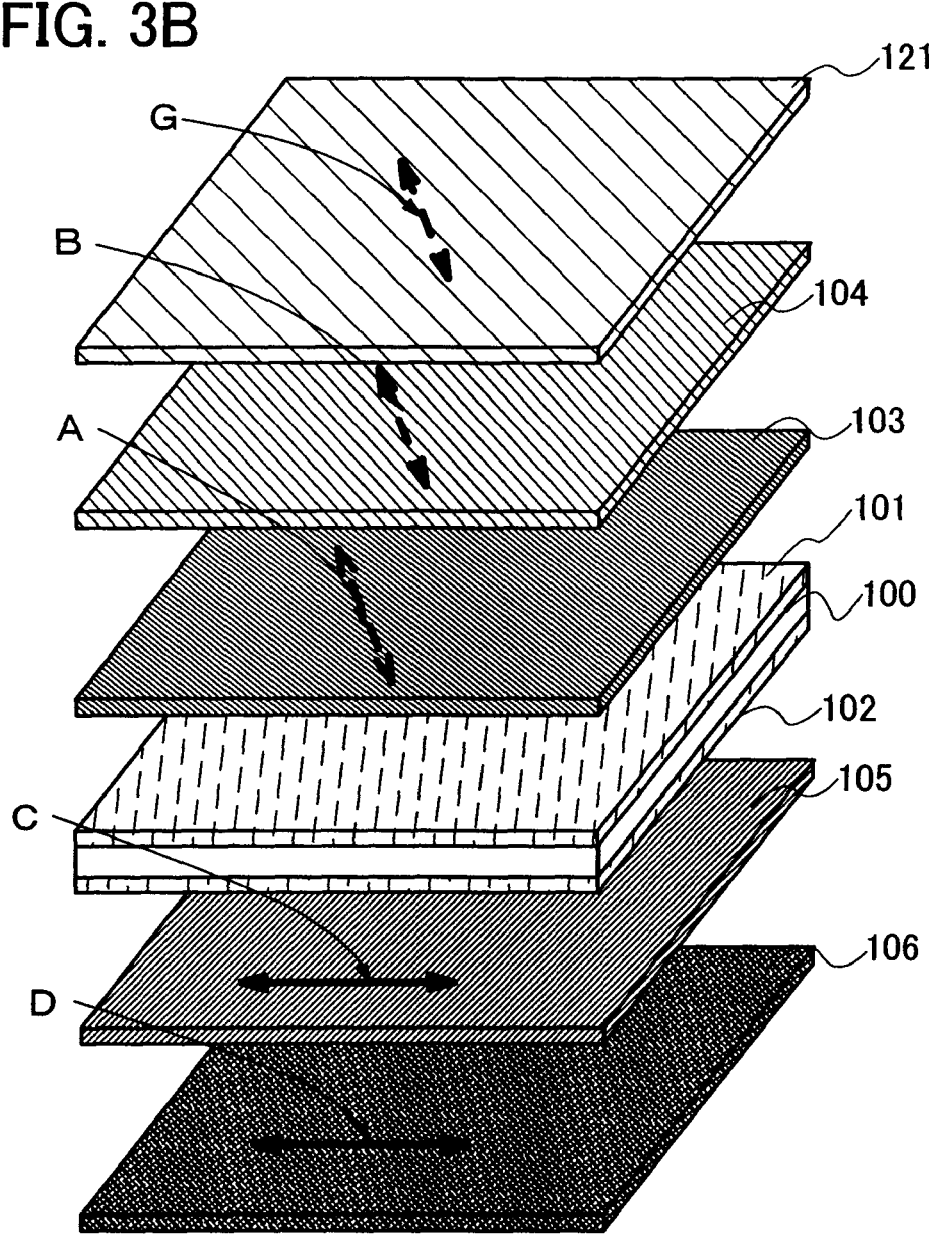
Figure 6:
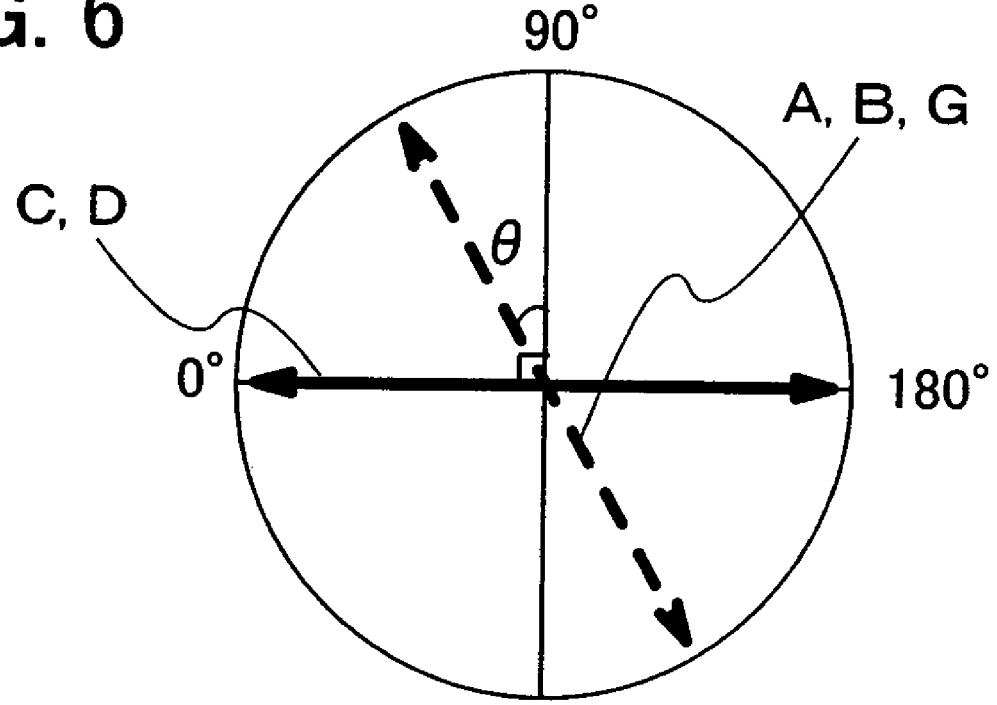
FIG. 6 is a view showing a display device of the invention.

Although two polarizer-including layers each having a different wavelength distribution of extinction coefficient are stacked in FIGS. 1A and 1B, the invention is not limited to this structure and a multilayer structure may be employed. FIGS. 3A and 3B show an example where a fifth polarizer-including layer 121 is additionally stacked over the first polarizer-including layer 103 and the second polarizer-including layer 104 which have different wavelength distributions of extinction coefficients. In FIG. 3A and 3B, the polarizer of the fifth polarizer-including layer 121 has an absorption axis G which is parallel to the absorption axis A of the first polarizer-including layer 103 and the absorption axis B of the second polarizer-including layer 104. That is, as shown in FIG. 6, the fifth polarizer-including layer 121 is stacked over the first polarizer-including layer 103 and the second polarizer-including layer 104 so that their absorption axes are in a parallel nicol state. Therefore, the fifth polarizer-including layer 121 is stacked over the third polarizer-including layer 105 and the fourth polarizer-including layer 106 so that the absorption axis of the fifth polarizer-including layer 121, and the absorption axes of the third polarizer-including layer 105 and the fourth polarizer-including layer 106 are deviated from a cross nicol state by θ degrees.

Further, a wavelength distribution of an extinction coefficient of an absorption axis of the fifth polarizer-including layer 121 may be the same as or different from that of the first polarizer-including layer 103 or that of the second polarizer-including layer 104. In this embodiment mode, the wavelength distribution of the extinction coefficient of the absorption axis of the fifth polarizer-including layer 121 is different from that of the first polarizer-including layer 103 and that of the second polarizer-including layer 104. Thus, when each of stacked polarizers has a different wavelength distribution of extinction coefficient of an absorption axis, a wavelength range in which light is absorbed can be extended; therefore, even slight light leakage can be prevented. In the invention, at least two polarizers each having a different wavelength distribution of extinction coefficient only need to be included in a stack of a plurality of polarizer-including layers.

Figure 7A:
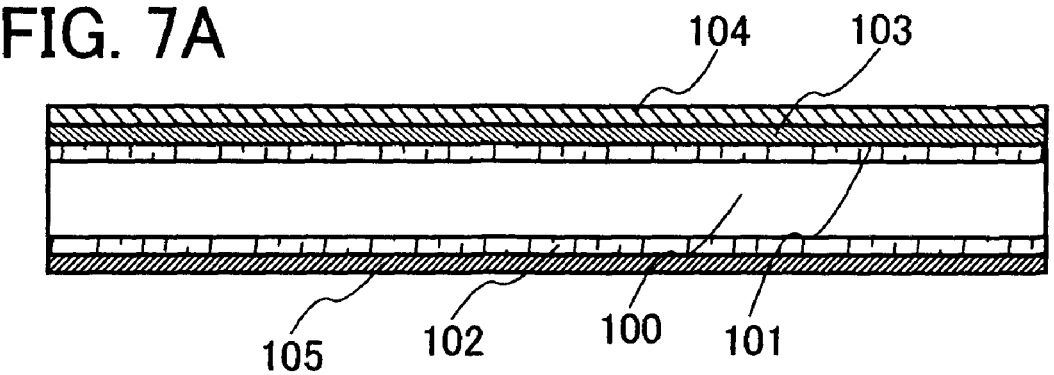
FIGS. 7A and 7B are a cross sectional view and a perspective view showing a display device of the invention, respectively.
Figure 7B:
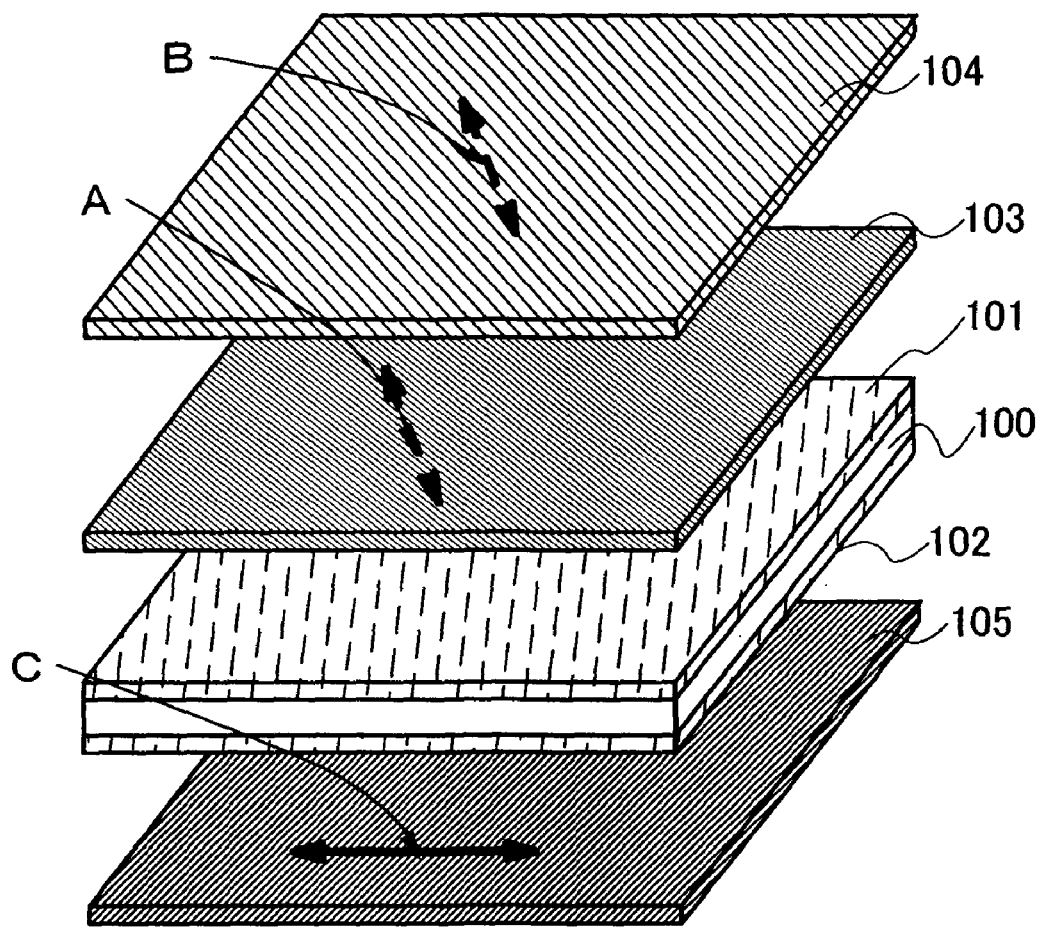

Further, a single-layer structure of the third polarizer-including layer 105 or the fourth polarizer-including layer 106 on a light source side may be employed instead of a stack of them in a parallel nicol state on the light source side (see FIGS. 7A and 7B). In that case, the stack of the first polarizer-including layer 103 and the second polarizer-including layer 104, which have different wavelength distributions of extinction coefficients, is arranged in a parallel nicol state on the viewing side, and the third polarizer-including layer 105 is arranged on the light source side with a layer including a liquid crystal element interposed between the stack and the third polarizer-including layer 105. The third polarizer-including layer 105 and the stack of the first polarizer-including layer 103 and the second polarizer-including layer 104 are arranged to be deviated from a cross nicol state. The structure shown in FIGS. 7A and 7B is preferably employed when an amount of light from the light source is not desired to be decreased.

A pair of stacks of polarizer-including layers described in this embodiment mode can be also applied to a display device which can extract light from both sides of a substrate by using a front light or the like.

Thus, a pair of stacks of polarizer-including layers in a parallel nicol state, in which each polarizer-including layer has a different wavelength distribution of extinction coefficient, are arranged interposing a display element so that absorption axes of a stack of polarizers are deviated from a cross nicol state, whereby light leakage in a direction of the absorption axes can be reduced. Therefore, the contrast ratio of the display device can be improved.

Embodiment Mode 2

In this embodiment mode, description is made of a concept of a display device provided with a retardation plate in addition to a pair of stacks of polarizer-including layers in which each polarizer-including layer has a different wavelength distribution of extinction coefficient of an absorption axis, which is different form the above embodiment mode.

FIG. 2A shows a cross sectional view of a display device which has a structure where a pair of stacks of polarizer-including layers in a parallel nicol state, in which each polarizer-including layer has a different wavelength distribution of extinction coefficient of an absorption axis are arranged so that absorption axes of one stack of polarizers and the other stack of polarizers which interpose the display element are deviated form a cross nicol state, and which is provided with a retardation plate between one stack of polarizer-including layers and a substrate, and the other stack of polarizer-including layers and the substrate, respectively. FIG. 2B shows a perspective view of the display device. In this embodiment mode, description is made using a liquid crystal display device having a liquid crystal element as a display element, as an example.

As shown in FIG. 2A, a layer 100 including a display element is interposed between the first substrate 101 and the second substrate 102 which are arranged so as to face each other.

As shown in FIG. 2A, the first polarizer-including layer 103 and the second polarizer-including layer 104 are arranged in a parallel nicol state on the first substrate 101 side. In a similar manner, the third polarizer-including layer 105 and the fourth polarizer-including layer 106 are arranged in a parallel nicol state on the second substrate 102 side. In this embodiment mode, polarizers in each of stacked polarizers have different wavelength distribution of extinction coefficients of absorption axes. In addition, absorption axes of one stack of polarizers and the other stack of polarizers which interpose the layer 100 including a liquid crystal element are deviated from a cross nicol state.

As shown in FIG. 2B, the first polarizer-including layer 103 and the second polarizer-including layer 104, which have different wavelength distributions of extinction coefficients, are arranged in a parallel nicol state. Further, a retardation plate 113 is provided between a stack of polarizer-including layers in which each polarizer-including layer has a different wavelength distribution of extinction coefficient of an absorption axis and the first substrate 101.

Further, as shown in FIG. 2B, the third polarizer-including layer 105 and the fourth polarizer-including layer 106 are arranged in a parallel nicol state on the second substrate 102 side. Further, a retardation plate 114 is provided between a stack of a polarizer-including layers and the second substrate 102.

Absorption axes of the first polarizer-including layer 103 and the second polarizer-including layer 104 and absorption axes of the third polarizer-including layer 105 and the fourth polarizer-including layer 106 are deviated from a cross nicol state.

Although not shown in FIGS. 2A and 2B, irradiation means such as a backlight is arranged below the fourth polarizer-including layer 106.

As a retardation plate, a film having liquid crystal with hybrid orientation, a film having liquid crystal with twisted orientation, a uniaxial retardation plate, or a biaxial retardation plate can be used. Such a retardation plate can widen a viewing angle of a display device. A film having liquid crystal with hybrid orientation is a compound film provided with optical anisotropy, which is obtained by hybrid-aligning discotic liquid crystals with a negative uniaxial property or nematic liquid crystals with a positive uniaxial property by using a triacetylcellulose (TAC) film as a base.

In order to form a uniaxial retardation plate, a resin is stretched in one direction, whereas in order to form a biaxial retardation plate, a resin is uniaxially-stretched in a horizontal direction and then uniaxially-stretched weakly in a vertical direction. For the resin, a cycloolefin polymer (COE), polycarbonate (PC), polymethylmethacrylate (PMMA), polystyrene (PS), polyether sulfone (PES), polyphenylene sulfide (PPS), polyethylene terephthalate (PET), polyethylene naphthalate (PEN), polypropylene (PP), a poliophenylene oxide (PPO), polyalylate (PAR), polyimide (PI), polytetrafluoroethylene (PTFE), or the like can be used here.

A retardation plate can be attached to a light-transmissive substrate while attached to a polarizer-including layer.

A retardation plate and a stack of polarizers are combined, thereby improving characteristics of a viewing angle of a display element. Here, a plurality of retardation plates may be used. When a ¼λ wavelength plate is used as a retardation plate, it can function as a circularly polarizing plate. Using a pair of circularly polarizing plates can reduce reflection of light from outside, and can further improve the contrast ratio. Note that a retardation plate characteristically has a fast axis in a direction perpendicular to a slow axis. Therefore, an arrangement can be determined based on the fast axis instead of the slow axis.

Although two polarizer-including layers each having a different wavelength distribution of extinction coefficient are stacked in FIGS. 2A and 2B, the invention is not limited to this structure, and a multilayer structure may be employed.

Figure 4A:
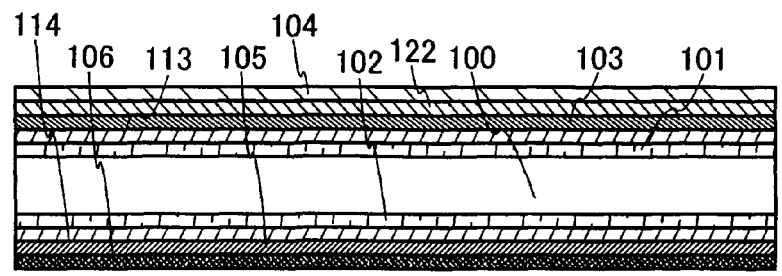
FIGS. 4A and 4B are a cross sectional view and a perspective view showing a dipslay device of the invention, respectively.
Figure 4B:
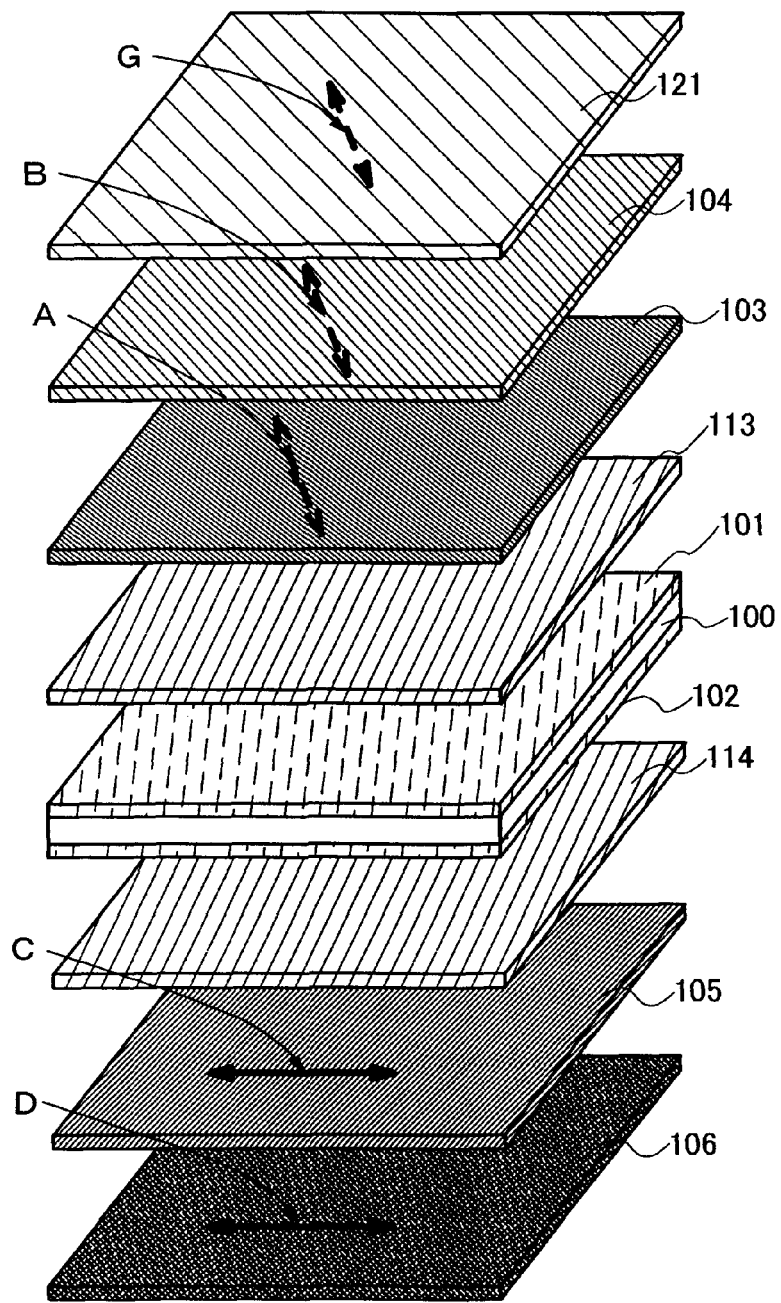

FIGS. 4A and 4B show an example where the fifth polarizer-including layer 121 is additionally stacked over the first polarizer-including layer 103 and the second polarizer-including layer 104, which have different wavelength distributions of extinction coefficients. In FIGS. 4A and 4B, a polarizer of the fifth polarizer-including layer 121 has an absorption axis G which is parallel to absorption axes A and B of the first polarizer-including layer 103 and the second polarizer-including layer 104. In other words, the fifth polarizer-including layer 121 is stacked so that an absorption axis thereof and absorption axes of the first polarizer-including layer 103 and the second polarizer-including layer 104 are in a parallel nicol state. Accordingly, the fifth polarizer-including layer 121 is stacked so that an absorption axis thereof and absorption axes of the third polarizer-including layer 105 and the fourth polarizer-including layer 106 are deviated from a cross nicol state.

Further, a wavelength distribution of an extinction coefficient of an absorption axis of the fifth polarizer-including layer 121 may be the same as or different from that of the first polarizer-including layer 103 or that of the second polarizer-including layer 104. In this embodiment mode, the wavelength distribution of the extinction coefficient of the absorption axis of the fifth polarizer-including layer 121 is different from that of the first polarizer-including layer 103 and that of the second polarizer-including layer 104. Thus, when each of stacked polarizers has a different wavelength distribution of extinction coefficient of an absorption axis, a wavelength range in which light is absorbed can be extended; therefore, even slight light leakage can be prevented.

A pair of stacks of polarizer-including layers described in this embodiment mode can be also applied to a display device which can extract light from both sides of a substrate by using a front light or the like.

Thus, a pair of stacks of polarizer-including layers in a parallel nicol state, in which each polarizer-including layer has a different wavelength distribution of extinction coefficient, are arranged so that an absorption axis of one of a pair of stacks of polarizers interposing the display element and an absorption axis of the other are deviated from a cross nicol state, whereby light leakage in a direction of the absorption axes can be reduced. Therefore, the contrast ratio of the display device can be improved.

Embodiment Mode 3

Figure 13A:
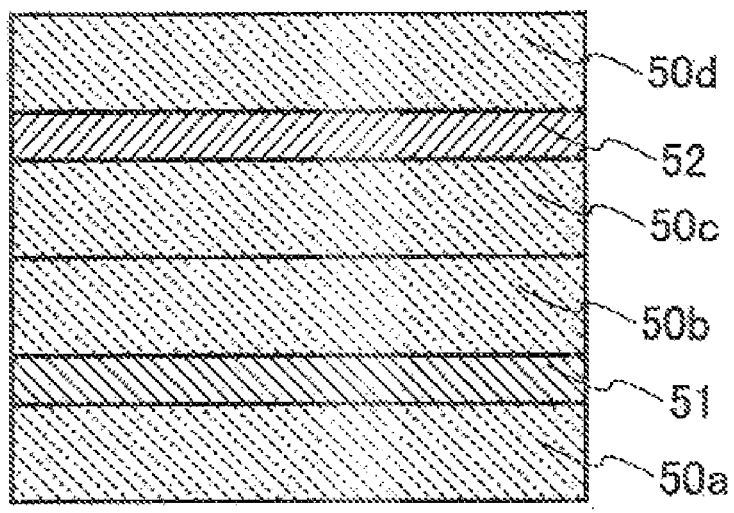
FIGS. 13A to 13C are cross sectional views each showing a structure of a layer including a polarizer of the invention.
Figure 13B:
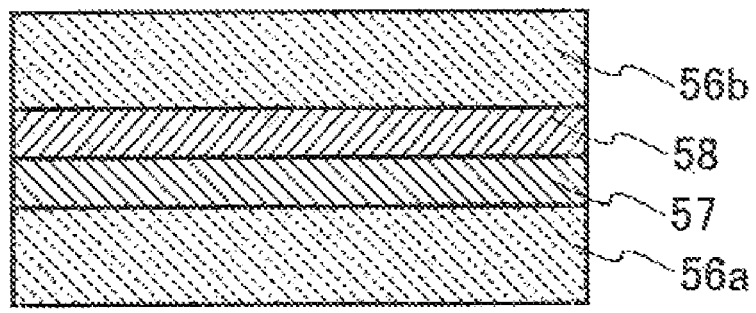
Figure 13C:
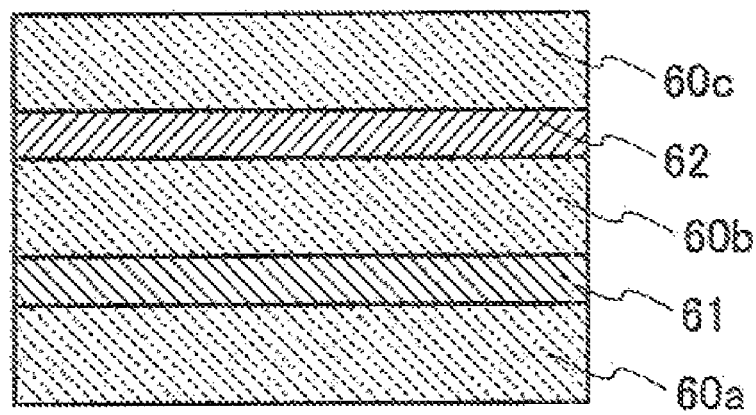

In this embodiment mode, description is made of a structure of stacked polarizers each having a different wavelength distribution of extinction coefficient of an absorption axis, which can be used in the invention, with reference to FIGS. 13A to 13C.

In the invention, a polarizer-including layer only needs to include at least a polarizer having a specific absorption axis, and it may have a single-layer structure or a structure where a protective film is provided so as to interpose a polarizer. FIGS. 13A to 13C show examples of a stacked-layer structure of polarizer-including layers in the invention. FIG. 13A shows a stack of polarizer-including layers, which includes a polarizer-including layer formed of a protective layer 50a, a first polarizer 51, and a protective layer 50b and a polarizer-including layer formed of a protective layer 50c, a second polarizer 52, and a protective layer 50d. Thus, in the invention, a stack of polarizers also corresponds to polarizers not stacked so as to be in contact with each other but stacked with a protective layer interposed therebetween. Therefore, a stack of polarizer-including layers also means a whole stack of a polarizer-including layer formed of the protective layer 50a, the first polarizer 51, and the protective layer 50b and a polarizer-including layer formed of the protective layer 50c, the second polarizer 52, and the protective layer 50d. Further, in this specification, a polarizer-including layer formed of the protective layer 50a, the first polarizer 51, and the protective layer 50b is also referred to as a polarizing plate. Thus, it can also be said that FIG. 13A is stacked polarizing plates. In FIG. 13A, an absorption axis of the first polarizer 51 and that of the second polarizer 52 are parallel to each other, and the first polarizer 51 and the second polarizer 52 are stacked in a parallel nicol state. Further, a wavelength distribution of an extinction coefficient of the absorption axis of the first polarizer 51 is different from that of the second polarizer 52.

FIG. 13B is a polarizer-including layer formed of a protective layer 56a, a first polarizer 57, and a protective layer 56b. In the case of FIG. 13B, it can be said that the protective layer 56a and the protective layer 56b are provided so as to interpose a stack of the first polarizer 57 and the second polarizer 58, or a polarizer-including layer formed of the protective layer 56a and the first polarizer 57, and a polarizer-including layer formed of the second polarizer 58 and the protective layer 56b. FIG. 13B is an example where a stack of polarizers in FIG. 13A is formed so that the polarizers are directly in contact with each other and not interposing a protective layer between them, which has an advantage in that stacked polarizer-including layers which are polarizing means can be thinned, and reduces cost and simplifies a process since the number of protective layers to be stacked may be small. In FIG. 13B, an absorption axis of the first polarizer 57 and that of the second polarizer 58 are parallel to each other, and the first polarizer 57 and the second polarizer 58 are stacked in a parallel nicol state. Further, a value of an extinction coefficient of the absorption axis of the first polarizer 57 is different from that of the second polarizer 58.

FIG. 13C is an example where polarizers are stacked with one protective layer interposed therebetween, and it is a structure that is like a mix of the structures in FIG. 13A and FIG. 13B. FIG. 13C is a polarizer-including layer formed of a protective layer 60a, a first polarizer 61, a protective layer 60b, a second polarizer 62, and a protective layer 60c. Thus, a structure where a protective layer and a polarizer are alternately stacked may be employed. Further, in the invention, a polarizer has a film form; therefore, it can also be referred to as a polarizing film or a polarizing layer. In FIG. 13C, the first polarizer 61 and the second polarizer 62 are stacked with absorption axes thereof in a parallel nicol state. In addition, the first polarizer 61 has a different wavelength distribution of an extinction coefficient of the absorption axis from that of the second polarizer 62.

Although an example in which two polarizers are stacked is shown in FIGS. 13A to 13C, three or more polarizers may be stacked, and a way of providing a protective layer is not limited to those of FIGS. 13A to 13C. The stacked polarizer-including layers of FIG. 13B may be stacked over the stacked polarizer-including layers of FIG. 13A. In the case of a polarizer that deteriorates easily due to moisture or temperature change in accordance with a material of the polarizer, the polarizer can be protected by being covered with the protective layer as shown in FIG. 13A. Therefore, reliability can be improved. In the case where polarizers are provided with a layer including a display element interposed therebetween as shown in FIGS. 1A and 1B, a stacked structure of a polarizer on a viewing side and a stacked structure of a polarizer on a side opposite to the viewing side, interposing the display element may be similar to or different from each other. Thus, a stacked structure of stacked polarizers can be appropriately set depending on characteristics of a polarizer or a function desired for a display device. For example, in Embodiment Mode 1, the polarizer-including layers 103 and 104 and the polarizer-including layers 105 and 106 form stacks of polarizer-including layers respectively, and the structures of Embodiment Mode 1 may be any of the structures of FIGS. 13A to 13C. Alternatively, different stacked structures may be employed: one of the structures of Embodiment Mode 1 is the structure of FIG. 13A, and the other is the structure of FIG. 13B.

Further, in a stack of polarizer-including layers, an adhesive layer may be provided in order to bond protective layers and polarizers to each other respectively, and the protective layer to the polarizer, whereby the protective layers and the polarizers are stacked with the adhesive layer interposed therebetween. In this case, the adhesive layer is required to have a light-transmissive property similarly to the protective layer. A retardation plate may be provided by being stacked with the polarizer. The retardation plate may be provided to have a structure in which a retardation film between a pair of protective layers is stacked with the polarizer with a single or a plurality of protective layers interposed threrebetween. Alternatively, the retardation plate may be directly stacked with the polarizer to have a structure in which the protective layer, the retardation film, the polarizer, and the protective layer are stacked in this order. For example, when the protective layer 56a is arranged on a light-transmissive substrate side in FIG. 13B, a structure may be employed, in which the retardation film is provided between the protective layer 56a and the polarizer 57 and a retardation film is provided between the light-transmissive substrate and the polarizer. Furthermore, as a surface protective layer, for example, a much stronger protective film or the like may be provided over the protective layer 50d, and an antireflective film for preventing reflection of outside light on a screen surface or an antidazzle film for preventing glare and dazzle of a screen may be provided over the protective layer 50d. In attaching the polarizer-including layer (the polarizing plate) to the substrate, an acrylic-based adhesive layer or the like can be used.

The polarizer only allows light vibrating in a constant direction pass through and absorbs other light. A uniaxially-stretched resin film to which a dichromatic pigment is adsorbed and oriented can be used. As the resin, PVA (polyvinyl alcohol) can be used. PVA has high transparency and intensity, and can be easily attached to TAC (triacetyl cellulose) that is used as a protective layer (also referred to as a protective film because of its shape). As the pigment, an iodine-based pigment and a dye-based pigment can be used. For example, in a case of an iodine-based pigment, iodine having high dichroism is adsorbed as a high ion to a PVA resin film and stretched in a boric acid aqueous solution, whereby the iodine is arranged as a chain polymer, and a polarizer shows a high polarizing characteristic. On the other hand, a dye-based pigment in which dye having high dichroism is used instead of iodine has superiority in heat resistance and durability.

The protective layer reinforces intensity of the polarizer and prevents deterioration due to a temperature and moisture. As the protective layer, a film of TAC (triacetyl cellulose), COP (cyclic olefin polymer-based), PC (polycarbonate), or the like can be used. TAC has transparency, low birefringence, and superiority in an adhesive property to PVA that is used for the polarizer. COP is a resin film having superiority in heat resistance, moisture proof, and durability. Further, iodine-based pigment and dye-system pigment may be mixed to be used.

For example, a structure where an adhesive layer, TAC (triacetylcellulose) which is a protective layer, a mixed layer of PVA (polyvinyl alcohol) which is a polarizer and iodine, and TAC which is a protective layer are sequentially stacked from the substrate side can be used for a polarizer-including layer. Polarization degree can be controlled by the mixed layer of PVA (polyvinyl alcohol) and iodine. Alternatively, an inorganic material may be used as a polarizer. Further, a polarizer-including layer (polarizing plate) may also be referred to as a polarizing film due to its shape.

This embodiment mode can be implemented in combination with each of the above embodiment modes.

Embodiment Mode 4

In this embodiment mode, description is made of a liquid crystal display device which includes a pair of stacks of polarzier including layers, in which each polarzier including layer has a different wavelength distribution of extinction coefficient of an absorption axis, and which has a structure where an absorption axis of a stack of polarizers on one side of a display element and an absorption axis of a stack of polarizers on the other side of the display element are deviated from a cross nicol state.

Figure 16A:
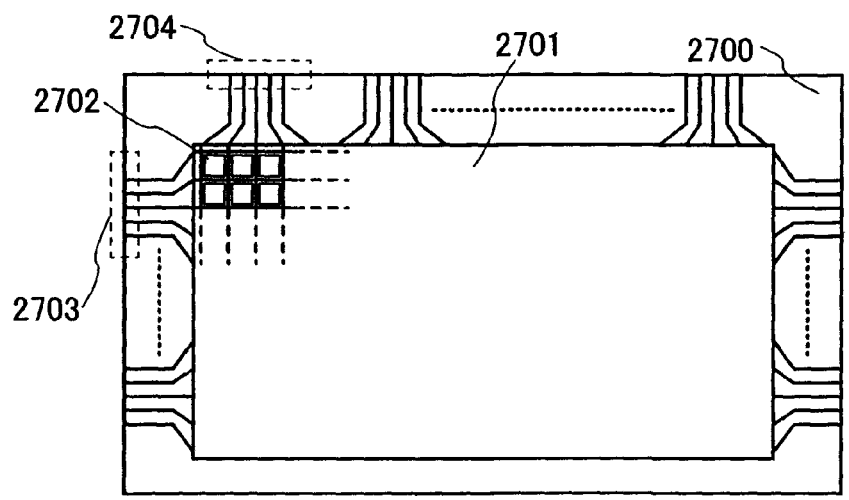
FIGS. 16A to 16C are top plan views each showing a display device of the invention.

FIG. 16A is a top view showing a structure of a display panel of the invention, in which a pixel portion 2701 in which pixels 2702 are arranged in matrix, a scan line input terminal 2703, and a signal line input terminal 2704 are formed over a substrate 2700 having an insulating surface. The number of pixels may be set according to various standards: the number of pixels of XGA for RGB full-color display may be 1024×768×3 (RGB), that of UXGA for RGB full-color display may be 1600×1200×3 (RGB), and that corresponding to a full-speck high vision for RGB full-color display may be 1920×1080×3 (RGB).

Scan lines extended from the scan line input terminal 2703 intersects with signal lines extended from the signal line input terminal 2704, whereby the pixels 2702 are arranged in matrix. Each pixel in the pixel portion 2701 is provided with a switching element and a pixel electrode layer connected to the switching element. A typical example of the switching element is a TFT. A gate electrode layer side of the TFT is connected to the scan line, and a source or drain side thereof is connected to the signal line, whereby each pixel can be controlled independently by a signal inputted from outside.

Figure 17A:
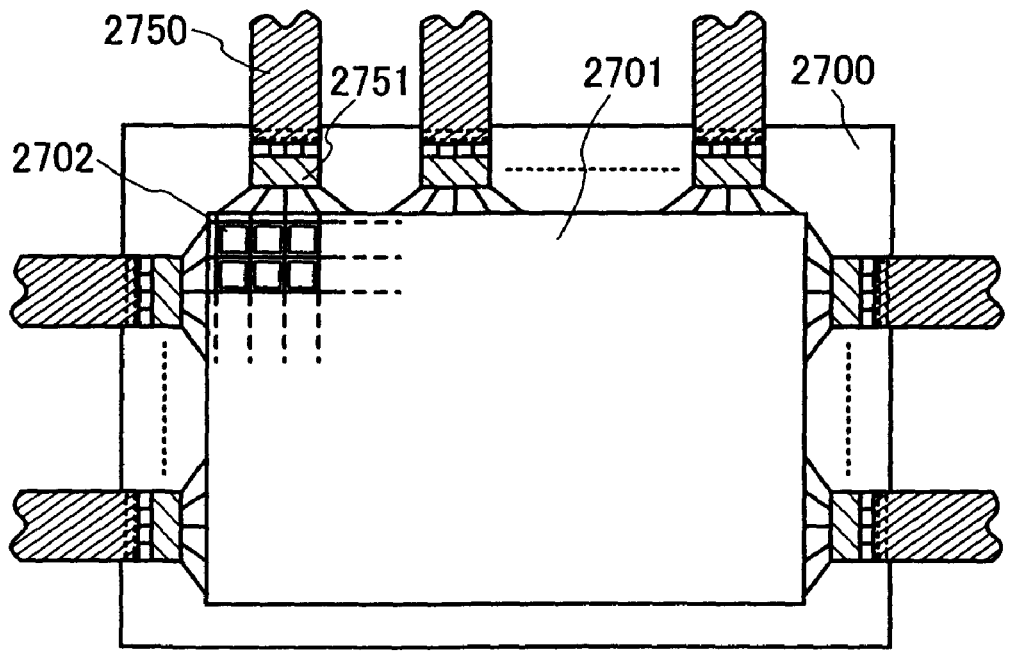
FIGS. 17A and 17B are cross sectional views each showing a display device of the invention.
Figure 17B:
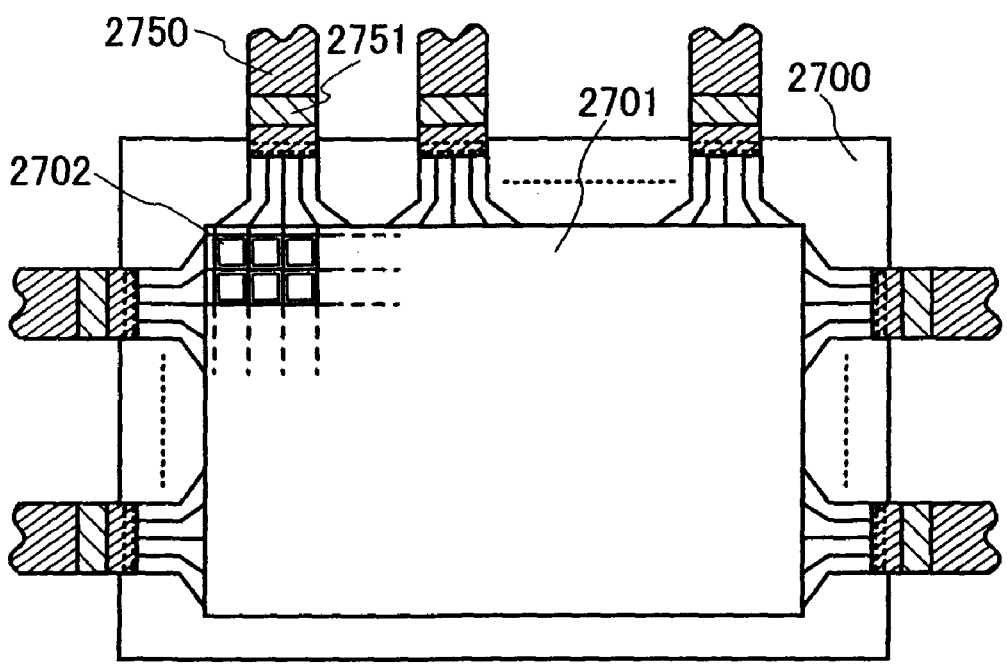

FIG. 16A shows a structure of the display panel in which signals inputted to a scan line and a signal line are controlled by an external driver circuit. Alternatively, driver ICs 2751 may be mounted on the substrate 2700 by COG (Chip on Glass) as shown in FIG. 17A. Alternatively, the driver ICs may be mounted by TAB (Tape Automated Bonding) as shown in FIG. 17B. The driver ICs may be ones formed over a single crystalline semiconductor substrate or may be circuits that are formed using a TFT over a glass substrate. In FIGS. 17A and 17B, each driver IC 2751 is connected to an FPC (Flexible printed circuit) 2750.

Figure 16B:
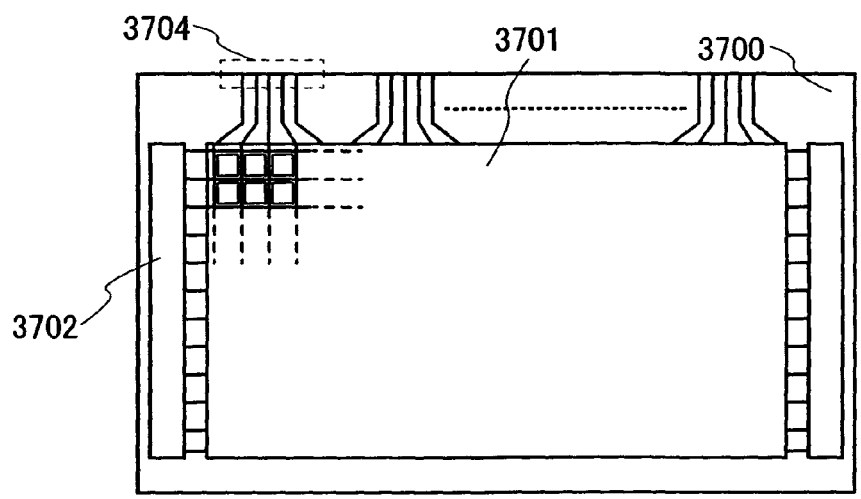
Figure 16C:
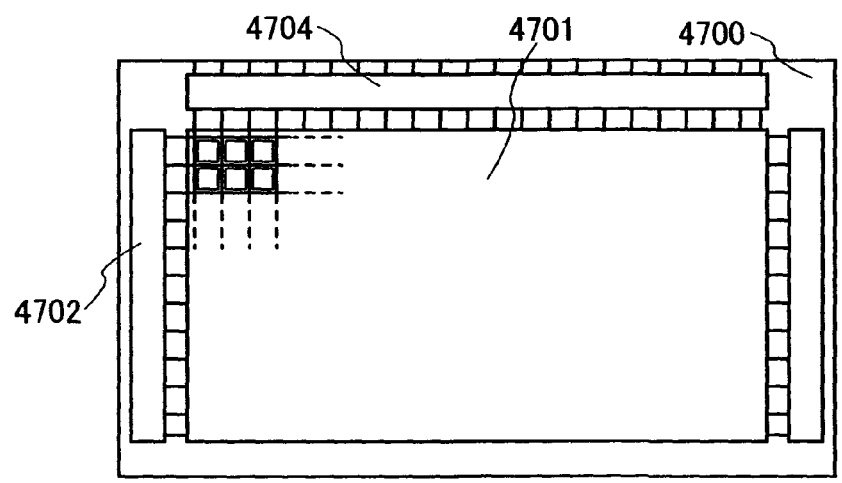

Further, in the case where a TFT provided in a pixel is formed using a semiconductor having crystallinity, a scan line driver circuit 3702 can also be formed over a substrate 3700 as shown in FIG. 16B. In FIG. 16B, a pixel portion 3701 connected to a signal line input terminal 3704 is controlled by an external driver circuit similarly to that in FIG. 16A. In a case where a TFT provided in a pixel is formed using a polycrystalline (microcrystalline) semiconductor, a single crystalline semiconductor, or the like with high mobility, a pixel portion 4701, a scan line driver circuit 4702, and a signal line driver circuit 4704 can be formed over a substrate 4700 as shown in FIG. 16C.

FIG. 14A is a top view of a liquid crystal display device that has stacked polarizer-including layer, and FIG. 14B is a cross-sectional view taken along a line C-D of FIG. 14A.

As shown in FIG. 14A, a pixel region 606, and a driver circuit region 608a and a driver circuit region 608b which are a scan line driver circuit are sealed with a sealing material 692 between a substrate 600 and a counter substrate 695. A driver circuit region 607 formed by an IC driver, which is a signal line driver circuit, is provided over the substrate 600. The pixel region 606 is provided with a transistor 622 and a capacitor 623, and the driver circuit region 608b is provided with a driver circuit including a transistor 620 and a transistor 621. An insulating substrate similar to that of the above embodiment mode can be applied to the substrate 600. There is a concern that a substrate made from a synthetic resin has a lower allowable heat resistance temperature as compared to other substrates; however, it can be employed by displacing circuits in the pixel region and the driver circuit region thereto after a manufacturing process using a substrate with higher heat resistance.

The pixel region 606 is provided with a transistor 622 as a switching element with the base film 604a and the base film 604b interposed therebetween. In this embodiment mode, a multi-gate thin film transistor (TFT) is used as the transistor 622, which includes a semiconductor layer having an impurity region serving as a source region and a drain region, a gate insulating layer, a gate insulating layer having a stacked two-layer structure, a source electrode layer, and a drain electrode layer. The source electrode layer and the drain electrode layer are electrically connected to each other and in contact with the impurity region of the semiconductor layer and the pixel electrode layer 630. A thin film transistor can be formed by many methods. For example, a crystalline semiconductor film is used as an active layer. A gate electrode is provided over the crystalline semiconductor film with a gate insulating film interposed therebetween. An impurity element can be added to the active layer by using the gate electrode. Since an impurity element is added using the gate electrode in this manner, a mask for adding the impurity element is not required to be formed. The gate electrode may have a single layer structure or a stacked-layer structure. An impurity region can be formed as a high concentration impurity region and a low concentration impurity region by controlling the concentration thereof. Such a thin film transistor having a low concentration impurity region is referred to as an LDD (Lightly Doped Drain) structure. The low concentration impurity region can be formed so as to overlap the gate electrode. Such a thin film transistor is referred to as a GOLD (Gate Overlapped LDD) structure. The polarity of a thin film transistor is an n-type as phosphorus (P) or the like is used for an impurity region thereof. In the case of forming a p-type TFT, boron (B) or the like may be added. After that, insulating films 611 and 612 covering a gate electrode and the like is formed. A dangling bond in the crystalline semiconductor film can be terminated by hydrogen elements mixed in the insulating film 611 (and the insulating film 612).

Further, in order to enhance flatness, insulating films 615 and 616 may be formed as interlayer insulating films. For the insulating films 615 and 616, an organic material, an inorganic material, or a stacked structure of them can be used. For example, the insulating films 615 and 616 can be formed of a material selected from substances including an inorganic insulating material such as silicon oxide, silicon nitride, silicon oxynitride, silicon nitride oxide, aluminum nitride, aluminum oxynitride, aluminum nitride oxide containing a larger amount of nitrogen than that of oxygen, aluminum oxide, diamond-like carbon (DLC), polysilazane, a nitrogen-containing carbon (CN), PSG (phosphosilicate glass), BPSG (borophosphosilicate glass), and an alumina. Alternatively, an organic insulating material may be used; an organic material may be either photosensitive or non-photosensitive; and polyimide, acrylic, polyamide, polyimide amide, a resist, benzocyclobutene, a siloxane resin, or the like can be used. Note that the siloxane resin corresponds to a resin having Si—O—Si bonds. Siloxane has a skeleton structure formed from a bond of silicon (Si) and oxygen (0). As a substituent, an organic group containing at least hydrogen (for example, an alkyl group or aromatic hydrocarbon) is used. A fluoro group may be used as the substituent. Alternatively, an organic group containing at least hydrogen and a fluoro group may be used as the substituent.

Further, a pixel region and a driver circuit region can be formed over one substrate by using a crystalline semiconductor film. In that case, transistors in the pixel region and transistors in the driver circuit region 608b are formed at the same time. The transistors used for the driver circuit region 608b form a CMOS circuit. Each thin film transistor which forms the CMOS circuit has the GOLD structure; however, the LDD structure can be used instead of the GOLD structure like the transistor 622.

A structure of the thin film transistor in the pixel region is not limited to this embodiment mode, and the thin film transistor in the pixel region may have a single-gate structure in which one channel formation region is formed, a double-gate structure in which two channel formation regions are formed, or a triple-gate structure in which three channel formation regions are formed. A thin film transistor in the peripheral driver circuit region may have a single-gate structure, a double-gate structure, or a triple-gate structure.

Further, a thin film transistor is not limited to the manufacturing method shown in this embodiment mode. The thin film transistor may have a top-gate structure (such as a forward staggered type), a bottom-gate structure (such as an inversely staggered type), a dual-gate structure in which two gate electrode layers are arranged above and below a channel formation region with a gate insulating film interposed therebetween, or some other structures.

Next, an insulating layer 631 referred to as an orientation film is formed by a printing method or a droplet discharging method so as to cover the pixel electrode layer 630 and the insulating film 616. The insulating layer 631 can be selectively formed when a screen printing method or an off-set printing method is used. After that, rubbing treatment is performed. When a liquid crystal mode, for example, a VA mode is employed, rubbing treatment is not performed in some cases. An insulating layer 633 serving as an orientation film is similar to the insulating layer 631. Subsequently, the sealing material 692 is formed in the peripheral region where the pixel is formed by the droplet discharging method.

Then, the counter substrate 695 provided with the insulating layer 633 serving as an orientation film, a conductive layer 634 serving as a counter electrode, and a colored layer 635 serving as a color filter are attached to the substrate 600 that is a TFT substrate with a spacer 637 therebetween. A liquid crystal layer 632 is provided in a space between the substrate 600 and the counter substrate 695. Thereafter, a first polarizer-including layer 641 and a second polarizer-including layer 642 are stacked and provided outside the counter substrate 695. A third polarizer-including layer 643 and a fourth polarizer-including layer 644 are provided on a side opposite to a surface of the substrate 600 having an element. The polarizer-including layer can be provided over the substrate with an adhesive layer. Filler may be mixed into the sealing material, and the counter substrate 695 may be provided with a shielding film (black matrix) or the like. In a case of full-color display of the liquid crystal display device, the color filter or the like may be formed from a material emitting a red color (R), a green color (G), and blue color (B). In a case of mono-color display, the colored layer is removed, or the color filter or the like may be formed from a material emitting at least one color.

It is to be noted that the color filter is not provided in some cases when a light emitting diode (LED) of RGB and the like are arranged in a backlight, and a successive additive color mixing method (field sequential method) in which color display is performed by time division. The black matrix is preferably provided so as to overlap with the transistor and the CMOS circuit since it reduces reflection of external light due to the wiring of the transistor and the CMOS circuit. Note that the black matrix may be provided so as to overlap with the capacitor. This is because reflection by a metal film constituting the capacitor can be prevented.

As a method for forming the liquid crystal layer, a dispenser method (dripping method) or an injecting method may be used in which liquid crystal is injected using a capillary phenomenon after the substrate 600 having an element and the counter substrate 695 are attached to each other. A dripping method may be applied when using a large substrate to which it is difficult to apply an injecting method is used.

A spacer may be provided in such a way that particles each having a size of several μ meters are sprayed. In this embodiment mode, a method is employed, in which a resin film is formed over the entire surface of the substrate and the resin film is subjected to an etching process. The material of such a spacer is applied by a spinner and then light-exposed and developed so that a predetermined pattern is formed. Moreover, the spacer is heated at 150 to 200° C. in a clean oven or the like to be hardened. The thus manufactured spacer can have various shapes depending on the conditions of light exposure and development processes. It is preferable that the spacer has a columnar shape with a flat top so that mechanical intensity of the liquid crystal display device can be secured when the counter substrate is attached. The shape can be conic, pyramidal, or the like without any particular limitation.

Subsequently, a terminal electrode layer 678 electrically connected to the pixel region is provided with an FPC 694 which is a wiring board for connection, with an anisotropic conductive layer 696 interposed therebetween. The FPC 694 functions to transmit external signals or potential. Through the above steps, a liquid crystal display device having a display function can be manufactured.

A wiring included in the transistor, the gate electrode layer, the pixel electrode layer 630, and the conductive layer 634 that is a counter electrode can be formed from a material selected from indium tin oxide (ITO), indium zinc oxide (IZO) in which zinc oxide (ZnO) is mixed with indium oxide, a conductive material in which indium oxide is mixed with silicon oxide ($SiO_2$), organoindium, organotin, indium oxide containing tungsten oxide, indium zinc oxide containing tungsten oxide, indium oxide containing titanium oxide, or indium tin oxide containing titanium oxide; a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), or copper (Cu); an alloy of such metals; or metal nitride thereof.

The substrate 600 is provided with a stack of the third polarizer-including layer 643 and the fourth polarizer-including layer 644. The counter substrate 695 is provided with a stack of the first polarizer-including layer 641 and the second polarizer-including layer 642. The third polarizer-including layer 643 and the fourth polarizer-including layer 644, which are provided on the backlight side, are arranged so as to be in a parallel nicol state. The first polarizer-including layer 641 and the second polarizer-including layer 642, which are provided on the viewing side, are also arranged so as to be in a parallel nicol state. On the other hand, an absorption axis of the third polarizer-including layer 643 and the fourth polarizer-including layer 644 and an absorption axis of the first polarizer-including layer 641 and the second polarizer-including layer 642 deviate from a cross nicol state. In the invention, absorption axes of a pair of stacks of polarizers which interpose a display element deviate from a cross nicol state. Accordingly, the contrast ratio can be enhanced. In this embodiment mode, wavelength distributions of extinction coefficients of the absorption axes of the first polarizer-including layer 641 and the second polarizer-including layer 642 are different from each other. Similarly, wavelength distributions of extinction coefficients of the absorption axes of the third polarizer-including layer 643 and the fourth polarizer-including layer 644 are different from each other.

The stack of the third polarizer-including layer 643 and the fourth polarizer-including layer 644 and the stack of the first polarizer-including layer 641 and the second polarizer-including layer 642 are bonded to the substrate 600 and the counter substrate 695, respectively. A retardation plate may be stacked to be interposed between the stack of polarizer-including layers and the substrate.

A pair of stacks of polarizers in a parallel nicol state each having a different wavelength distribution of extinction coefficient are provided and absorption axes thereof deviate from a cross nicol state in such a display device, whereby the contrast ratio can be enhanced. In the invention, a plurality of polarizers can be made a polarizer having a staked-layer structure, which is different from a structure in which a thickness of a polarizer is simply increased. Therefore, the contrast ratio can be enhanced as compared to that of the structure in which a thickness is simply increased.

This embodiment mode can be implemented in free combination with the above embodiment mode.

Embodiment Mode 5

In this embodiment mode, description is made of a liquid crystal dislay device using a thin film transitsor which has a stack of polarizer-including layers each having a different wavelength distribution of extinction coefficient of an absorption axis, and an amorphous semiconductor film which is not included in the above embodiment modes.

Figure 15:
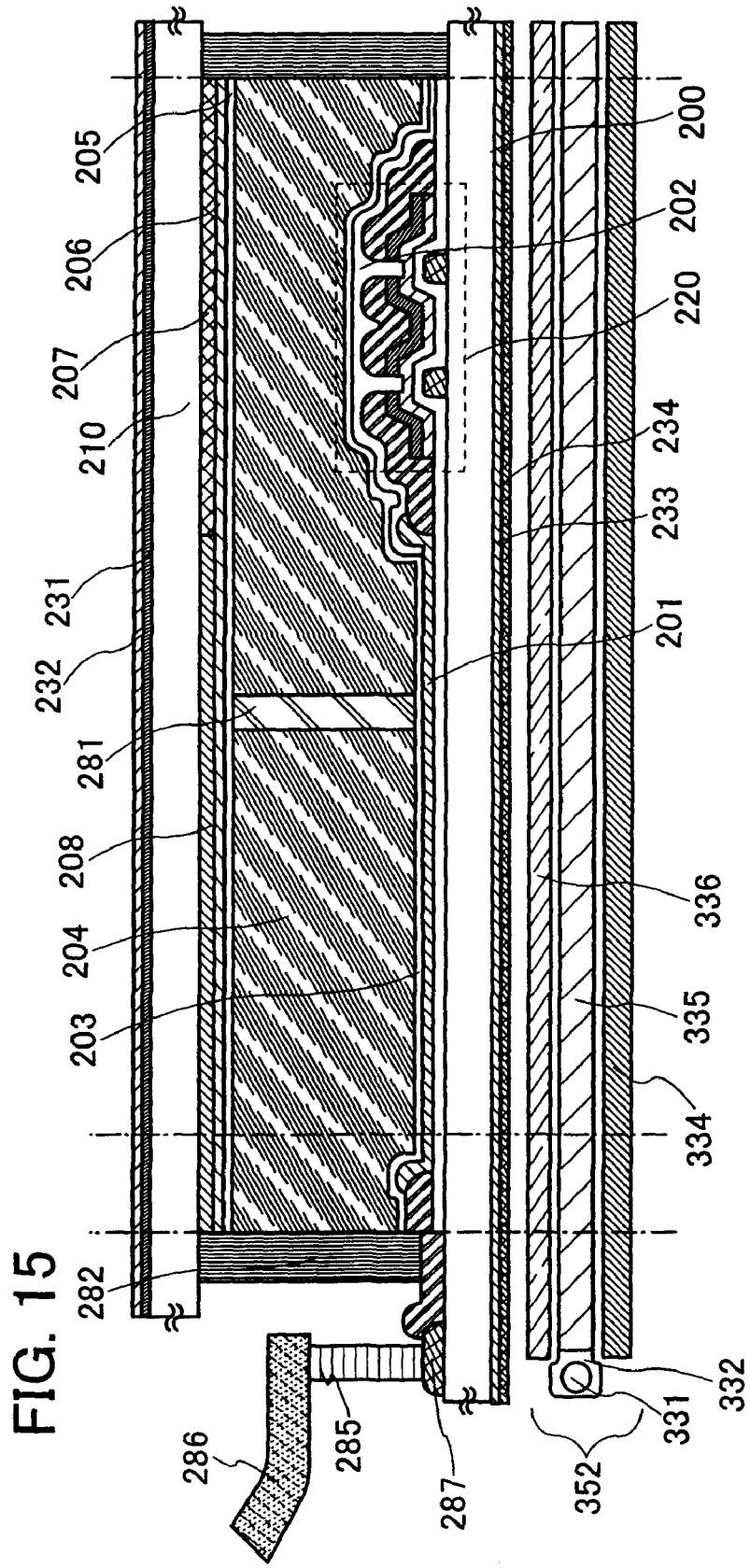
FIG. 15 is a cross sectional view showing a display device of the invention.

A display device shown in FIG. 15 is provided with a transistor 220 which is an inversely staggered thin film transistor, a pixel electrode layer 201, an insulating layer 202, an insulating layer 203, a liquid crystal layer 204, a spacer 281, an insulating layer 205, a counter substrate 206, a color filter 208, a black matrix 207, a counter substrate 210, a first polarizer-including layer 231, a second polarizer-including layer 232, a third polarizer-including layer 233, and a fourth polarizer-including layer 234 in a pixel region; and a sealing material 282, a terminal electrode layer 287, an anisotropic conductive layer 285, and an FPC 286 in a sealing region, over a substrate 200.

A gate electrode layer, a source electrode layer, and a drain electrode layer of the transistor 220 that is the inversely staggered thin film transistor manufactured in this embodiment mode are formed by a droplet discharging method. The droplet discharging method is a method for discharging a composition containing a liquid conductive material and solidifying the composition by drying and baking, whereby a conductive layer and an electrode layer are formed. By discharging a composition containing an insulating material and solidifying it by drying and baking, an insulating layer can also be formed. By the droplet discharging method, a constituent of a display device such as a conductive layer or an insulating layer can be selectively formed, which can simplify the manufacturing steps and reduce the loss of materials; therefore, a display device can be manufactured at low cost with high productivity.

In this embodiment mode, an amorphous semiconductor is used as a semiconductor layer, and a semiconductor layer having one conductivity may be formed as necessary. In this embodiment mode, a semiconductor layer and an n-type amorphous semiconductor layer as a semiconductor layer having one conductivity are stacked. Further, an NMOS structure of an n-channel thin film transistor in which an N-type semiconductor layer is formed, a PMOS structure of a p-channel thin film transistor in which a P-type semiconductor layer is formed, or a CMOS structure of an n-channel thin film transistor and a p-channel thin film transistor can be manufactured.

In addition, in order to impart conductivity, an element imparting conductivity is added by doping and forming an impurity region in the semiconductor layer, thereby forming an n-channel thin film transistor and a p-channel thin film transistor. Instead of forming the N-type semiconductor layer, conductivity may be imparted to the semiconductor layer by performing plasma treatment with a $PH_3$ gas.

In this embodiment mode, the transistor 220 is an n-channel inversely staggered thin film transistor. Furthermore, a channel protective-type inversely staggered thin film transistor provided with a protective layer over a channel region of the semiconductor layer can be used.

A semiconductor can be formed using an organic semiconductor material by a vapor deposition method, a printing method, a spray method, a spin coating method, a droplet discharging method, a dispenser method, or the like. In this case, since the etching step is not always necessary, the number of steps can be reduced. As an organic semiconductor, a low molecular material such as pentacene, a high molecular material, an organic pigment, a conductive high molecular material, or the like can be used. A π-conjugated high molecular material with the skeleton including conjugated double bonds is desirably used as an organic semiconductor material in the invention. Typically, a soluble high molecular material such as polythiophene, polyfluorene, poly(3-alkyl thiophene), or a polythiophene derivative can be used.

Next, description is made of a structure of a backlight unit 352. The backlight unit 352 includes a cold cathode tube, a hot cathode tube, a light emitting diode, an inorganic EL, or an organic EL as a light source 331 which emits fluorescence, a lamp reflector 332 to effectively lead fluorescence to a light guide plate 335, the light guide plate 335 by which light is totally reflected and led to the entire surface, a diffusing plate 336 for reducing variations in brightness, and a reflective plate 334 for reusing light leaked under the light guide plate 335.

A control circuit for adjusting the luminance of the light source 331 is connected to the backlight unit 352. The luminance of the light source 331 can be controlled by a signal supplied from the control circuit.

A stack of the third polarizer-including layer 233 and the fourth polarizer-including layer 234 are provided between the substrate 200 and the backlight unit 352. The counter substrate 210 is provided with a stack of the first polarizer-including layer 231 and the second polarizer-including layer 232. The third polarizer-including layer 233 and the fourth polarizer-including layer 234, which are provided on the backlight side, are arranged so as to be in a parallel nicol state. The first polarizer-including layer 231 and the second polarizer-including layer 232, which are provided on the viewing side, are also arranged so as to be in a parallel nicol state. On the other hand, an absorption axis of the third polarizer-including layer 233 and the fourth polarizer-including layer 234 and an absorption axis of the first polarizer-including layer 231 and the second polarizer-including layer 232 deviate from a cross nicol state. In the invention, absorption axes of a pair of stacks of polarizers which interpose a display element deviate from a cross nicol state. Accordingly, the contrast ratio can be enhanced. In this embodiment mode, wavelength distributions of extinction coefficients of the absorption axes of the first polarizer-including layer 231 and the second polarizer-including layer 232 are different from each other. Similarly, wavelength distributions of extinction coefficients of the absorption axes of the third polarizer-including layer 233 and the fourth polarizer-including layer 234 are different from each other.

The stack of the third polarizer-including layer 233 and the fourth polarizer-including layer 234 and the stack of the first polarizer-including layer 231 and the second polarizer-including layer 232 are bonded to the substrate 200 and the counter substrate 210, respectively. A retardation plate may be stacked to be interposed between the stack of polarizer-including layers and the substrate.

A pair of stacks of polarizers in a parallel nicol state, in which each polarizer has a different wavelength distribution of extinction coefficient, are provided and absorption axes thereof deviate from a cross nicol state in such a display device, whereby the contrast ratio can be enhanced. In the invention, a plurality of polarizers can be made a polarizer having a staked-layer structure, which is different from a structure in which a thickness of a polarizer is simply increased. Therefore, the contrast ratio can be enhanced as compared to that of the structure in which a thickness is simply increased.

This embodiment mode can be implemented in free combination with the above embodiment mode.

Embodiment Mode 6

In this embodiment mode, description is made of operation of each circuit or the like included in a display device.

Figure 24A:
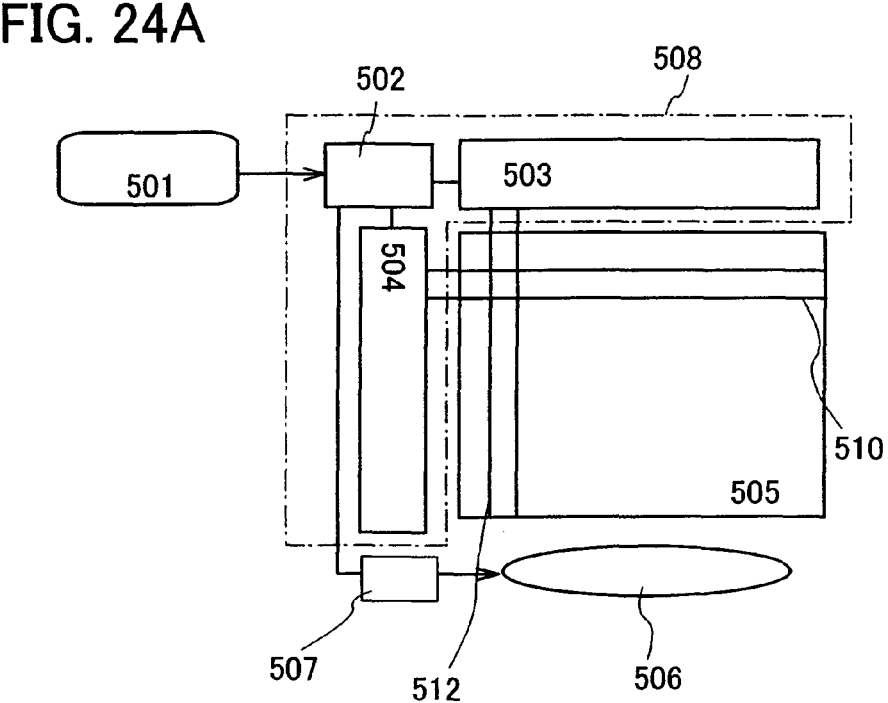
FIGS. 24A to 24C are block diagrams each showing a display device of the invention.
Figure 24B:
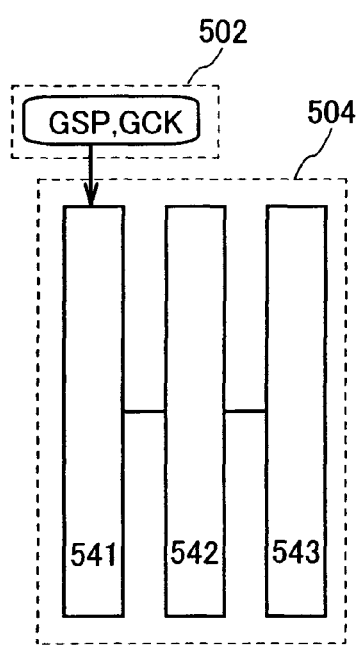
Figure 24C:
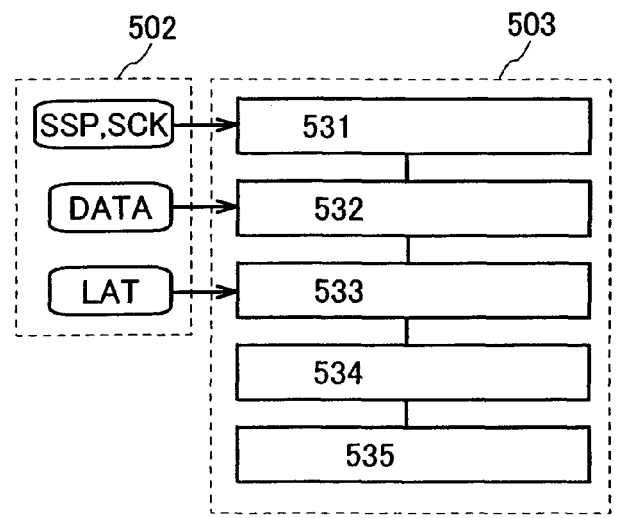

FIGS. 24A to 24C show system block diagrams of the pixel portion 505 and the driver circuit portion 508 included in a display device.

In the pixel portion 505, a plurality of pixels are included and switching elements are provided in an intersecting region of the signal line 512 and the scan line 510. By the switching elements, application of a voltage to control tilt of liquid crystal molecules can be controlled. Such a structure where switching elements are provided in respective intersecting regions is referred to as an active type. The pixel portion of the invention is not limited to such an active type, and may have a passive type structure instead. The passive type can be formed by a simple process since each pixel does not have a switching element.

The driver circuit portion 508 includes the control circuit 502, the signal line driver circuit 503, and the scan line driver circuit 504. The control circuit 502 to which a video signal 501 is inputted has a function to control a gray scale in accordance with display contents of the pixel portion 505. Therefore, the control circuit 502 inputs a generated signal to the signal line driver circuit 503 and the scan line driver circuit 504. When a switching element is selected through the scan line 510 in accordance with the scan line driver circuit 504, a voltage is applied to a pixel electrode in a selected intersecting region. The value of this voltage is determined in accordance with a signal inputted from the signal line driver circuit 503 through the signal line 512.

Further, in the control circuit 502, a signal to control power supplied to a lighting unit 506 is generated, and the signal is inputted to the power source 507 of the lighting unit 506. The backlight unit described in the aforementioned embodiment mode can be used for the lighting unit. Note that a front light and a backlight are both lighting units. A front light is a plate-like light unit including an illuminant and a light guiding body, which is attached to a front side of a pixel portion and illuminates the whole place. By such a lighting unit, the pixel portion can be evenly illuminated with low power consumption.

Further, as shown in FIG. 24B, the scan line driver circuit 504 includes circuits which function as a shift register 541, a level shifter 542, and a buffer 543. Signals such as a gate start pulse (GSP) and a gate clock signal (GCK) are inputted to the shift register 541. It is to be noted that the scan line driver circuit of the invention is not limited to the structure shown in FIG. 24B.

Further, as shown in FIG. 24C, the signal line driver circuit 503 includes circuits which function as a shift register 531, a first latch 532, a second latch 533, a level shifter 534, and a buffer 535. The circuit functioning as the buffer 535 is a circuit having a function to amplify a weak signal and includes an operational amplifier and the like. Signals such as start pulses (SSP) are inputted to the level shifter 534, and data (DATA) such as video signals is inputted to the first latch 532. Latch (LAT) signals can be temporarily held in the second latch 533, and are inputted to the pixel portion 505 concurrently. This operation is referred to as line sequential driving. Therefore, a pixel which performs not line sequential driving but dot sequential driving does not require the second latch. Thus, the signal line driver circuit of the invention is not limited to the structure shown in FIG. 24C.

The signal line driver circuit 503, the scan line driver circuit 504, and the pixel portion 505 as described above can be formed of semiconductor elements provided over one substrate. The semiconductor element can be formed using a thin film transistor provided over a glass substrate. In this case, a crystalline semiconductor film may be applied to a semiconductor element (see Embodiment Mode 5). A crystalline semiconductor film can form a circuit included in a driver circuit portion since it has high electrical characteristics, in particular, mobility. Further, the signal line driver circuit 503 and the scan line driver circuit 504 may be mounted on a substrate by using an IC (Integrated Circuit) chip. In this case, an amorphous semiconductor film can be used for a semiconductor element in a pixel portion (see Embodiment Mode 5).

In such a display device, a pair of stacks of polarizers in a parallel nicol state, in which each polarizer has a different wavelength distribution of extinction coefficient, are arranged so as to be deviated from a cross nicol state with a display element interposed therebetween, whereby the contrast ratio can be enhanced. In other words, the contrast ratio of light from a lighting unit controlled by a control circuit can be enhanced.

Embodiment Mode 7

In this embodiment mode, a structure of a backlight is described. A backlight is provided in a display device as a backlight unit having a light source, and the light source of the backlight unit is surrounded by a reflection plate for scattering light efficiently.

Figure 19A:
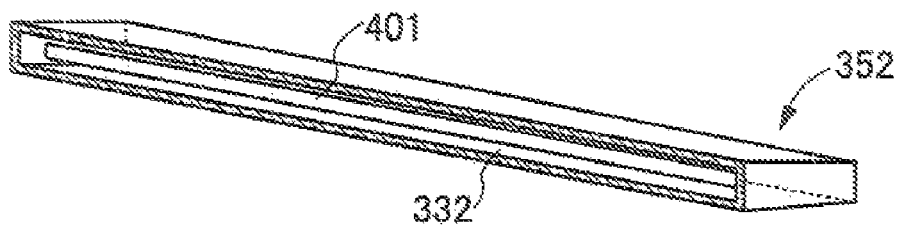
FIGS. 19A to 19D are cross sectional views each showing an irradiation unit included in a liquid crystal display device of the invention.

As shown in FIG. 19A, a cold cathode tube 401 can be used as a light source of a backlight unit 352. In addition, the lamp reflector 332 can be provided to reflect light from the cold cathode tube 401 efficiently. The cold cathode tube 401 is often used for a large display device for intensity of luminance from the cold cathode tube. Therefore, such a backlight unit having a cold cathode tube can be used for a display of a personal computer.

Figure 19B:
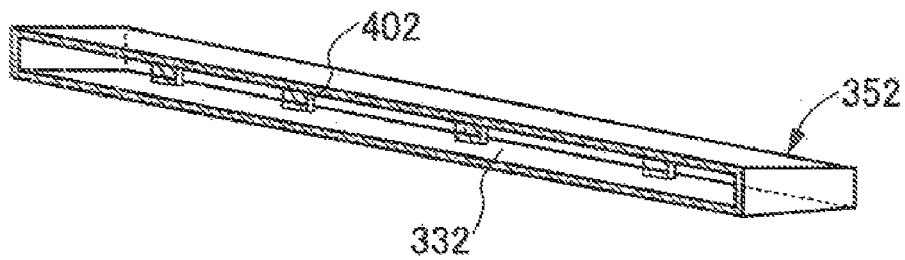

As shown in FIG. 19B, a light emitting diode (LED) 402 can be used as light sources of the backlight unit 352. For example, light emitting diodes (W) 402 which emit white light are provided at predetermined intervals. In addition, the lamp reflector 332 can be provided to reflect light from the light emitting diode (W) 402 efficiently.

Figure 19C:
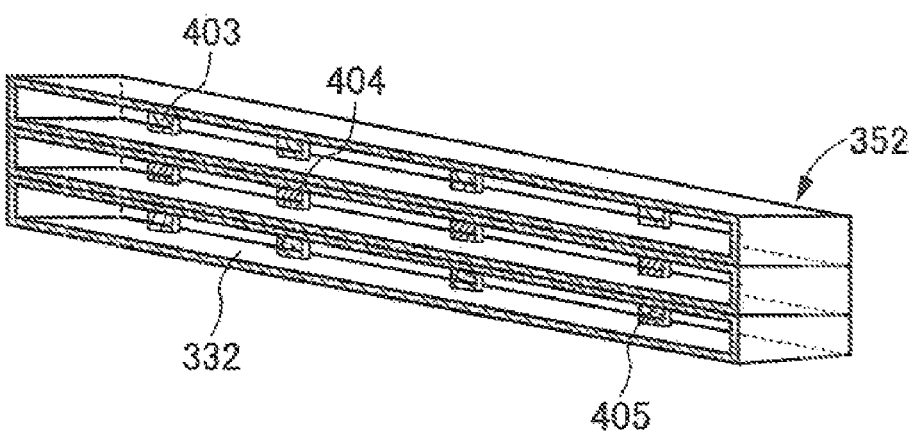

As shown in FIG. 19C, light emitting diodes (LED) 403, 404, and 405 of RGB colors can be used as light sources of the backlight unit 352. By using the light emitting diodes (LED) 403, 404, and 405 of RGB colors, higher color reproducibility can be realized in comparison with the case where only the light emitting diode (W) 402 which emits white light is used. In addition, the lamp reflector 332 can be provided to reflect light from the light emitting diodes efficiently.

Figure 19D:
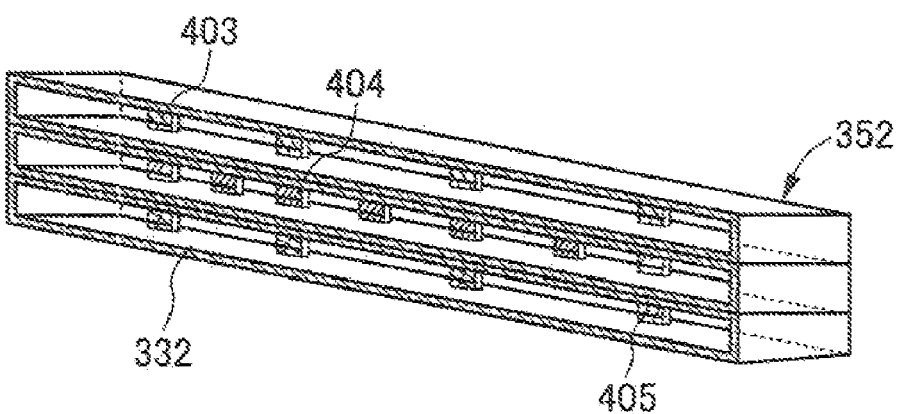

Further, as shown in FIG. 19D, in the case where the light emitting diodes (LED) 403, 404, and 405 of RGB colors respectively are used as light sources, the number and arrangement thereof are not necessarily the same. For example, a plurality of light emitting diodes of a color having low emission intensity may be arranged.

Further, the light emitting diode 402 which emits white light may be used in combination with the light emitting diodes (LED) 403, 404, and 405 of RGB colors.

Note that in the case of having the light emitting diodes of RGB colors, the light emitting diodes sequentially emit light in accordance with time by applying a field sequential mode, thereby color display can be performed.

Using a light emitting diode is suitable for a large display device since luminance is high. Further, purity of RGB colors is high; therefore, a light emitting diode has excellent color reproducibility as compared to a cold cathode tube. In addition, an area required for arrangement can be reduced; therefore, a narrower frame can be achieved when a light emitting diode is applied to a small display device.

Further, a light source is not necessarily provided as the backlight unit shown in FIGS. 19A to 19D. For example, in the case where a backlight having a diode is mounted on a large display device, the light emitting diode can be arranged on a back side of the substrate. In this case, the light emitting diodes of RGB colors can be sequentially arranged at predetermined intervals. Depending on arrangement of the light emitting diodes, color reproducibility can be enhanced.

In a display device using such a backlight, a pair of stacks of polarizer-including layers in a parallel nicol state, in which each polarizer-including layer has a different wavelength distribution of extinction coefficient, are arranged so that absorption axes thereof deviate from a cross nicol state with a display element interposed therebetween, whereby an image with a high contrast ratio can be produced. A backlight having a light emitting diode is particularly suitable for a large display device, and a high-quality image can be produced even in a dark place by enhancing the contrast ratio of the large display device.

Embodiment Mode 8

Driving methods of a liquid crystal for a liquid crystal display device include a vertical electric field method where a voltage is applied perpendicularly to a substrate and a horizontal electric field method where a voltage is applied parallel to a substrate. The structure in which stacks of polarizer-including layers are arranged so that absorption axes thereof deviate from each other can be applied to both the vertical electric field method and the horizontal electric field method. In this embodiment mode, description is made of various kinds of liquid crystal modes which can be applied to a display device where a pair of stacks of polarizer-including layers in a parallel nicol state are arranged so as to be deviated from a cross nicol state.

First, FIGS. 10(A1) and 10(A2) are pattern diagrams each showing a liquid crystal display device of a TN mode.

Similarly to the above embodiment modes, the layer 100 including a display element is interposed between the first substrate 101 and the second substrate 102, which are arranged so as to face each other. The first polarizer-including layer 103 and the second polarizer-including layer 104 having different wavelength distributions of extinction coefficients are arranged so as to be in a parallel nicol state on the first substrate 101 side. The third polarizer-including layer 105 and the fourth polarizer-including layer 106 having different wavelength distributions of extinction coefficients are arranged so as to be in a parallel nicol state on the second substrate 102 side. Note that an absorption axis of the first polarizer-including layer 103 and the second polarizer-including layer 104 and an absorption axis of the third polarizer-including layer 105 and the fourth polarizer-including layer 106 deviate from a cross nicol state.

Although not shown, a backlight or the like is arranged outside of the fourth polarizer-including layer 106. A first electrode 108 and a second electrode 109 are provided over the first substrate 101 and the second substrate 102, respectively. The first electrode 108 on a side opposite to the backlight, in other words, on the viewing side, is formed so as to have at least a light transmitting property.

In the case where a liquid crystal display device having such a structure is in a normally white mode, when a voltage is applied to the first electrode 108 and the second electrode 109 (referred to as a vertical electric field method), black display is performed as shown in FIG. 10(A1). At that time, liquid crystal molecules are aligned vertically. Thus, light from the backlight cannot pass through the substrate, which leads to black display.

As shown in FIG. 10(A2), when a voltage is not applied between the first electrode 108 and the second electrode 109, white display is performed. At that time, liquid crystal molecules are aligned horizontally while twisted on a plane surface. As a result, light from the backlight can pass through a pair of stacks of polarizer-including layers in a parallel nicol state, in which each polarizer-including layer has a different wavelength distribution of extinction coefficient, which are arranged so as to be deviated from a cross nicol state, whereby a predetermined image is displayed.

By providing a color filter at that time, full-color display can be performed. The color filter can be provided on either the first substrate 101 side or the second substrate 102 side.

A known liquid crystal material may be used for a TN mode.

FIG. 10B1 is a pattern diagram showing a liquid crystal display device of a VA mode. A VA mode is a mode where liquid crystal molecules are aligned perpendicularly to a substrate when there is no electric field.

Similarly to FIGS. 10(A1) and 10(A2), the first electrode 108 and the second electrode 109 are provided over the first substrate 101 and the second substrate 102, respectively. In addition, the first electrode 108 on a side opposite the backlight, in other words, on the viewing side, is formed so as to have at least a light-transmissive property. The first polarizer-including layer 103 and the second polarizer-including layer 104 having different wavelength distributions of extinction coefficients are arranged so as to be in a parallel nicol state. Further, on the second substrate 102 side, the third polarizer-including layer 105 and the fourth polarizer-including layer 106 having different wavelength distributions of extinction coefficients are arranged so as to be in a parallel nicol state. Note that an absorption axis of the first polarizer-including layer 103 and the second polarizer-including layer 104 and an absorption axis of the third polarizer-including layer 105 and the fourth polarizer-including layer 106 deviate from a cross nicol state.

When a voltage is applied to the first electrode 108 and the second electrode 109 (vertical electric field method) in a liquid crystal display device having such a structure, white display is performed, which means an on state, as shown in FIG. 10(B1). At that time, liquid crystal molecules are aligned horizontally. Thus, light from the backlight can pass through a pair of stacks of polarizer-including layers in a parallel nicol state, in which each polarizer-including layer has a different wavelength distribution of extinction coefficient, which are arranged so as to be deviated from a cross nicol state, whereby a predetermined image is displayed. By providing a color filter at that time, full-color display can be performed. The color filter can be provided on either the first substrate 101 side or the second substrate 102 side.

As shown in FIG. 10B2, when a voltage is not applied to the first electrode 108 and the second electrode 109, black display is performed, which means an off state. At that time, liquid crystal molecules are aligned vertically. Thus, light from the backlight cannot pass through the substrate, which leads to black display.

Thus, in an off state, liquid crystal molecules are perpendicular to a substrate, thereby black display is performed. Meanwhile, in an on state, liquid crystal molecules are parallel to a substrate, thereby white display is performed. In an off state, liquid crystal molecules rise; therefore, polarized light from the backlight passes through a cell without being affected by birefringence of the liquid crystal molecules, and can be completely blocked by a polarizer-including layer on a counter substrate side. Accordingly, further enhancement of contrast is anticipated by arranging at least one stack of a pair of stacks of polarizer-including layers so as to be in a parallel nicol state with a deviation.

FIGS. 10(C1) and 10(C2) show an example in which a stack of polarizer-including layers of the invention is applied to an MVA mode where alignment of liquid crystal is divided. The MVA mode is a method in which one pixel is divided into plural pieces and the viewing angle dependency of each portion is compensated by that of other portions. As shown in FIG. 10(C1), projections 158 and 159, the cross section of each of which is a triangle shape, are provided on a first electrode 108 and a second electrode 109, respectively. When a voltage is applied to the first electrode 108 and the second electrode 109 (vertical electric field method), white display is performed, which means an on state, as shown in FIG. 10(C1). At that time, liquid crystal molecules are aligned so as to tilt toward the projections 158 and 159. Thus, light from the backlight can pass through a pair of stacks of polarizer-including layers in a parallel nicol state, in which each polarizer-including layer has a different wavelength distribution of extinction coefficient, which are arranged so as to be deviated from a cross nicol state, whereby predetermined image display can be performed. By providing a color filter at that time, full-color display can be performed. The color filter can be provided on either the first substrate 101 side or the second substrate 102 side.

As shown in FIG. 10C2, when a voltage is not applied to the first electrode 108 and the second electrode 109, black display is performed, which means an off state. At that time, liquid crystal molecules are aligned vertically. Thus, light from the backlight cannot pass through the substrate, which leads to black display.

Figure 41A:
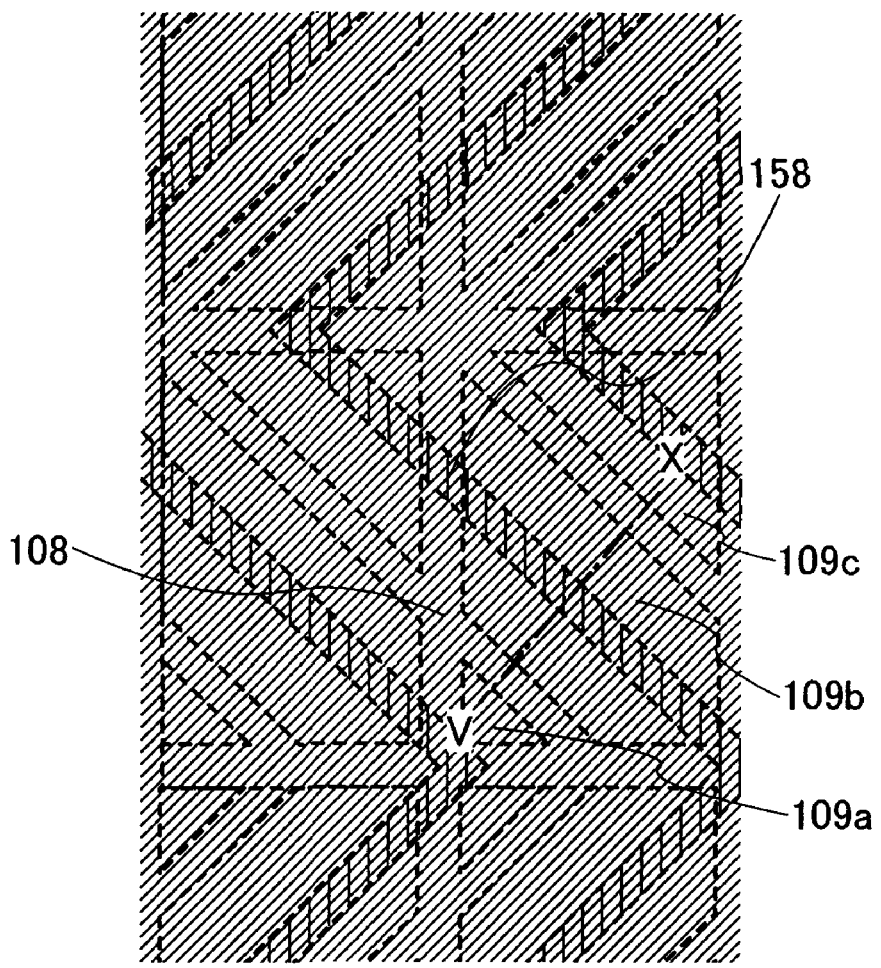
FIGS. 41A and 41B are a top plan view and a cross sectional view showing a dipslay device of the invention, respectively.
Figure 41B:
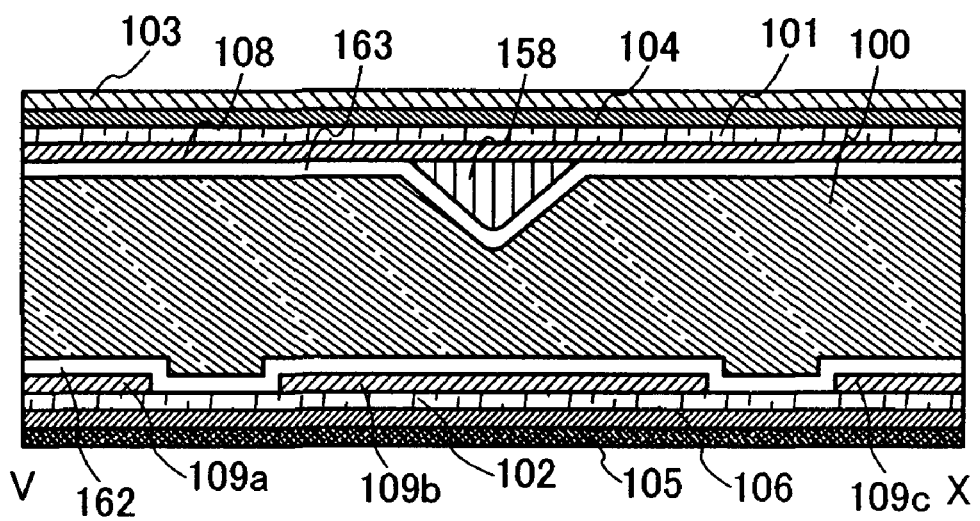

FIGS. 41A and 41B show a top plan view and a cross sectional view of another example of the MVA mode, respectively. In FIG. 41A, a second electrode is formed into a bent pattern of a boomerang shape to be second electrodes 109a, 109b, and 109c. An insulating layer 162 that is an orientation film is formed over the second electrodes 109a, 109b, and 109c. As shown in FIG. 41B, the projection 158 is formed over the first electrode 108 to have a shape corresponding to that of the second electrodes 109a, 109b, and 109c. Openings of the second electrodes 109a, 109b, and 109c serve as projections, which can move the liquid crystal molecules.

FIGS. 11A and 11B are pattern diagrams each showing a liquid crystal display device of an OCB mode. In the OCB mode, alignment of liquid crystal molecules forms a compensation state optically in a liquid crystal layer, which is referred to as a bend orientation.

Similarly to FIGS. 10(A1) to 10(C2), the first electrode 108 and the second electrode 109 are provided over the first substrate 101 and the second substrate 102, respectively. Although not shown, a backlight and the like are provided outside the fourth polarizer-including layer 106. In addition, an electrode on the side opposite to the backlight, that is, on the viewing side, which is the first electrode 108 is formed so as to have at least light-transmissive property. The first polarizer-including layer 103 and the second polarizer-including layer 104, which have different wavelength distributions of extinction coefficients, are arranged so as to be in a parallel nicol state on the first substrate 101 side. The third polarizer-including layer 105 and the fourth polarizer-including layer 106, which have different wavelength distributions of extinction coefficients, are arranged so as to be in a parallel nicol state on the second substrate 102 side. Note that an absorption axis of the first polarizer-including layer 103 and the second polarizer-including layer 104 and an absorption axis of the third polarizer-including layer 105 and the fourth polarizer-including layer 106 deviate from a cross nicol state.

When a certain on-voltage is applied to the first electrode 108 and the second electrode 109 (vertical electric field method) in a liquid crystal display device having such a structure, black display is performed as shown in FIG. 11A1. At that time, liquid crystal molecules are aligned vertically. Thus, light from the backlight cannot pass through the substrate, which leads to black display.

When a certain off-voltage is applied between the first electrode 108 and the second electrode 109, white display is performed as shown in FIG. 11(A2). At that time, liquid crystal molecules are aligned in a bent orientation. Thus, light from the backlight can pass through a pair of stacks of polarizer-including layers in a parallel nicol state, in which each polarizer-including layer has a different wavelength distribution of extinction coefficient, which are arranged so as to be deviated from a cross nicol state, whereby a predetermined image is displayed. By providing a color filter at that time, full-color display can be performed. The color filter can be provided on either the first substrate 101 side or the second substrate 102 side.

In such an OCB mode, alignment of liquid crystal molecules can be optically compensated in a liquid crystal layer; therefore, the viewing angle dependency is low. Further, with a pair of stacks of polarizer-including layers, the contrast ratio can be enhanced.

FIGS. 11B1 and 11B2 are pattern diagrams each showing a liquid crystal display device of the FLC mode and the AFLC mode.

Similarly to FIGS. 10(A1) to 10(C2), the first electrode 108 and the second electrode 109 are provided over the first substrate 101 and the second substrate 102, respectively. In addition, an electrode on the side opposite to the backlight, that is, on the viewing side, which is the first electrode 108 is formed so as to have at least light-transmissive property. The first polarizer-including layer 103 and the second polarizer-including layer 104, which have different wavelength distributions of extinction coefficients, are arranged so as to be in a parallel nicol state on the first substrate 101 side. The third polarizer-including layer 105 and the fourth polarizer-including layer 106, which have different wavelength distributions of extinction coefficients, are arranged so as to be in a parallel nicol state on the second substrate 102 side. Note that an absorption axis of the first polarizer-including layer 103 and the second polarizer-including layer 104 and an absorption axis of the third polarizer-including layer 105 and the fourth polarizer-including layer 106 deviate from a cross nicol state.

When a voltage is applied to the first electrode 108 and the second electrode 109 (referred to as vertical electric field method) in a liquid crystal display device having such a structure, white display is performed as shown in FIG. 11(B1). At that time, liquid crystal molecules are aligned horizontally in a direction deviated from a rubbing direction. As a result, light from the backlight can pass through a pair of stacks of polarizer-including layers in a parallel nicol state each having a different wavelength distribution of extinction coefficient that are arranged so as to be deviated from a cross nicol state, whereby a predetermined image is displayed.

When no voltage is applied between the first electrode 108 and the second electrode 109, black display is performed as shown in FIG. 11(B2). At that time, liquid crystal molecules are aligned horizontally along a rubbing direction. Thus, light from the backlight cannot pass through the substrate, which leads to black display.

By providing a color filter at that time, full-color display can be performed. The color filter can be provided on either the first substrate 101 side or the second substrate 102 side.

A known liquid crystal material may be used for the FLC mode and the AFLC mode.

FIGS. 12A1 and 12A2 are pattern diagrams each showing a liquid crystal display device of an IPS mode. In the IPS mode, liquid crystal molecules are rotated constantly on a plane surface with respect to a substrate, and a horizontal electric field method where electrodes are provided only on one substrate side is employed.

In the IPS mode, a liquid crystal is controlled by a pair of electrodes provided over one substrate. Therefore, a pair of electrodes 150 and 151 are provided over the second substrate 102. The pair of electrodes 150 and 151 preferably have a light-transmissive property. The first polarizer-including layer 103 and the second polarizer-including layer 104, which have different wavelength distributions of extinction coefficients, are arranged so as to be in a parallel nicol state on the first substrate 101 side. The third polarizer-including layer 105 and the fourth polarizer-including layer 106, which have different wavelength distributions of extinction coefficients, are arranged so as to be in a parallel nicol state on the second substrate 102 side. Note that an absorption axis of the first polarizer-including layer 103 and the second polarizer-including layer 104 and an absorption axis of the third polarizer-including layer 105 and the fourth polarizer-including layer 106 deviate from a cross nicol state.

When a voltage is applied to the pair of electrodes 150 and 151 in a liquid crystal display device having such a structure, liquid crystal molecules are aligned along an electric flux line deviated from a rubbing direction so that white display is performed, which means an on state, as shown in FIG. 12(A1). Thus, light from the backlight can pass through a pair of stacks of polarizer-including layers in a parallel nicol state, in which each polarizer-including layer has a different wavelength distribution of extinction coefficient, which are arranged so as to be deviated from a cross nicol state, whereby a predetermined image is displayed.

By providing a color filter at that time, full-color display can be performed. The color filter can be provided on either the first substrate 101 side or the second substrate 102 side.

When a voltage is not applied between the pair of electrodes 150 and 151, black display is performed, which means an off state, as shown in FIG. 12(A2). At that time, liquid crystal molecules are aligned along a rubbing direction. Thus, light from the backlight cannot pass through the substrate, which leads to black display.

Figure 8A:
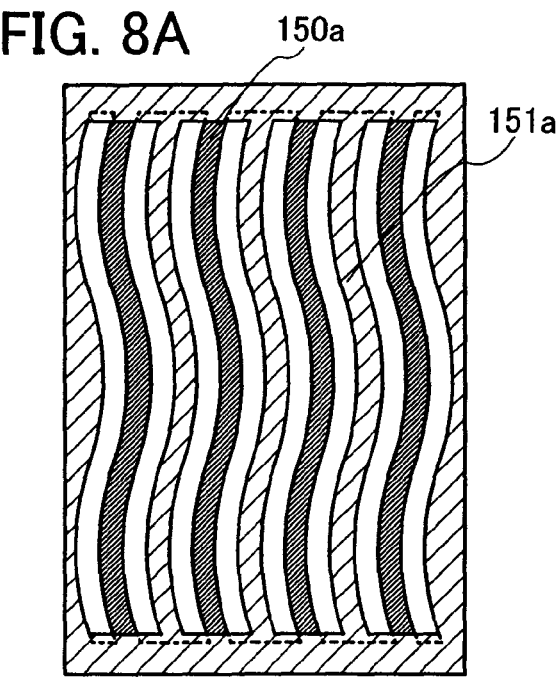
FIGS. 8A to 8D are top plan views each showing a display device of the invention.
Figure 8B:
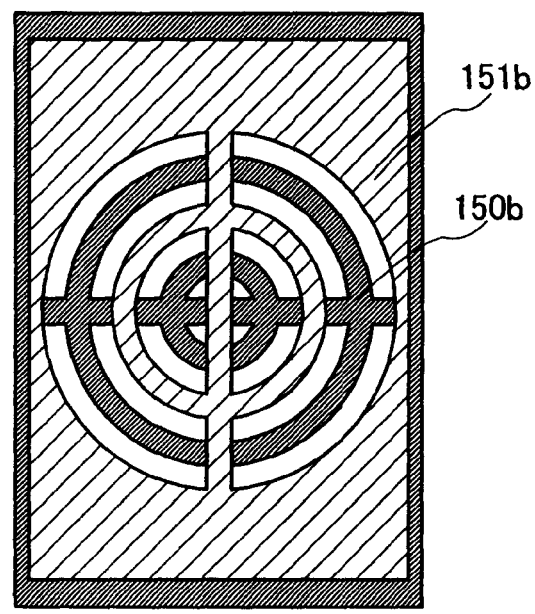
Figure 8C:
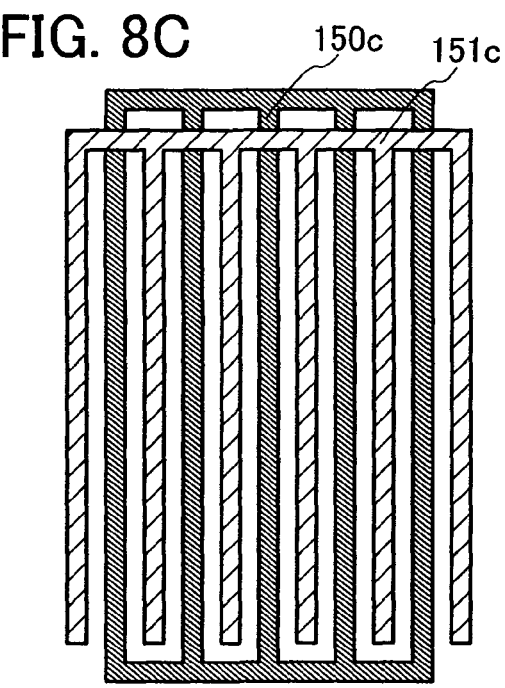
Figure 8D:
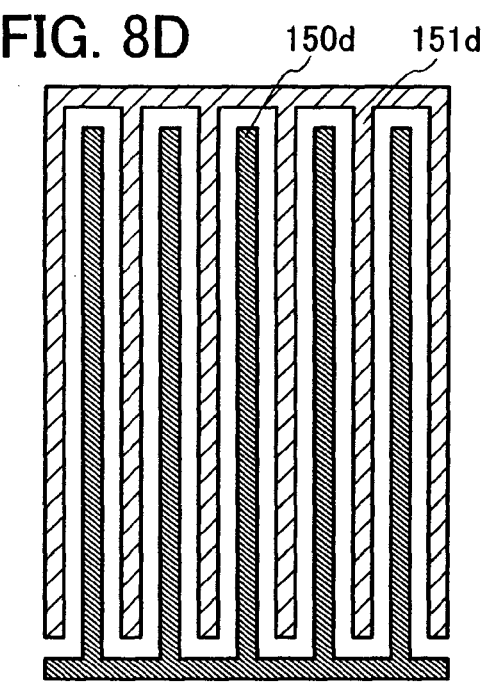

FIGS. 8A to 8D each show an example of the pair of electrodes 150 and 151 that can be used in the IPS mode. As shown in top plan views of FIGS. 8A to 8D, the pair of electrodes 150 and 151 are alternately formed. In FIG. 8A, electrodes 150a and 151a have an undulating wave shape. In FIG. 8B, electrodes 150b and 151b have a concentric circular opening. In FIG. 8C, electrodes 150c and 151c have a comb-like shape and are partially overlapped with each other. In FIG. 8D, electrodes 150d and 151d have a comb-like shape in which the electrodes are engaged with each other.

An FFS mode can be used instead of the IPS mode. The FFS mode has a structure in which a pair of electrodes are not formed in the same layer, and an electrode 153 is formed over an electrode 152 with an insulating film interposed therebetween as shown in FIGS. 12(B1) and 12(B2), while the pair of electrodes are formed on the same surface in the IPS mode.

When a voltage is applied to the pair of electrodes 152 and 153 in a liquid crystal display device having such a structure, white display is performed, which means an on state, as shown in FIG. 12(B1). Thus, light from a backlight can pass through a pair of stacks of polarizer-including layers in a parallel nicol state, in which each polarizer-including layer has a different wavelength distribution of extinction coefficient, which are arranged so as to be deviated from a cross nicol state, whereby a predetermined image is displayed.

By providing a color filter at that time, full-color display can be performed. The color filter can be provided on either the first substrate 101 side or the second substrate 102 side.

When a voltage is not applied between the pair of electrodes 152 and 153, black display is performed, which means an off state, as shown in FIG. 12(B2). At that time, liquid crystal molecules are aligned horizontally and rotated in a plane. Thus, light from the backlight cannot pass through the substrate, which leads to black display.

Figure 9A:
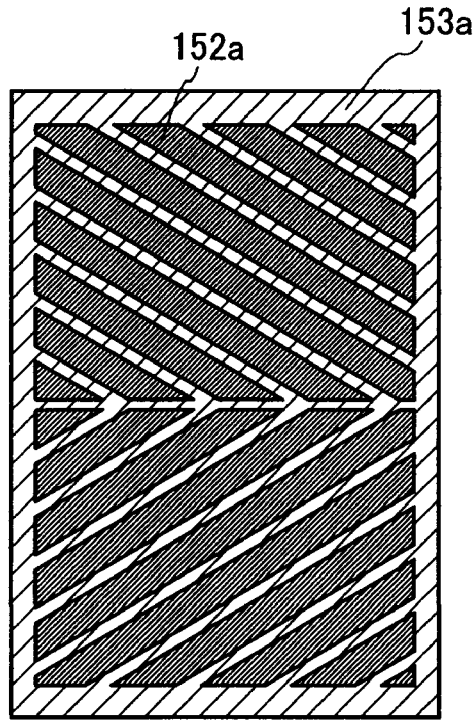
FIGS. 9A to 9D are top plan views each showing a display device of the invention.
Figure 9B:
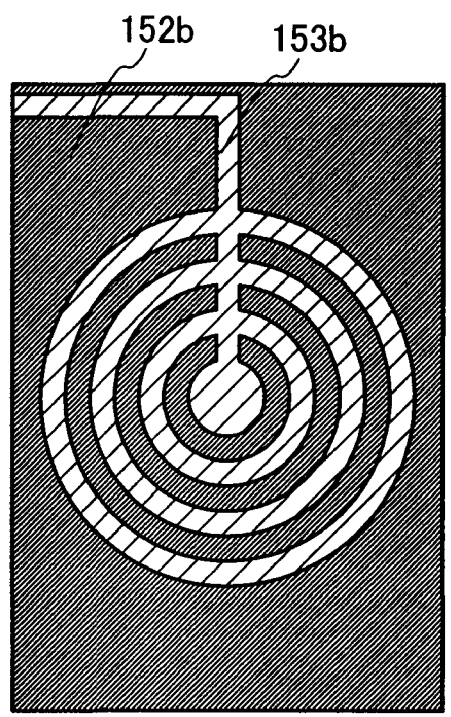
Figure 9C:
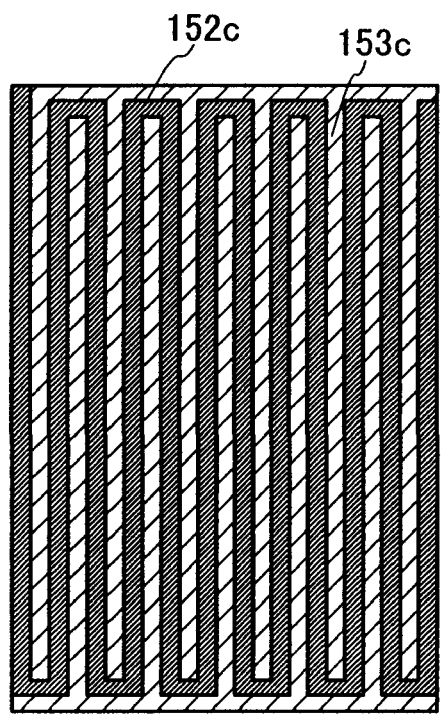
Figure 9D:
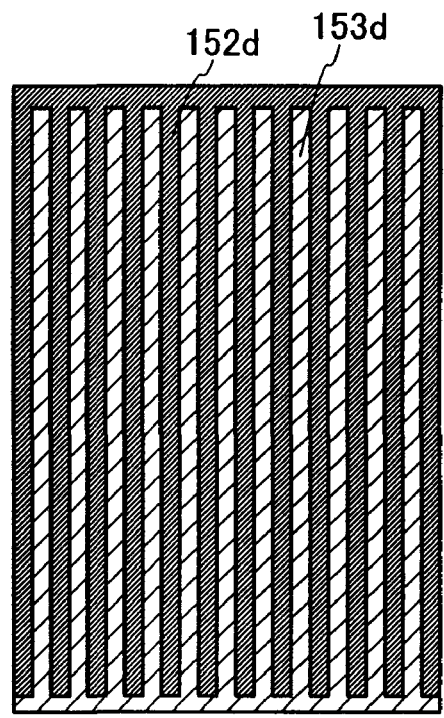

FIGS. 9A to 9D each show an example of the pair of electrodes 152 and 153 that can be used in the FFS mode. As shown in top plan views of FIGS. 9A to 9D, the electrodes 153 that are formed into various patterns are formed over the electrodes 152. In FIG. 9A, an electrode 153a over an electrode 152a has a bent boomerang shape. In FIG. 9B, an electrode 153b over an electrode 152b has a concentric circular shape. In FIG. 9C, an electrode 153c over an electrode 152c has a comb-like shape in which the electrodes are engaged with each other. In FIG. 9D, an electrode 153d over an electrode 152d has a comb-like shape.

A known liquid crystal material may be used for the IPS mode and the FFS mode.

A structure of the invention, in which a pair of stacks of polarizer-including layers in a parallel nicol state, in which each polarizer-including layer has a different wavelength distribution of extinction coefficient, are arranged so that absorption axes thereof deviate from a cross nicol state with a display element interposed therebetween, is applied to a liquid crystal display device of a vertical electric field method, whereby display with an even higher contrast ratio can be performed. Such a vertical electric field method is suitable for a display device for a computer that is used in a room or for a large television.

In a case where the invention is applied to a liquid crystal display device of the horizontal electric field method, display with a wider viewing angle and a higher contrast ratio can be realized. The horizontal electric field method is preferable for a portable display device and television device.

In addition, the invention can be applied to a liquid crystal display device of a rotation mode, a scattering mode, or a birefringence mode, and a display device in which a polarizer-including layer is provided on a side and another side of a substrate.

This embodiment mode can be implemented in free combination with any of the above embodiment modes.

Embodiment Mode 9

Description is made of this embodiment mode with reference to FIGS. 18A and 18B. FIGS. 18A and 18B show an example of forming a display device (a liquid crystal display module) using a TFT substrate 2600 that is manufactured by applying the invention.

FIG. 18A shows an example of a liquid crystal display module where the TFT substrate 2600 and a counter substrate 2601 are bonded with a sealing material 2602, and a pixel portion 2603 including a TFT or the like and a liquid crystal layer 2604 are provided therebetween so as to form a display region. A colored layer 2605 is necessary for color display. In a case of an RGB method, colored layers corresponding to each color of red, green, and blue are provided to correspond to each pixel. A first polarizer-including layer 2606 and a second polarizer-including layer 2626 are arranged outside the counter substrate 2601. A third polarizer-including layer 2607, a fourth polarizer-including layer 2627, and a diffuser plate 2613 are arranged outside the TFT substrate 2600. A light source includes a cold cathode tube 2610 and a reflector plate 2611. A circuit board 2612 is connected to the TFT substrate 2600 through a flexible wiring board 2609. External circuits such as a control circuit and a power source circuit are incorporated.

A stack of the third polarizer-including layer 2607 and the fourth polarizer-including layer 2627, which have different wavelength distributions of extinction coefficients of absorption axes, is provided between the TFT substrate 2600 and a backlight that is the light source. The counter substrate 2601 is provided with a stack of the first polarizer-including layer 2606 and the second polarizer-including layer 2626 which have different wavelength distributions of extinction coefficients of absorption axes. The third polarizer-including layer 2607 and the fourth polarizer-including layer 2627, which are provided on the backlight side, are arranged so as to be in a parallel nicol state. The first polarizer-including layer 2606 and the second polarizer-including layer 2626, which are provided on the viewing side, are also arranged so that their absorption axes are in a parallel nicol state. On the other hand, an absorption axis of the third polarizer-including layer 2607 and the fourth polarizer-including layer 2627 and an absorption axis of the first polarizer-including layer 2606 and the second polarizer-including layer 2626 deviate from a cross nicol state. In the invention, absorption axes of a pair of stacks of polarizers which interpose a display element deviate from a cross nicol state. Accordingly, the contrast ratio can be enhanced.

The stack of the third polarizer-including layer 2607 and the fourth polarizer-including layer 2627 is bonded to the TFT substrate 2600. The stack of the first polarizer-including layer 2606 and the second polarizer-including layer 2626 are bonded to the counter substrate 2601. In addition, a retardation plate may be stacked to be interposed between the stack of polarizer-including layers and the substrate. The second polarizer-including layer 2626 on the viewing side may be subjected to a reflection preventing process, as necessary.

For the liquid crystal display module, a TN (Twisted Nematic) mode, an IPS (In-Plane-Switching) mode, an FFS (Fringe Field Switching) mode, an MVA (Multi-domain Vertical Alignment) mode, a PVA (Patterned Vertical Alignment) mode, an ASM (Axially Symmetric aligned Micro-cell) mode, an OCB (Optical Compensated Birefringence) mode, an FLC (Ferroelectric Liquid Crystal) mode, AFLC (AntiFerroelectric Liquid Crystal) mode, or the like can be used.

FIG. 18B shows an example of an FS-LCD (Field Sequential-LCD) in which an OCB mode is applied to the liquid crystal display module of FIG. 18A. The FS-LCD emits red light, green light, and blue light during one frame period and can perform color display by combining images using time division. Since each light is emitted by a light emitting diode, a cold cathode tube, or the like, a color filter is not necessary. Thus, it is not necessary to arrange color filters of the three primary colors and limit the display region of each color, and color display of all three colors can be performed in any region. On the other hand, since three colors of light are emitted during one frame period, high-speed response is required for a liquid crystal. By applying an FLC mode using an FS method, and an OCB mode to a display device of the invention, a display device or a liquid crystal television device with high performance and high image quality can be completed.

A liquid crystal layer in the OCB mode has a so-called π-cell structure. In the π-cell structure, liquid crystal molecules are oriented so that their pretilt angles are plane-symmetric along a center plane between an active matrix substrate and a counter substrate. An orientation state of a π-cell structure becomes that of sprayed orientation when a voltage is not applied between the substrates and shifts to that of bent orientation when a voltage is applied therebetween. This bent orientation leads to white display. When a voltage is applied further, liquid crystal molecules of the bent orientation get orientated perpendicular to both of the substrates so that light does not transmit through. In the OCB mode, response with about 10 times higher speed than a conventional TN mode can be realized.

Moreover, as a mode corresponding to the FS method, an SS (Surface Stabilized)-FLC or an HV (Half V)-FLC using a ferroelectric liquid crystal (FLC) capable of high-speed operation, or the like can also be used. The OCB mode uses a nematic liquid crystal having relatively low viscosity, while the HV-FLC or the SS-FLC can use a smectic liquid crystal that has a ferroelectric phase.

Moreover, rapid optical response speed of a liquid crystal display module gets higher by narrowing the cell gap of the liquid crystal display module. In addition, the rapid optical response speed can also get higher by decreasing the viscosity of the liquid crystal material. The increase in rapid optical response speed is particularly advantageous when a pixel pitch of a pixel region in a liquid crystal display module in a TN mode is less than or equal to 30 μm. Further, the increase in rapid optical response speed can be achieved by an overdrive method in which an applied voltage is set high (or low) for just a moment.

FIG. 18B shows a transmissive liquid crystal display module, in which a red light source 2910a, a green light source 2910b, and a blue light source 2910c are provided as light sources. The light sources are provided with a control portion 2912 in order to control to turn on/off the red light source 2910a, the green light source 2910b, and the blue light source 2910c. The control portion 2912 controls light emission of each color, so that light enters the liquid crystal to combine images by time division, thereby performing color display.

Thus, a pair of stacks of polarizers in a parallel nicol state, in which each polarizer has a different wavelength distribution of extinction coefficient, are provided and absorption axes thereof deviate from a cross nicol state, whereby light leakage in the absorption axis direction can be reduced. Therefore, the contrast ratio of the display device can be enhanced. A display device with high performance and high image quality can be manufactured.

This embodiment mode can be implemented in free combination with the above embodiment mode.

Embodiment Mode 10

Figure 23:
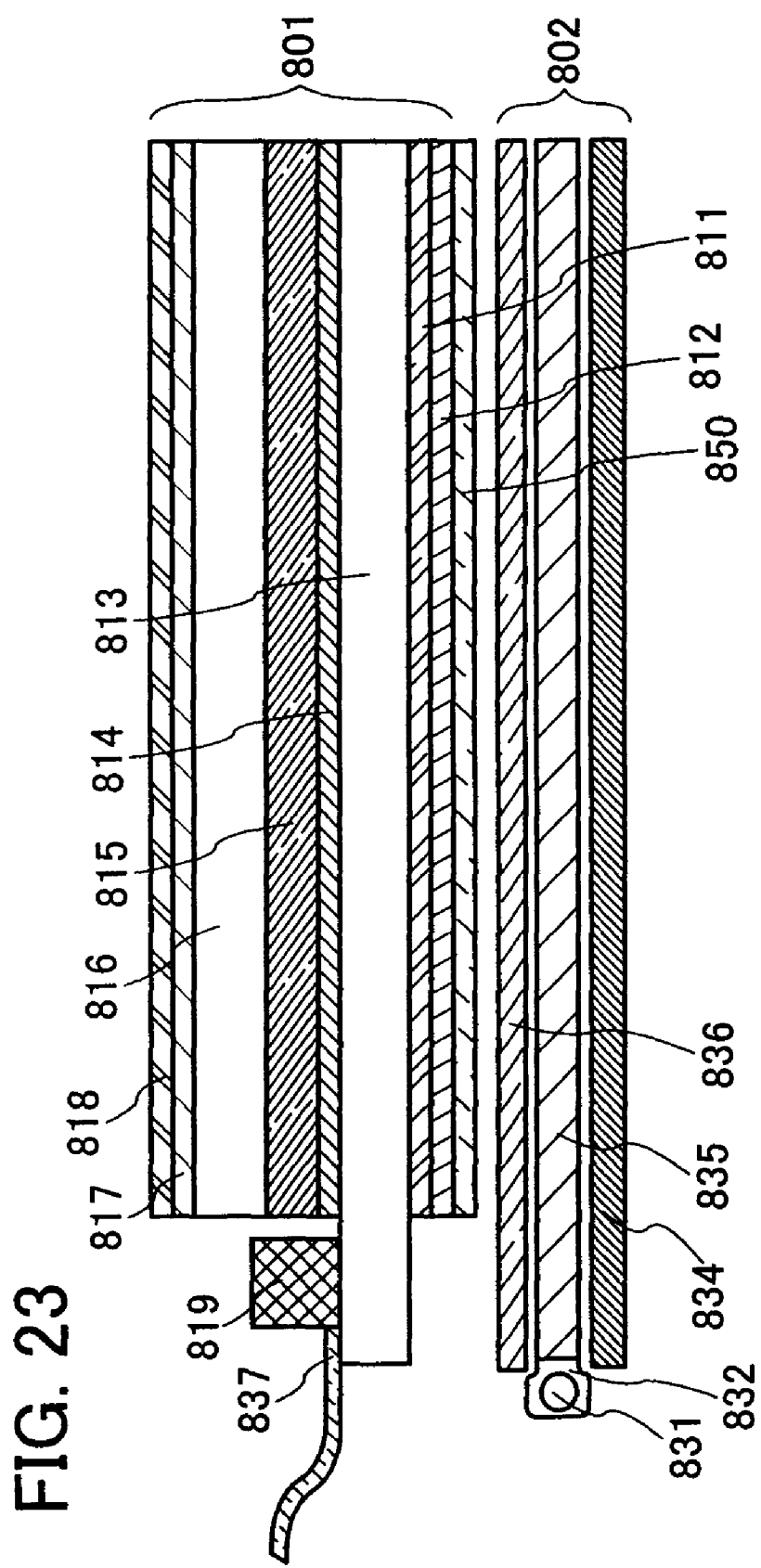
FIG. 23 is a cross sectional view showing a display device of the invention.

Description is made of this embodiment mode with reference to FIG. 23. FIG. 23 shows an example of forming a display device using a substrate 813 that is a TFT substrate manufactured by applying the invention.

FIG. 23 shows a display device portion 801 and a backlight unit 802. The display device portion 801 includes the substrate 813, a pixel portion 814 including a TFT or the like, a liquid crystal layer 815, a counter substrate 816, a first polarizer-including layer 817, a second polarizer-including layer 818, a third polarizer-including layer 811, a fourth polarizer-including layer 812, a slit (lattice) 850, a driver circuit 819, and an FPC 837. The backlight unit 802 includes a light source 831, a lamp reflector 832, a reflective plate 834, a light guide plate 835, and a light diffuser plate 836.

With the display device of the invention shown in FIG. 23, three-dimensional display can be performed without any need for special equipment such as glasses. The slit 850 with an opening that is arranged on the backlight unit side transmits light that is incident from the light source and made to be a striped shape. Then, the light is incident on the display device portion 801. This slit 850 can make parallax in both eyes of a viewer on the viewing side. The viewer sees only a pixel for the right eye with the right eye and only a pixel for the left eye with the left eye simultaneously. Therefore, the viewer can see three-dimensional display. That is, in the display device portion 801, light given a specific viewing angle by the slit 850 passes through each pixel corresponding to an image for the right eye and an image for the left eye, whereby the image for the right eye and the image for the left eye are separated into different viewing angles, and three-dimensional display is performed.

The stack of the third polarizer-including layer 811 and the fourth polarizer-including layer 812 are provided between the substrate 813 and the backlight that is the light source. The counter substrate 816 is provided with a stack of the first polarizer-including layer 817 and the second polarizer-including layer 818. The third polarizer-including layer 811 and the fourth polarizer-including layer 812, which have different wavelength distributions of extinction coefficients of absorption axes, are provided on the backlight side, are arranged so as to be in a parallel nicol state. The first polarizer-including layer 817 and the second polarizer-including layer 818, which have different wavelength distributions of extinction coefficients of absorption axes, are provided on the viewing side, are also arranged so as to be in a parallel nicol state. On the other hand, an absorption axis of the third polarizer-including layer 811 and the fourth polarizer-including layer 812 and an absorption axis of the first polarizer-including layer 817 and the second polarizer-including layer 818 deviate from a cross nicol state. In the invention, absorption axes of a pair of stacks of polarizers, in which each polarizer has a different wavelength distribution of extinction coefficient and which interpose a display element, deviate from a cross nicol state. Accordingly, even slight light leakage can be prevented and the contrast ratio can be further improved.

An electronic device such as a television device or a mobile phone is manufactured with the use of a display device of the invention, whereby an electronic device with high performance and high image quality, which can perform three-dimension display, can be provided.

Embodiment Mode 11

Figure 20:
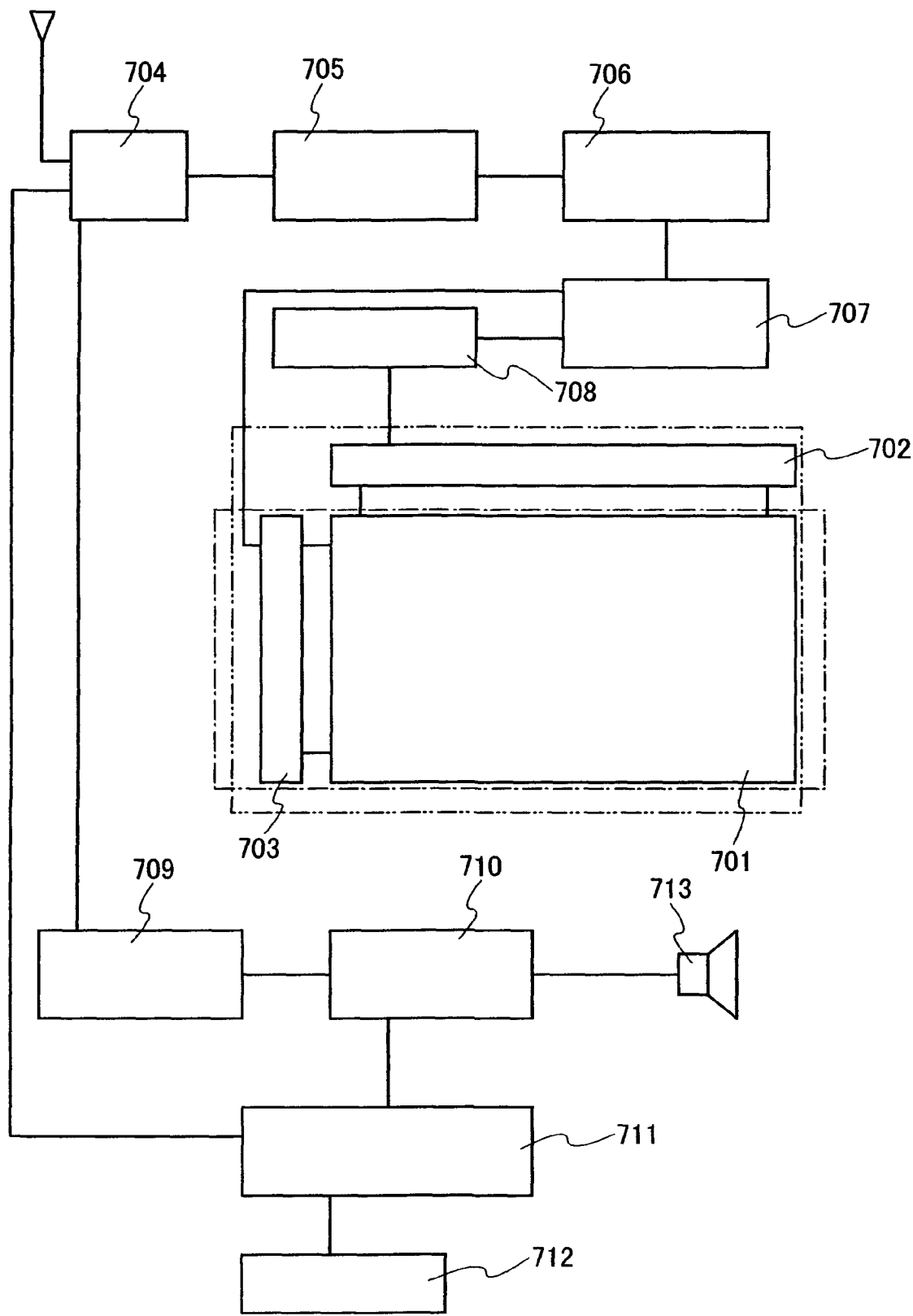
FIG. 20 shows a block diagram showing a main structure of an electronic appliance to which the invention is applied.

By a display device formed by the invention, a television device (also referred to as a television simply or a television receiver) can be completed. FIG. 20 shows a block diagram of a main structure of a television device. As for a display panel, any mode of the following structures shown in FIG. 16A may be employed: a case where only a pixel portion 701 is formed and a scan line driver circuit 703 and a signal line driver circuit 702 are mounted by a TAB method as shown in FIG. 17B; a case where only the pixel portion 701 is formed and the scan line driver circuit 703 and the signal line driver circuit 702 are mounted by a COG method as shown in FIG. 17A; a case where a TFT is formed as shown in FIG. 16B, the pixel portion 701 and the scan line driver circuit 703 are formed over a substrate, and the signal line driver circuit 702 is independently mounted as a driver IC; a case where the pixel portion 701, the signal line driver circuit 702, and the scan line driver circuit 703 are formed over one substrate as shown in FIG. 17C; and the like.

In addition, as another structure of an external circuit, a video signal amplifier circuit 705 that amplifies a video signal among signals received by a tuner 704, a video signal processing circuit 706 that converts the signals outputted from the video signal amplifier circuit 705 into chrominance signals corresponding to each colors of red, green, and blue, a control circuit 707 that converts the video signal into an input specification of a driver IC, or the like are provided on an input side of the video signal. The control circuit 707 outputs signals to both a scan line side and a signal line side. In a case of digital driving, a signal dividing circuit 708 may be provided on the signal line side and an input digital signal may be divided into m pieces to be supplied.

An audio signal among signals received by the tuner 704 is transmitted to an audio signal amplifier circuit 709 and is supplied to a speaker 713 through an audio signal processing circuit 710. A control circuit 711 receives control information of a receiving station (reception frequency) or sound volume from an input portion 712 and transmits signals to the tuner 704 or the audio signal processing circuit 710.

Figure 21A:
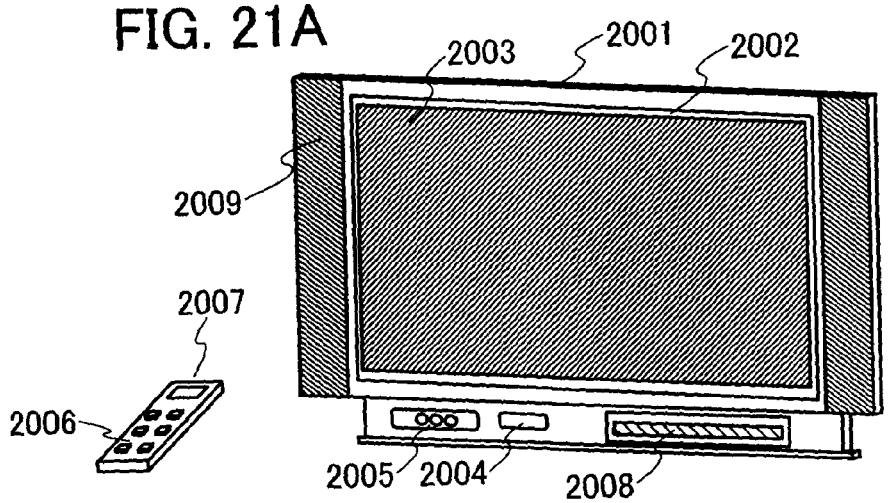
FIGS. 21A to 21C are views each showing an electronic appliance of the invention.
Figure 21B:
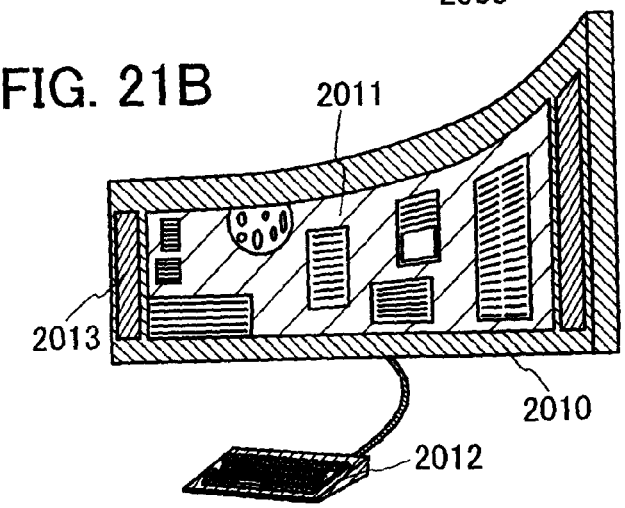
Figure 21C:
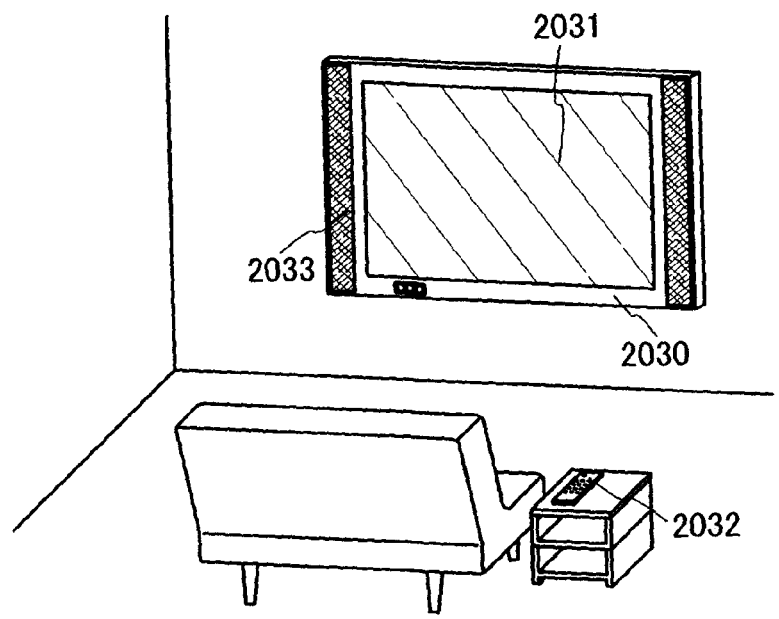

Such liquid crystal display modules are incorporated into each housing as shown in FIGS. 21A to 21C, whereby a television device can be completed. When a liquid crystal display module such as that shown in FIGS. 18A and 18B are used, a liquid crystal television device can be completed. When a display device having a three-dimensional display function described in Embodiment Mode 10 is used, a television device that can perform three-dimensional display can be manufactured. A main screen 2003 is formed by a display module, and a speaker portion 2009, an operation switch, and the like are provided as accessory equipment. In such a manner, a television device can be completed by the invention.

A display panel 2002 is incorporated in a housing 2001, and general TV broadcast can be received by a receiver 2005. In addition, by connecting to a wired or wireless communication network through a modem 2004, one-way (from a sender to a receiver) or two-way (between a sender and a receiver or between receivers) information communication can be carried out. The television device can be operated by using a switch incorporated in the housing or an independent remote control unit 2006. A display portion 2007 for displaying output information may also be provided in the remote control unit 2006.

Further, the television device may include a sub-screen 2008 formed using a second display panel to display channels, volume, or the like, in addition to the main screen 2003. In this structure, the main screen 2003 and the sub-screen 2008 can be formed using a liquid crystal display panel of the invention. The main screen 2003 may be formed using an EL display panel having a superior viewing angle, and the sub-screen 2008 may be formed using a liquid crystal display panel capable of displaying images with lower power consumption. In order to reduce the power consumption preferentially, the main screen 2003 may be formed using a liquid crystal display panel, and the sub-screen 2008 may be formed using an EL display panel so that the sub-screen can flash on and off. By using the invention, even when many TFTs and electronic parts are used with such a large substrate, a highly reliable display device can be formed.

FIG. 21B shows a television device having a large display portion with a size of, for example, 20 to 80 inches. The television device includes a housing 2010, a display portion 2011, a keyboard portion 2012 that is an operation portion, a speaker portion 2013, and the like. The invention is applied to the manufacturing of the display portion 2011. The display portion of FIG. 21B uses a substance capable of being bent; therefore, the television device has a bent display portion. Since the shape of the display portion can be freely designed as described above, a television device having the desired shape can be manufactured.

FIG. 21C shows a television device having a large display portion with a size of, for example, 20 to 80 inches. The television device includes a housing 2030, a display portion 2031, a remote control unit 2032 that is an operation portion, a speaker portion 2033, and the like. The invention is applied to the manufacturing of the display portion 2031. The television device shown in FIG. 21C is a wall-hanging type; therefore, it does not require a large installation space.

Birefringence of liquid crystal changes depending on temperature. Therefore, the polarization of light passing through the liquid crystal changes, and a light leakage condition from a polarizer on the viewing side changes. As a result, a change in the contrast ratio is generated depending on the temperature of the liquid crystal. It is desirable that a driving voltage be controlled so as to keep the contrast ratio constant. In order to control the driving voltage, an element for detecting the transmissivity may be arranged and the driving voltage may be controlled based on the detection results. As the element for detecting the transmissivity, a photosensor including an IC chip can be used. In the display device, an element for detecting the temperature may be arranged and the driving voltage may be controlled based on the detection results and the change in the contrast ratio with respect to the temperature of the liquid crystal element. As the element for detecting the temperature, a temperature sensor including an IC chip can be used. In this case, the element for detecting the transmissivity and the element for detecting the temperature are preferably arranged so as to be hidden in the housing portion of the display device.

For example, the element for detecting the temperature may be arranged near a liquid crystal display element in a display device of the invention, which is mounted on the television devices shown in FIGS. 21A to 21C, and then, information about the temperature change of the liquid crystal may be fed back to a circuit for controlling the driving voltage. Since the element for detecting the transmissivity is preferably arranged near the viewing side, the element may be arranged on a surface of the display screen to be covered with the housing. Then, information about the change in the transmissivity that is detected may be fed back to the circuit for controlling the driving voltage similarly to the information about the temperature.

By the invention, the contrast ratio can be minutely adjusted through deviation of absorption axes of a stack of polarizers in which each polarizer has a different wavelength distribution of extinction coefficient. Therefore, the invention can deal with a slight deviation of the contrast ratio with respect to the temperature of the liquid crystal, which can lead to an optimal contrast ratio. Thus, a pair of stacks of polarizers in a parallel nicol state, in which each polarizer has a different wavelength distribution of extinction coefficient and which interpose a display element therebetween, are manufactured so as to be deviated from a cross nicol state in advance so that an optimal contrast ratio is led depending on the conditions (inside or outside of a room, climate, or the like) where the display device of the invention is used, whereby a television device or an electronic appliance for performing high performance and high image quality display can be provided.

It is needless to say that the invention is not limited to the television device. The invention can be applied to various applications such as a monitor of a personal computer, particularly large-sized display media typified by an information display board at train stations, airports, or the like, and an advertising display board on the street.

Embodiment Mode 12

An electronic appliance relating to the invention includes: a television set (simply referred to as a TV or a television receiver), cameras such as a digital camera and a digital video camera, a mobile phone set (simply referred to as a mobile phone set or a mobile phone), a portable information terminal such as a PDA, a portable game machine, a monitor for a computer, a computer, an audio reproducing device such as a car audio set, an image reproducing device provided with a recording medium such as a home game machine, and the like. Specific examples thereof are described with reference to FIGS. 22A to 22E.

Figure 22A:
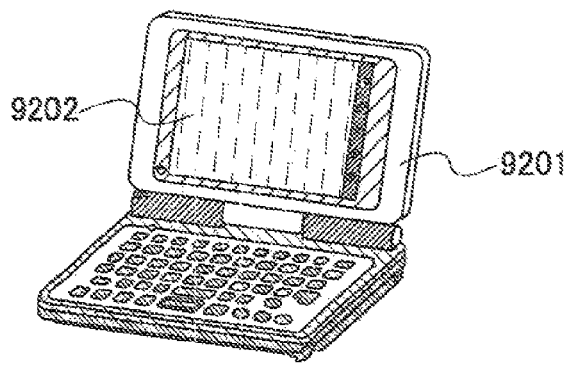
FIGS. 22A to 22E are views each showing an electronic appliance of the invention.

A portable information terminal shown in FIG. 22A includes a main body 9201, a display portion 9202, and the like. The display device of the invention can be applied to the display portion 9202. Accordingly, a portable information terminal with a high contrast ratio can be provided.

Figure 22B:
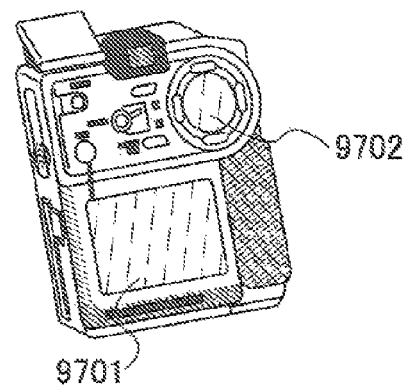

A digital video camera shown in FIG. 22B includes a display portion 9701, a display portion 9702, and the like. The display device of the invention can be applied to the display portion 9701. Accordingly, a digital video camera with a high contrast ratio can be provided.

Figure 22C:
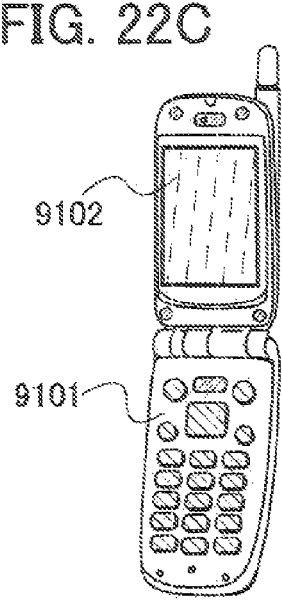

A mobile phone shown in FIG. 22C includes a main body 9101, a display portion 9102, and the like. The display device of the invention can be applied to the display portion 9102. Accordingly, a mobile phone with a high contrast ratio can be provided.

Figure 22D:
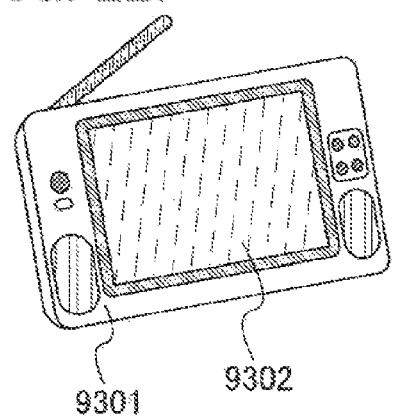

A portable television set shown in FIG. 22D includes a main body 9301, a display portion 9302, and the like. The display device of the invention can be applied to the display portion 9302. Accordingly, a portable television set with a high contrast ratio can be provided. The display device of the invention can be applied to various types of television sets such as a small-sized television incorporated in a portable terminal such as a mobile phone, a medium-sized television which is portable, and a large-sized television (for example, 40 inches in size or larger).

Figure 22E:
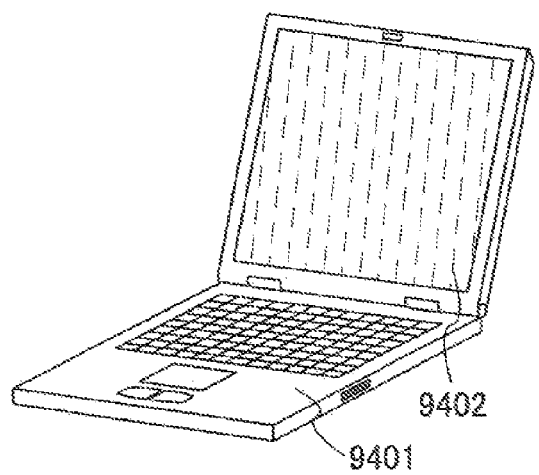

A portable computer shown in FIG. 22E includes a main body 9401, a display portion 9402 and the like. The display device of the invention can be applied to the display portion 9402. Accordingly, a portable computer with a high contrast ratio can be provided.

By thus using the display device of the invention, an electronic appliance with a high contrast ratio can be provided.

Embodiment 1

In this embodiment, description is made of the result of optical calculation in a case of a transmission type liquid crystal display device of a TN mode, in which polarizers each having a different wavelength distribution of extinction coefficient of an absorption axis are stacked and polarizers on the backlight side and polarizers on the viewing side are arranged so as to be deviated from a cross nicol state. In addition, optical calculation in a case where a polarizer is not stacked is carried out for comparison. It is to be noted that the contrast ratio indicates the ratio of transmissivity in white display (also referred to as white transmissivity) to transmissivity in black display (also referred to as black transmissivity) (white transmissivity/black transmissivity). White transmissivity and black transmissivity were each calculated, and then the contrast ratio was calculated.

For a calculation in this embodiment, the optical calculation simulator for liquid crystal LCD MASTER (manufactured by SHINTECH, Inc.) was used. An optical calculation of transmissivity was performed by the LCD MASTER with an optical calculation algorithm of 2×2 matrix, which was not in view of multiple interference between elements, and a wavelength range between 380 nm and 780 nm.

Figure 25:
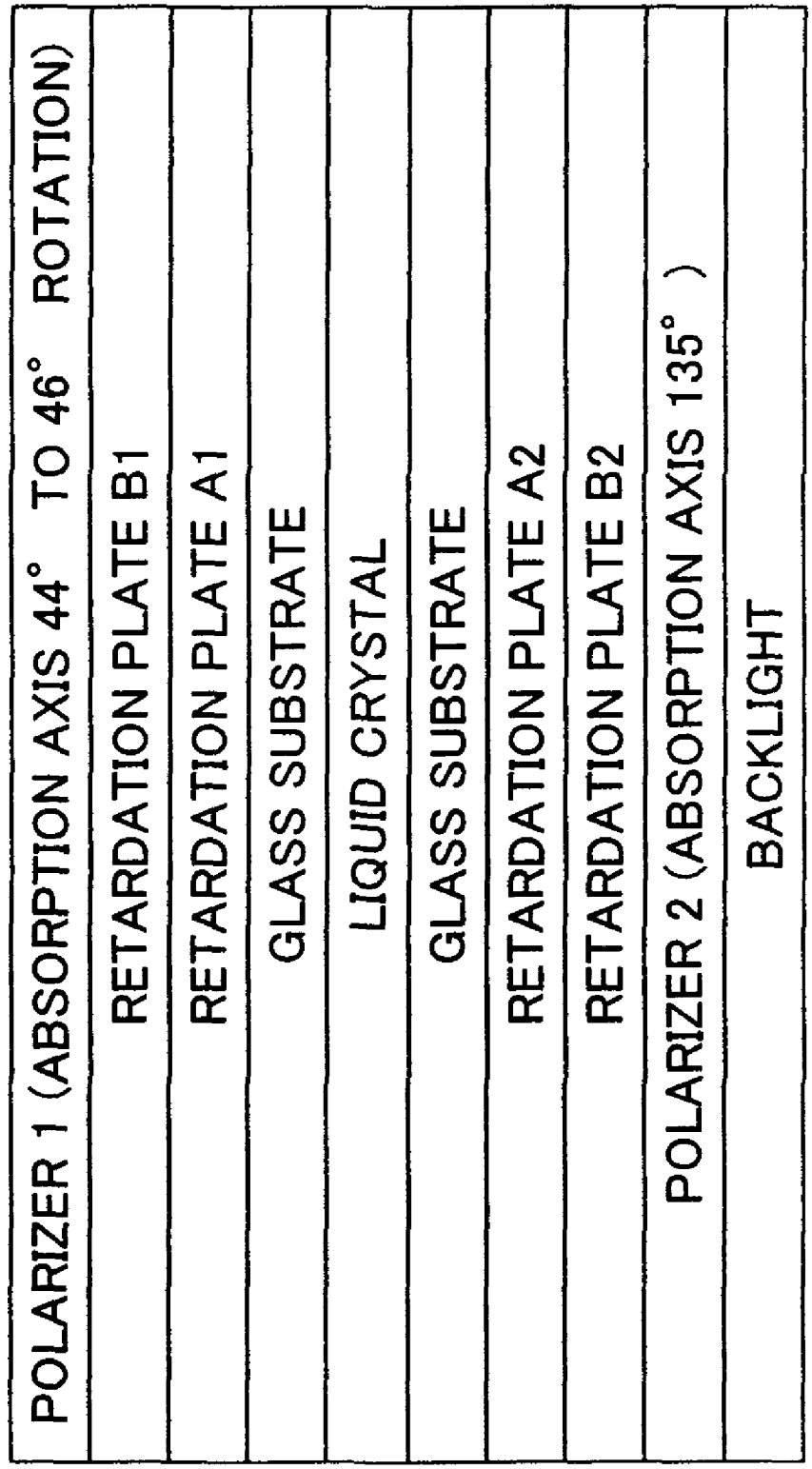
FIG. 25 is a view showing an experiment condition of Embodiment 1.

As shown in FIG. 25, optical arrangement of an optical calculation object has a structure in which a polarizer 2, a retardation plate B2, a retardation plate A2, a glass substrate, TN liquid crystal, a glass substrate, a retardation plate A1, a retardation plate B1, and a polarizer 1 are stacked from a backlight in this order. In this embodiment, two retardation plates (retardation plate A1 and retardation plate B1, and retardation plate B2 and retardation plate A2) for a wide viewing angle of the TN mode are arranged on each of one side of a glass substrate and the other side of the glass substrate. First, in order to calculate the angle of an absorption axis of the polarizer 1 on the viewing side at which the contrast ratio is the highest, calculation of the contrast ratio of the ratio of 0V (white) transmissivity to 5V (black) transmissivity (0V transmissivity/5V transmissivity) was performed when the number of the polarizer 1 on the viewing side is one, the angle of the absorption axis of the polarizer 1 on the viewing side was rotated in the range of ±1 degree from a cross nicol state with respect to an absorption axis of the polarizer 2 on the backlight side, and a voltage applied to the liquid crystal was 0V or 5V. It is to be noted that transmissivity is that in the front of a display element with respect to the backlight.

Table 1 shows physical property values of the polarizers 1 and 2. A thickness of each of the polarizers 1 and 2 was 30 μm. Table 2 shows a value of birefringence of liquid crystal. Table 3 shows other physical property values and orientation conditions of the liquid crystal. Table 4 shows physical property values and arrangement of the retardation plates A1 and A2. Table 5 shows physical property values and arrangement of the retardation plates B1 and B2. Each of the retardation plates A1, A2, B1, and B2 is a retardation plate having a negative uniaxial property.

TABLE 1

PHYSICAL PROPERTY VALUES OF POLARIZERS 1 AND 2

| wavelength (nm) | refractive index in a transmissive axis direction | refractive index in an absorption axis direction | extinction coefficient in a transmissive axis direction | extinction coefficient in an absorption axis direction |
|---|---|---|---|---|
| 380 | 1.5 | 1.5 | 0.00565 | 0.008 |
| 390 | 1.5 | 1.5 | 0.002 | 0.0082 |
| 400 | 1.5 | 1.5 | 0.001 | 0.0079 |
| 410 | 1.5 | 1.5 | 0.0006 | 0.0079 |
| 420 | 1.5 | 1.5 | 0.0004 | 0.0077 |
| 430 | 1.5 | 1.5 | 0.0003 | 0.0079 |
| 440 | 1.5 | 1.5 | 0.00029 | 0.008 |
| 450 | 1.5 | 1.5 | 0.00026 | 0.0085 |
| 460 | 1.5 | 1.5 | 0.00024 | 0.0086 |
| 470 | 1.5 | 1.5 | 0.00022 | 0.0087 |
| 480 | 1.5 | 1.5 | 0.00021 | 0.0096 |
| 490 | 1.5 | 1.5 | 0.0002 | 0.0095 |
| 500 | 1.5 | 1.5 | 0.000196 | 0.0095 |
| 510 | 1.5 | 1.5 | 0.0002 | 0.01 |
| 520 | 1.5 | 1.5 | 0.0002 | 0.0106 |
| 530 | 1.5 | 1.5 | 0.0002 | 0.011 |
| 540 | 1.5 | 1.5 | 0.0002 | 0.01105 |
| 550 | 1.5 | 1.5 | 0.0002 | 0.0115 |
| 560 | 1.5 | 1.5 | 0.0002 | 0.0126 |
| 570 | 1.5 | 1.5 | 0.0002 | 0.0136 |
| 580 | 1.5 | 1.5 | 0.0002 | 0.014 |
| 590 | 1.5 | 1.5 | 0.0002 | 0.0146 |
| 600 | 1.5 | 1.5 | 0.0002 | 0.0147 |
| 610 | 1.5 | 1.5 | 0.0002 | 0.0148 |
| 620 | 1.5 | 1.5 | 0.0002 | 0.0148 |
| 630 | 1.5 | 1.5 | 0.0002 | 0.0147 |
| 640 | 1.5 | 1.5 | 0.0002 | 0.0148 |
| 650 | 1.5 | 1.5 | 0.0002 | 0.0146 |
| 660 | 1.5 | 1.5 | 0.0002 | 0.0143 |
| 670 | 1.5 | 1.5 | 0.0002 | 0.014 |
| 680 | 1.5 | 1.5 | 0.0002 | 0.0135 |
| 690 | 1.5 | 1.5 | 0.00018 | 0.0125 |
| 700 | 1.5 | 1.5 | 0.00018 | 0.0124 |
| 710 | 1.5 | 1.5 | 0.00018 | 0.012 |
| 720 | 1.5 | 1.5 | 0.00018 | 0.011 |
| 730 | 1.5 | 1.5 | 0.00018 | 0.0105 |
| 740 | 1.5 | 1.5 | 0.00018 | 0.0102 |
| 750 | 1.5 | 1.5 | 0.00016 | 0.01 |
| 760 | 1.5 | 1.5 | 0.00015 | 0.0096 |
| 770 | 1.5 | 1.5 | 0.00014 | 0.0092 |
| 780 | 1.5 | 1.5 | 0.00012 | 0.009 |

TABLE 2

VALUE OF BIREFRINGENCE OF LIQUID CRYSTAL

| wavelength (nm) | birefringence Δn |
|---|---|
| 380 | 0.1095635 |
| 390 | 0.107924 |
| 400 | 0.1064565 |
| 410 | 0.105138 |
| 420 | 0.1039495 |
| 430 | 0.102876 |
| 440 | 0.1019025 |
| 450 | 0.1010175 |
| 460 | 0.100212 |
| 470 | 0.0994755 |
| 480 | 0.098801 |
| 490 | 0.0981815 |
| 500 | 0.0976125 |
| 510 | 0.0970875 |
| 520 | 0.0966025 |
| 530 | 0.0961545 |
| 540 | 0.095739 |
| 550 | 0.0953525 |
| 560 | 0.094994 |
| 570 | 0.094659 |
| 580 | 0.094347 |
| 590 | 0.094055 |
| 600 | 0.0937825 |
| 610 | 0.0935265 |
| 620 | 0.093286 |
| 630 | 0.0930605 |
| 640 | 0.0928485 |
| 650 | 0.092649 |
| 660 | 0.0924605 |
| 670 | 0.092282 |
| 680 | 0.092114 |
| 690 | 0.091955 |
| 700 | 0.0918045 |
| 710 | 0.091661 |
| 720 | 0.0915255 |
| 730 | 0.0913975 |
| 740 | 0.091275 |
| 750 | 0.0911585 |
| 760 | 0.0910475 |
| 770 | 0.0909425 |
| 780 | 0.0908415 |

TABLE 3

OTHER PHYSICAL PROPERTY VALUES AND ORIENTATION CONDITIONS OF LIQUID CRYSTAL

| | |
|---|---|
| anisotropy of dielectric constant Δε | 5.0 |
| elastic constant K11 | 12 pN |
| elastic constant K22 | 6 pN |
| elastic constant K33 | 17 pN |
| rubbing direction on backlight side | 315° direction |
| rubbing direction on viewing side | 45° direction |
| pretilt angle on backlight side | 5° |
| pretilt angle on viewing side | 5° |
| chiral agent | nothing |
| cell thickness | 4 μm |

TABLE 4

PHYSICAL PROPERTY VALUE AND ARRANGEMENT OF RETARDATION PLATES A1 AND A2

| | |
|---|---|
| $\Delta n_{xy} \times d$ | 0 nm in whole wavelength range |
| $\Delta n_{xz} \times d$ | 92.4 nm in whole wavelength range |
| arrangement of retardation plate A2 on backlight side | z-axis is inclined at 45° oppositely to pretilt of liquid crystal on backlight side |
| arrangement of retardation plate A1 on viewing side | z-axis is inclined at 45° oppositely to pretilt of liquid crystal on viewing side |

TABLE 5

PHYSICAL PROPERTY VALUE AND ARRANGEMENT OF RETARDATION PLATES B1 AND B2

| | |
|---|---|
| $\Delta n_{xy} \times d$ | 0 nm in whole wavelength range |
| $\Delta n_{xz} \times d$ | 73.92 nm in whole wavelength range |
| arrangement of retardation plate B2 on backlight side | z-axis direction is arranged perpendicularly to glass substrate |
| arrangement of retardation plate B1 on viewing side | z-axis direction is arranged perpendicularly to glass substrate |

TABLE 6

PHYSICAL PROPERTY OF POLARIZING PLATES 3 AND 4

| wavelength (nm) | refractive index in a transmissive axis direction | refractive index in an absorption axis direction | extinction coefficient in a transmissive axis direction | extinction coefficient in an absorption axis direction |
|---|---|---|---|---|
| 380 | 1.5 | 1.5 | 0.00565 | 0.0092 |
| 390 | 1.5 | 1.5 | 0.002 | 0.0095 |
| 400 | 1.5 | 1.5 | 0.001 | 0.0093 |
| 410 | 1.5 | 1.5 | 0.0006 | 0.0095 |
| 420 | 1.5 | 1.5 | 0.0004 | 0.01 |
| 430 | 1.5 | 1.5 | 0.0003 | 0.011 |
| 440 | 1.5 | 1.5 | 0.00029 | 0.0113 |
| 450 | 1.5 | 1.5 | 0.00026 | 0.0115 |
| 460 | 1.5 | 1.5 | 0.00024 | 0.0117 |
| 470 | 1.5 | 1.5 | 0.00022 | 0.0118 |
| 480 | 1.5 | 1.5 | 0.00021 | 0.012 |
| 490 | 1.5 | 1.5 | 0.0002 | 0.0119 |
| 500 | 1.5 | 1.5 | 0.000196 | 0.0123 |
| 510 | 1.5 | 1.5 | 0.0002 | 0.01225 |
| 520 | 1.5 | 1.5 | 0.0002 | 0.0123 |
| 530 | 1.5 | 1.5 | 0.0002 | 0.01225 |
| 540 | 1.5 | 1.5 | 0.0002 | 0.0123 |
| 550 | 1.5 | 1.5 | 0.0002 | 0.012 |
| 560 | 1.5 | 1.5 | 0.0002 | 0.0116 |
| 570 | 1.5 | 1.5 | 0.0002 | 0.0113 |
| 580 | 1.5 | 1.5 | 0.0002 | 0.0112 |
| 590 | 1.5 | 1.5 | 0.0002 | 0.0112 |
| 600 | 1.5 | 1.5 | 0.0002 | 0.012 |
| 610 | 1.5 | 1.5 | 0.0002 | 0.0115 |
| 620 | 1.5 | 1.5 | 0.0002 | 0.011 |
| 630 | 1.5 | 1.5 | 0.0002 | 0.0106 |
| 640 | 1.5 | 1.5 | 0.0002 | 0.0103 |
| 650 | 1.5 | 1.5 | 0.0002 | 0.0102 |
| 660 | 1.5 | 1.5 | 0.0002 | 0.0101 |
| 670 | 1.5 | 1.5 | 0.0002 | 0.01005 |
| 680 | 1.5 | 1.5 | 0.0002 | 0.01002 |
| 690 | 1.5 | 1.5 | 0.00018 | 0.01 |
| 700 | 1.5 | 1.5 | 0.00018 | 0.0099 |
| 710 | 1.5 | 1.5 | 0.00018 | 0.0091 |
| 720 | 1.5 | 1.5 | 0.00018 | 0.008 |
| 730 | 1.5 | 1.5 | 0.00018 | 0.0065 |
| 740 | 1.5 | 1.5 | 0.00018 | 0.0057 |
| 750 | 1.5 | 1.5 | 0.00016 | 0.005 |
| 760 | 1.5 | 1.5 | 0.00015 | 0.0042 |
| 770 | 1.5 | 1.5 | 0.00014 | 0.0035 |
| 780 | 1.5 | 1.5 | 0.00012 | 0.003 |

Figure 26:
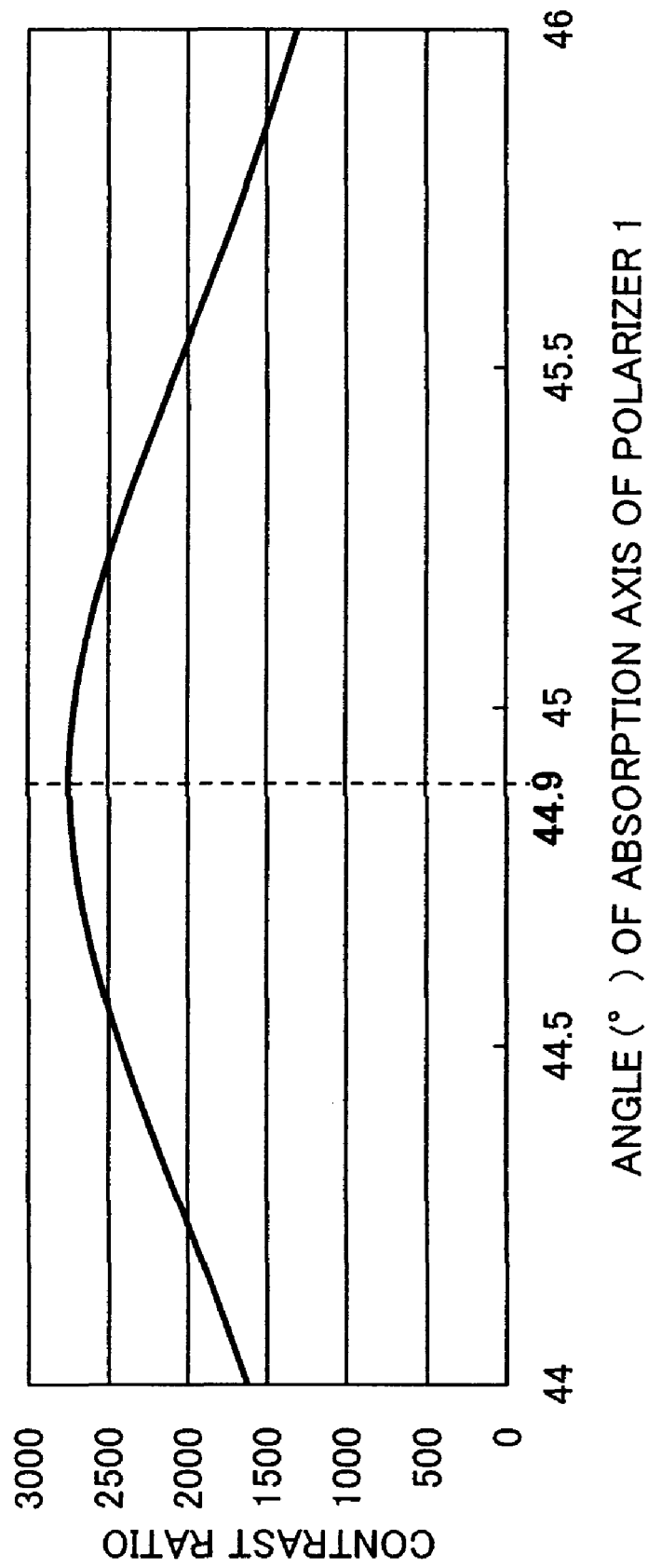
FIG. 26 is a graph showing an experiment result of Embodiment 1.
Figure 27:
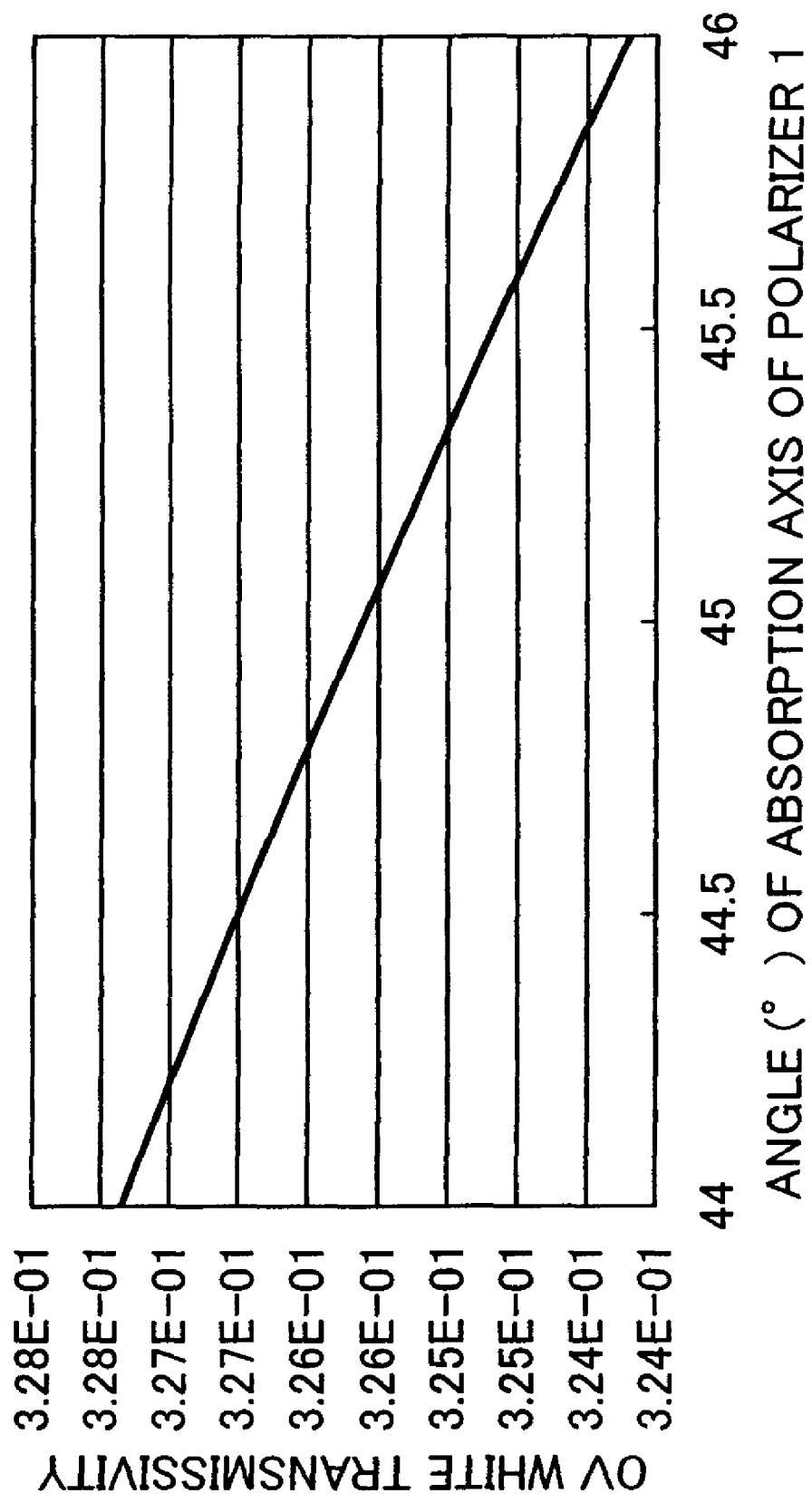
FIG. 27 is a graph showing an experiment result of Embodiment 1.
Figure 28:
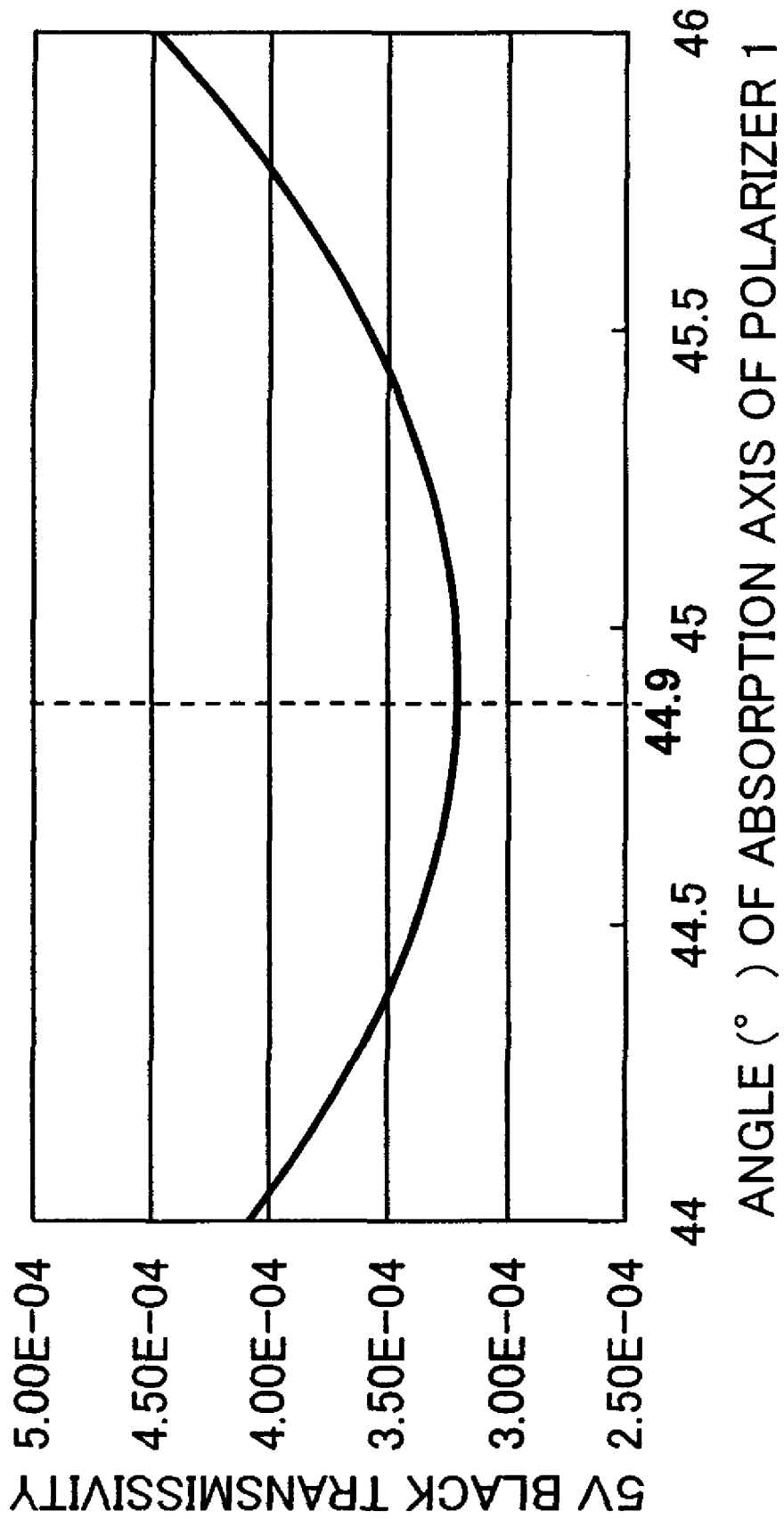
FIG. 28 is a graph showing an experiment result of Embodiment 1.

FIGS. 26, 27, and 28 show results of the contrast ratio, white transmissivity, and black transmissivity of the polarizer 1 on the viewing side when rotated with a wavelength of 550 nm.

From FIG. 26, it is found that, when the angle of the absorption axis of the polarizer 1 on the viewing side is 44.9 degrees, the highest contrast ratio is obtained and the angle of the absorption axis is deviated from 45 degrees of a cross nicol state by 0.1 degrees. According to FIG. 27, the maximum value of white transmisssivity is not exhibited in this rotation range, and according to FIG. 28, the angle of the absorption axis of the polarizer 1 on the viewing side at which black transmissivity is the lowest is 44.9 degrees. Therefore, the angle of the absorption axis of the polarizer 1 on the viewing side at which the contrast ratio is the highest is equal to that at which black transmissivity is the lowest. That is, the absorption axis of the polarizer 1 is deviated to have an angle at which black transmissivity is the lowest, whereby higher contrast can be achieved.

Figure 30:
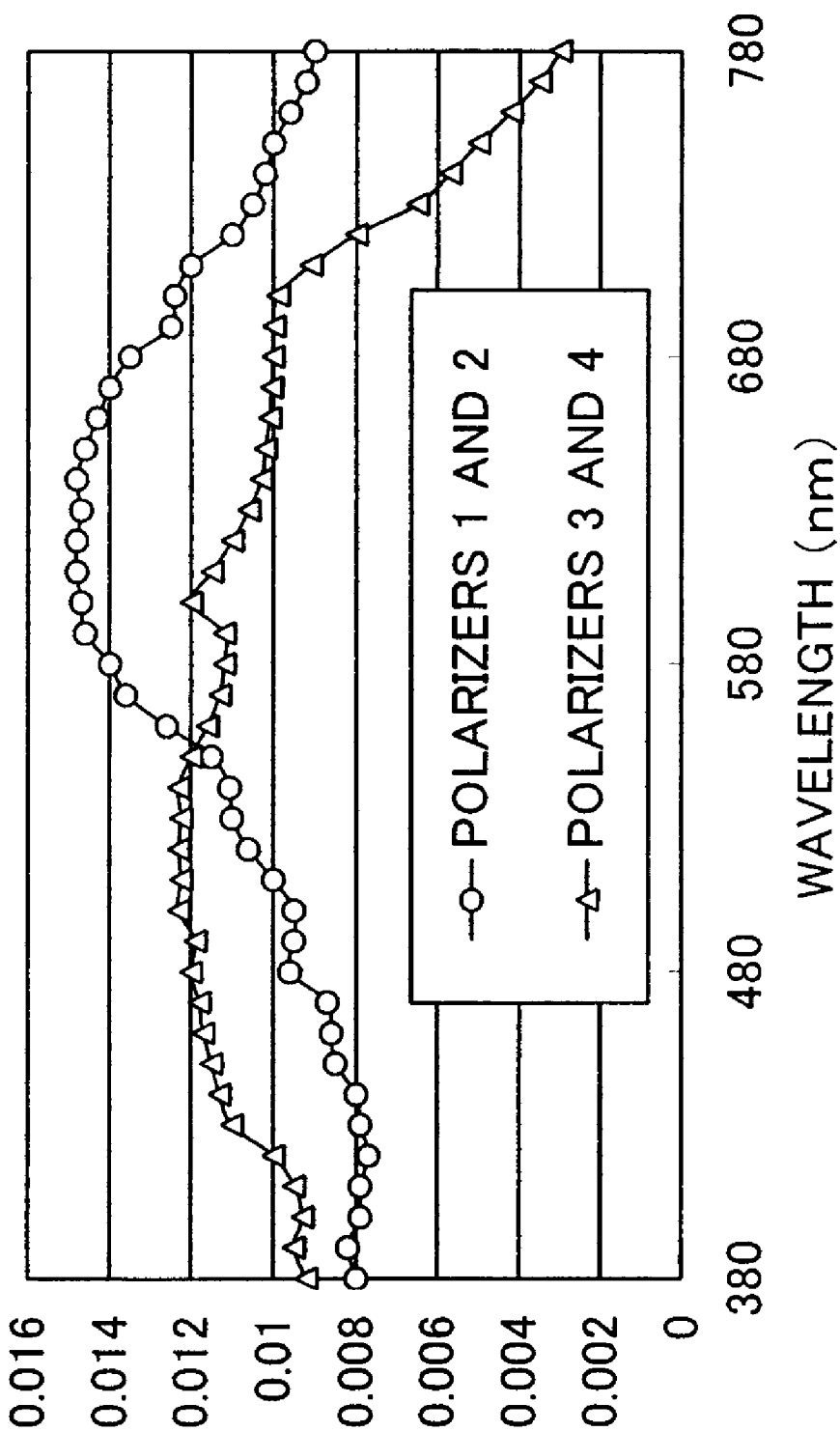
FIG. 30 is a graph showing an experiment result of Embodiment 1.

Next, comparison of the contrast ratio was conducted in accordance with the number of polarizers. Structure A of FIG. 29A is a structure of two polarizers, in which the polarizer 2, the retardation plate B2, the retardation plate A2, a glass substrate, the TN liquid crystal, a glass substrate, the retardation plate A1, the retardation plate B1, and the polarizer 1 are stacked from the backlight in this order. The absorption axis of the polarizer 1 on the viewing side makes an angle of 44.9 degrees with that of the polarizer 2 on the backlight side. That is, they are arranged to be deviated from a cross nicol state. Structure B of FIG. 29B is a structure of three polarizers, in which a polarizer 3, the polarizer 2, the retardation plate B2, the retardation plate A2, the glass substrate, the TN liquid crystal, the glass substrate, the retardation plate A1, the retardation plate B1, and the polarizer 1 are stacked from the backlight in this order. The absorption axis of the polarizer 1 on the viewing side makes an angle of 44.9 degrees with that of the polarizer 2 on the backlight side. That is, they are arranged to be deviated from a cross nicol state. Structure C of FIG. 29C is a structure of four polarizers, in which the polarizer 3, the polarizer 2, the retardation plate B2, the retardation plate A2, the glass substrate, the TN liquid crystal, the glass substrate, the retardation plate A1, the retardation plate B1, the polarizer 1, and a polarizer 4 are stacked from the backlight in this order. The absorption axis of the polarizer 1 and the polarizer 4 on the viewing side makes an angle of 44.9 degrees with that of the polarizer 2 on the backlight side. That is, they are arranged to be deviated from a cross nicol state. The polarizer 3 and the polarizer 4 have the same thickness of 30 µm as the polarizer 1 and the polarizer 2, but have different extinction coefficient values in an absorption axis direction as compared to the polarizer 1 and the polarizer 2 as shown in Table 6. FIG. 30 shows the wavelength distribution of extinction coefficient of the polarizer 1 and the polarizer 2 and the extinction coefficient of the polarizer 3 and the polarizer 4. According to FIG. 30, it is found that the extinction coefficient of the absorption axis of the polarizer 1 and the polarizer 2 is large on a longer wavelength side and the extinction coefficient of the absorption axis of the polarizer 3 and the polarizer 4 is small on a shorter wavelength side. Note that the property values of the polarizers 1 and 2; the property values of the liquid crystal, the retardation plates A1, A2, B1, and B2; and arrangement thereof are the same as those in Tables 1 to 5.

Figure 31:
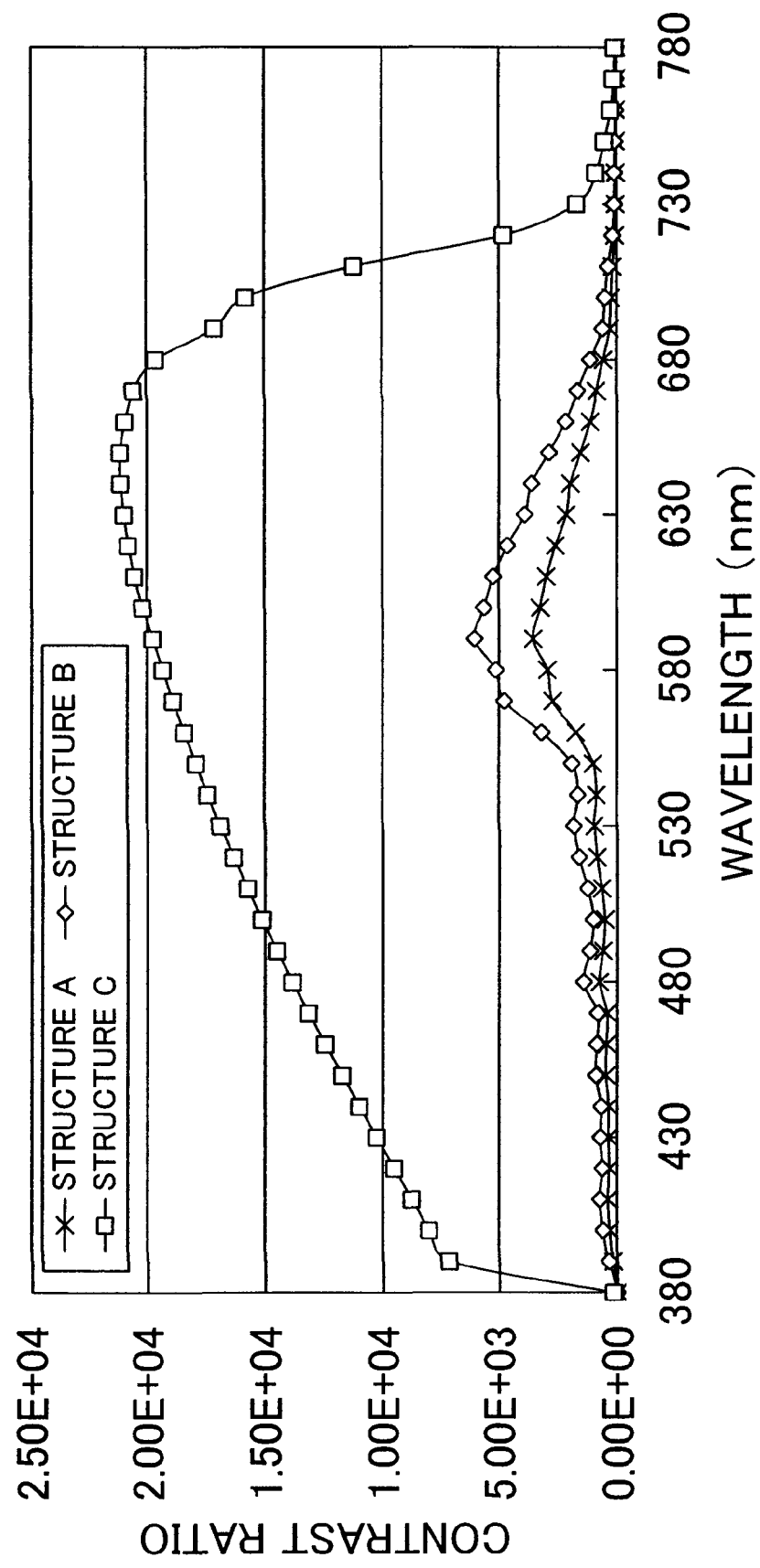
FIG. 31 is a graph showing an experiment result of Embodiment 1.

FIG. 31 shows the results of the contrast ratios of the 0 V transmissivity and 5 V transmissivity in the front of a display element in the structures A, B, and C. According to FIG. 31, it is found that the contrast ratio of the structure C in which stacks of polarizers, in which each polarizer has a different wavelength distribution of extinction coefficient, are arranged so as to be deviated from a cross nicol state is increased as compared to the structure A in which a pair of single polarizers are arranged so as to be in a cross nicol state in the whole wavelength range of 380 nm to 780 nm.

It is to be noted that a structure D, a structure E, and a structure F that are shown in FIGS. 32A to 32C can be considered as arrangements in which two different polarizers are stacked. The results of the contrast ratios in those structures are the same as that in the structure C in FIG. 29C. Therefore, any combination enables the high contrast ratio.

From the above result, polarizers each having a different wavelength distribution of extinction coefficient of an absorption axis are stacked, and the polarizer on the backlight side is deviated from a cross nicol state with respect to the polarizer on the viewing side, whereby the high contrast ratio can be obtained.

Embodiment 2

In this embodiment, description is made of the result of optical calculation in a case of a transmission type liquid crystal display device of a VA mode, in which polarizers each having a different wavelength distribution of extinction coefficient of an absorption axis are stacked and a polarizer on the backlight side and a polarizer on the viewing side are arranged so as to be deviated from a cross nicol state. In addition, optical calculation in a case where a polarizer is not stacked is carried out by way of comparison. It is to be noted that the contrast ratio indicates the ratio of transmissivity in white display (white transmissivity) to transmissivity in black display (black transmissivity) (white transmissivity/black transmissivity). White transmissivity and black transmissivity were each calculated, and then the contrast ratio was calculated.

For a calculation in this embodiment, the optical calculation simulator for liquid crystal LCD MASTER (manufactured by SHINTECH, Inc.) was used. An optical calculation of transmissivity was performed by the LCD MASTER with an optical calculation algorithm of 2×2 matrix, which was not in view of multiple interference between elements, and a wavelength range between 380 nm and 780 nm.

Figure 33:
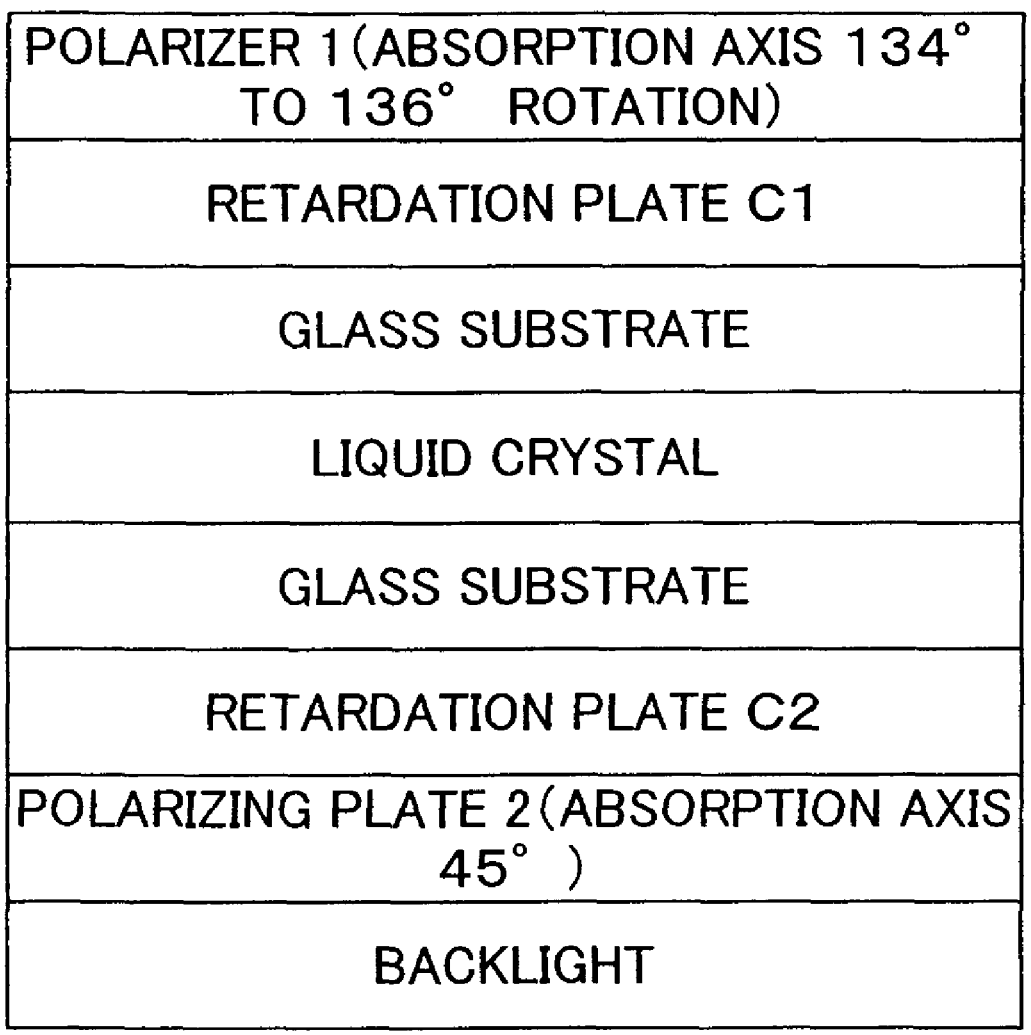
FIG. 33 is a view showing an experiment condition of Embodiment 2.

As shown in FIG. 33, optical arrangement of an optical calculation object has a structure in which a polarizer 2, a retardation plate C2, a glass substrate, VA liquid crystal, a glass substrate, a retardation plate C1, and a polarizer 1 are stacked from a backlight in this order. In this embodiment, two retardation plates (retardation plate C1 and a retardation plate C1) for a wide viewing angle of the VA mode are arranged on each of one side of a glass substrate and the other side of the glass substrate. First, in order to calculate the angle of an absorption axis of the polarizer 1 on the viewing side at which the contrast ratio is the highest, calculation of the contrast ratio of the ratio of 7V (white) transmissivity to 0V (black) transmissivity (7V transmissivity/0V transmissivity) was performed when the number of the polarizer 1 on the viewing side is one, the angle of the absorption axis of the polarizer 1 on the viewing side was rotated in the range of ±1 degree from a cross nicol state with respect to an absorption axis of the polarizer 2 on the backlight side, and a voltage applied to the liquid crystal was 0V or 7V. It is to be noted that transmissivity is that in the front of a display element with respect to the backlight.

Table 7 shows physical property values of the polarizers 1 and 2. A thickness of each of the polarizers 1 and 2 was 30 µm. Table 8 shows a value of birefringence of liquid crystal. Table 9 shows other physical property values and orientation conditions of the liquid crystal. Table 10 shows physical property values and arrangement of the retardation plates C1 and C2. Each of the retardation plates C1 and C2 is a retardation plate having a negative uniaxial property.

TABLE 7

PHYSICAL PROPERTY VALUES OF POLARIZERS 1 AND 2

| wavelength (nm) | refractive index in a transmissive axis direction | refractive index in an absorption axis direction | extinction coefficient in a transmissive axis direction | extinction coefficient in an absorption axis direction |
|---|---|---|---|---|
| 380 | 1.5 | 1.5 | 0.00565 | 0.008 |
| 390 | 1.5 | 1.5 | 0.002 | 0.0082 |
| 400 | 1.5 | 1.5 | 0.001 | 0.0079 |
| 410 | 1.5 | 1.5 | 0.0006 | 0.0079 |
| 420 | 1.5 | 1.5 | 0.0004 | 0.0077 |
| 430 | 1.5 | 1.5 | 0.0003 | 0.0079 |
| 440 | 1.5 | 1.5 | 0.00029 | 0.008 |
| 450 | 1.5 | 1.5 | 0.00026 | 0.0085 |
| 460 | 1.5 | 1.5 | 0.00024 | 0.0086 |
| 470 | 1.5 | 1.5 | 0.00022 | 0.0087 |
| 480 | 1.5 | 1.5 | 0.00021 | 0.0096 |
| 490 | 1.5 | 1.5 | 0.0002 | 0.0095 |
| 500 | 1.5 | 1.5 | 0.000196 | 0.0095 |
| 510 | 1.5 | 1.5 | 0.0002 | 0.01 |
| 520 | 1.5 | 1.5 | 0.0002 | 0.0106 |
| 530 | 1.5 | 1.5 | 0.0002 | 0.011 |
| 540 | 1.5 | 1.5 | 0.0002 | 0.01105 |
| 550 | 1.5 | 1.5 | 0.0002 | 0.0115 |
| 560 | 1.5 | 1.5 | 0.0002 | 0.0126 |
| 570 | 1.5 | 1.5 | 0.0002 | 0.0136 |
| 580 | 1.5 | 1.5 | 0.0002 | 0.014 |
| 590 | 1.5 | 1.5 | 0.0002 | 0.0146 |
| 600 | 1.5 | 1.5 | 0.0002 | 0.0147 |
| 610 | 1.5 | 1.5 | 0.0002 | 0.0148 |
| 620 | 1.5 | 1.5 | 0.0002 | 0.0148 |
| 630 | 1.5 | 1.5 | 0.0002 | 0.0147 |
| 640 | 1.5 | 1.5 | 0.0002 | 0.0148 |
| 650 | 1.5 | 1.5 | 0.0002 | 0.0146 |
| 660 | 1.5 | 1.5 | 0.0002 | 0.0143 |
| 670 | 1.5 | 1.5 | 0.0002 | 0.014 |
| 680 | 1.5 | 1.5 | 0.0002 | 0.0135 |
| 690 | 1.5 | 1.5 | 0.00018 | 0.0125 |
| 700 | 1.5 | 1.5 | 0.00018 | 0.0124 |
| 710 | 1.5 | 1.5 | 0.00018 | 0.012 |
| 720 | 1.5 | 1.5 | 0.00018 | 0.011 |
| 730 | 1.5 | 1.5 | 0.00018 | 0.0105 |
| 740 | 1.5 | 1.5 | 0.00018 | 0.0102 |
| 750 | 1.5 | 1.5 | 0.00016 | 0.01 |
| 760 | 1.5 | 1.5 | 0.00015 | 0.0096 |
| 770 | 1.5 | 1.5 | 0.00014 | 0.0092 |
| 780 | 1.5 | 1.5 | 0.00012 | 0.009 |

TABLE 8

VALUE OF BIREFRINGENCE OF LIQUID CRYSTAL

| wavelength (nm) | birefringence $\Delta n$ |
|---|---|
| 380 | 0.150551 |
| 390 | 0.148053 |
| 400 | 0.1457925 |
| 410 | 0.143739 |
| 420 | 0.1418705 |
| 430 | 0.1401635 |
| 440 | 0.138601 |
| 450 | 0.137167 |
| 460 | 0.135848 |
| 470 | 0.1346315 |
| 480 | 0.133507 |
| 490 | 0.132466 |
| 500 | 0.131501 |
| 510 | 0.130603 |
| 520 | 0.129767 |
| 530 | 0.1289875 |
| 540 | 0.12826 |
| 550 | 0.1275785 |
| 560 | 0.1269405 |
| 570 | 0.1263405 |
| 580 | 0.125778 |
| 590 | 0.125248 |
| 600 | 0.124749 |
| 610 | 0.1242785 |
| 620 | 0.123834 |
| 630 | 0.1234135 |
| 640 | 0.123016 |
| 650 | 0.1226395 |
| 660 | 0.122282 |
| 670 | 0.121943 |
| 680 | 0.1216205 |
| 690 | 0.121314 |
| 700 | 0.121022 |
| 710 | 0.120744 |
| 720 | 0.120479 |
| 730 | 0.1202265 |
| 740 | 0.1199855 |
| 750 | 0.1197545 |
| 760 | 0.119534 |
| 770 | 0.119323 |
| 780 | 0.119121 |

TABLE 9

OTHER PHYSICAL PROPERTY VALUES AND ORIENTATION CONDITIONS OF LIQUID CRYSTAL

| | |
|---|---|
| anisotropy of dielectric constant $\Delta\epsilon$ | −4.0 |
| elastic constant K11 | 13 pN |
| elastic constant K22 | 8 pN |
| elastic constant K33 | 17 pN |
| rubbing direction on backlight side | 90° direction |
| rubbing direction on viewing side | 90° direction |
| pretilt angle on backlight side | 88° |
| pretilt angle on viewing side | 88° |
| chiral agent | nothing |
| cell thickness | 3 μm |

TABLE 10

PHYSICAL PROPERTY VALUE AND ARRANGEMENT OF RETARDATION PLATES C1 AND C2

| | |
|---|---|
| $\Delta n_{xy} \times d$ | 40 nm in whole wavelength range |
| $\Delta n_{xz} \times d$ | 140 nm in whole wavelength range |
| arrangement of retardation plate C2 on backlight side | x-axis is 135° direction and z-axis is perpendicular direction to glass substrate |
| arrangement of retardation plate C1 on viewing side | x-axis is 45° direction and z-axis is perpendicular direction to glass substrate |

TABLE 11

PHYSICAL PROPERTY OF POLARIZING PLATES 3 AND 4

| wavelength (nm) | refractive index in a transmissive axis direction | refractive index in an absorption axis direction | extinction coefficient in a transmissive axis direction | extinction coefficient in an absorption axis direction |
|---|---|---|---|---|
| 380 | 1.5 | 1.5 | 0.00565 | 0.0092 |
| 390 | 1.5 | 1.5 | 0.002 | 0.0095 |
| 400 | 1.5 | 1.5 | 0.001 | 0.0093 |
| 410 | 1.5 | 1.5 | 0.0006 | 0.0095 |
| 420 | 1.5 | 1.5 | 0.0004 | 0.01 |
| 430 | 1.5 | 1.5 | 0.0003 | 0.011 |
| 440 | 1.5 | 1.5 | 0.00029 | 0.0113 |
| 450 | 1.5 | 1.5 | 0.00026 | 0.0115 |
| 460 | 1.5 | 1.5 | 0.00024 | 0.0117 |
| 470 | 1.5 | 1.5 | 0.00022 | 0.0118 |
| 480 | 1.5 | 1.5 | 0.00021 | 0.012 |
| 490 | 1.5 | 1.5 | 0.0002 | 0.0119 |
| 500 | 1.5 | 1.5 | 0.000196 | 0.0123 |
| 510 | 1.5 | 1.5 | 0.0002 | 0.01225 |
| 520 | 1.5 | 1.5 | 0.0002 | 0.0123 |
| 530 | 1.5 | 1.5 | 0.0002 | 0.01225 |
| 540 | 1.5 | 1.5 | 0.0002 | 0.0123 |
| 550 | 1.5 | 1.5 | 0.0002 | 0.012 |
| 560 | 1.5 | 1.5 | 0.0002 | 0.0116 |
| 570 | 1.5 | 1.5 | 0.0002 | 0.0113 |
| 580 | 1.5 | 1.5 | 0.0002 | 0.0112 |
| 590 | 1.5 | 1.5 | 0.0002 | 0.0112 |
| 600 | 1.5 | 1.5 | 0.0002 | 0.012 |
| 610 | 1.5 | 1.5 | 0.0002 | 0.0115 |
| 620 | 1.5 | 1.5 | 0.0002 | 0.011 |
| 630 | 1.5 | 1.5 | 0.0002 | 0.0106 |
| 640 | 1.5 | 1.5 | 0.0002 | 0.0103 |
| 650 | 1.5 | 1.5 | 0.0002 | 0.0102 |
| 660 | 1.5 | 1.5 | 0.0002 | 0.0101 |
| 670 | 1.5 | 15 | 0.0002 | 0.01005 |
| 680 | 1.5 | 1.5 | 0.0002 | 0.01002 |
| 690 | 1.5 | 1.5 | 0.00018 | 0.01 |
| 700 | 1.5 | 1.5 | 0.00018 | 0.0099 |
| 710 | 1.5 | 1.5 | 0.00018 | 0.0091 |
| 720 | 1.5 | 1.5 | 0.00018 | 0.008 |
| 730 | 1.5 | 1.5 | 0.00018 | 0.0065 |
| 740 | 1.5 | 1.5 | 0.00018 | 0.0057 |
| 750 | 1.5 | 1.5 | 0.00016 | 0.005 |
| 760 | 1.5 | 1.5 | 0.00015 | 0.0042 |
| 770 | 1.5 | 1.5 | 0.00014 | 0.0035 |
| 780 | 1.5 | 1.5 | 0.00012 | 0.003 |

Figure 34:
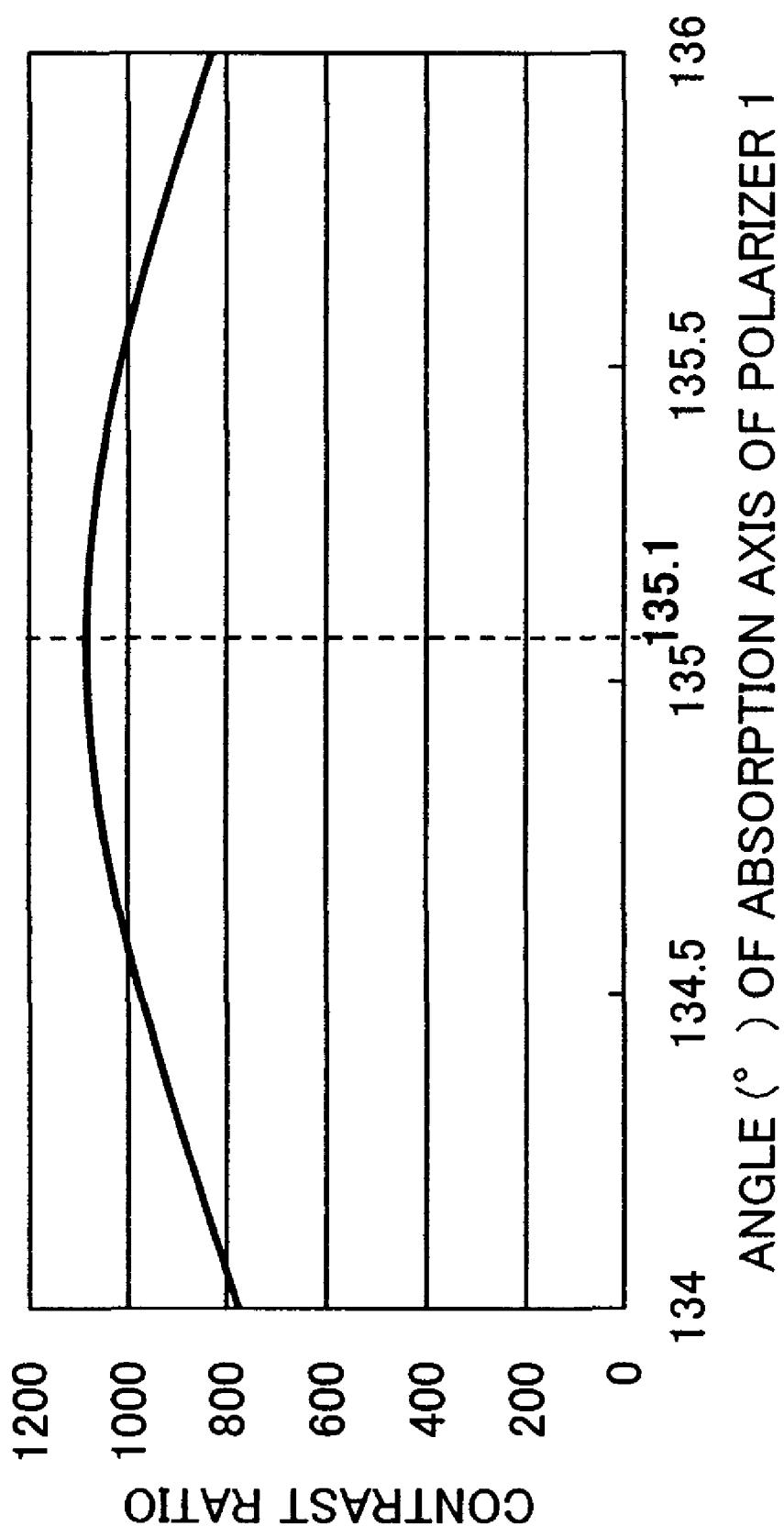
FIG. 34 is a graph showing an experiment result of Embodiment 2.
Figure 35:
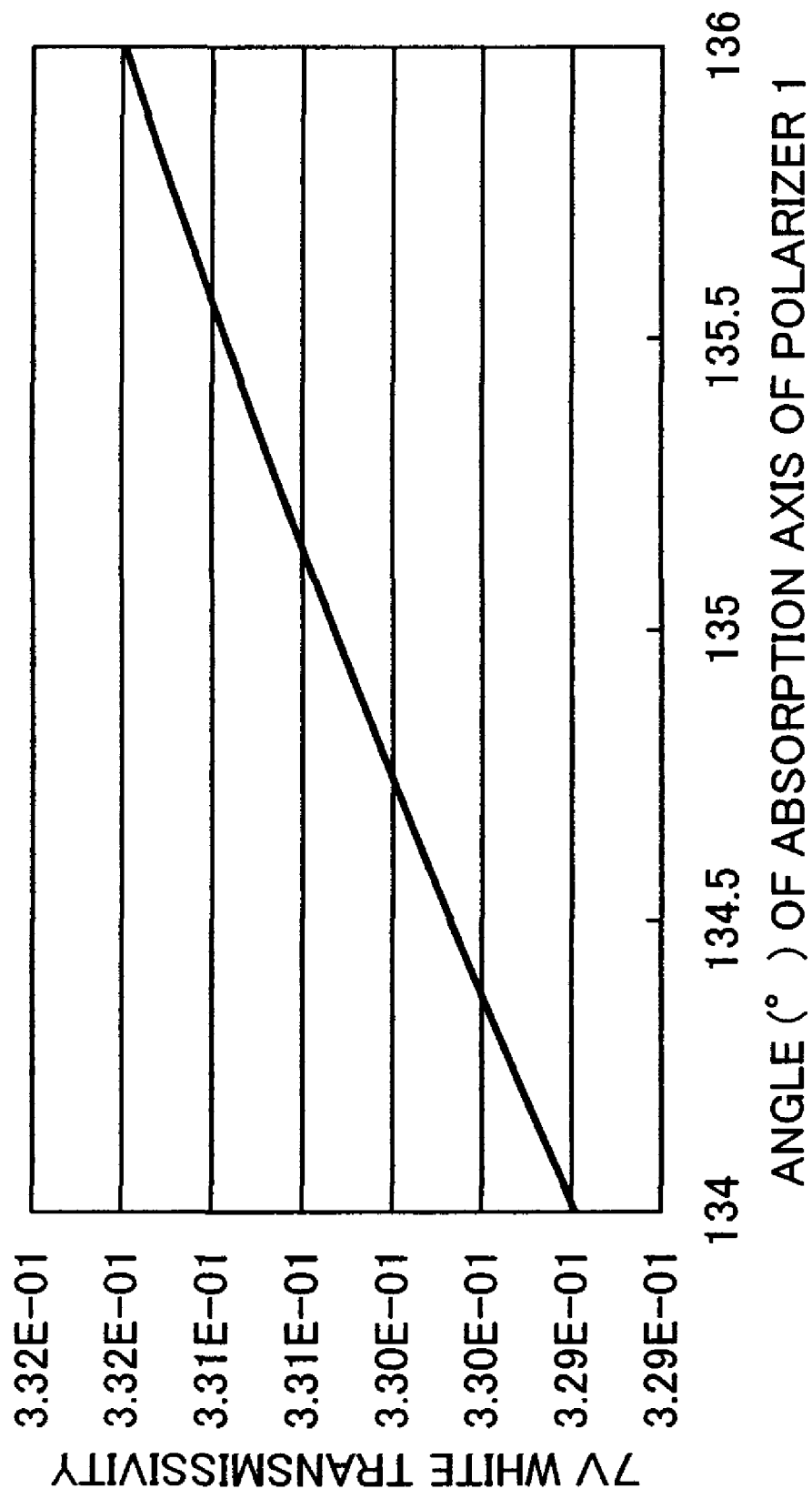
FIG. 35 is a graph showing an experiment result of Embodiment 2.
Figure 36:
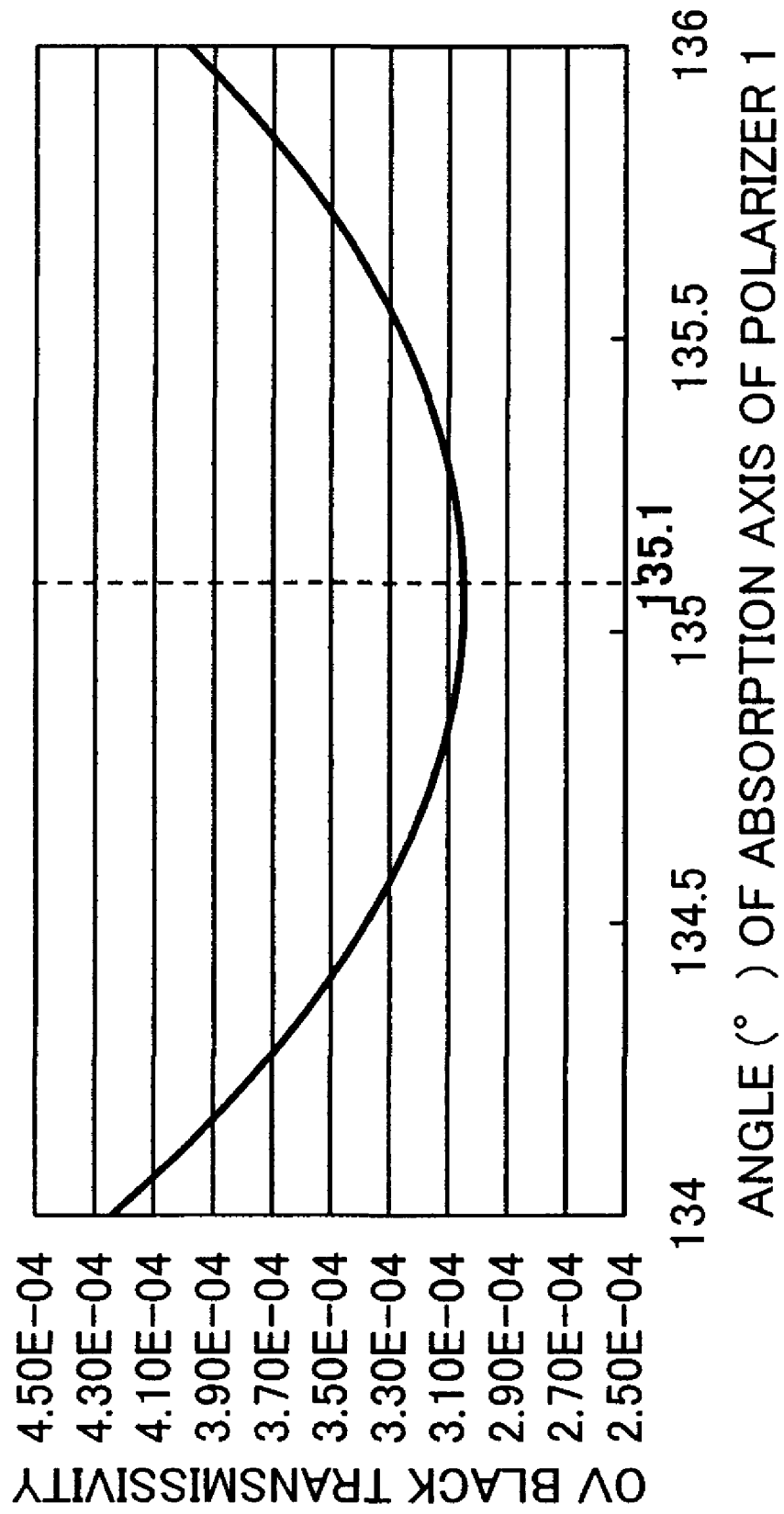
FIG. 36 is a graph showing an experiment result of Embodiment 2.

FIGS. 34, 35, and 36 show results of the contrast ratio, white transmissivity, and black transmissivity of the polarizer 1 on the viewing side when rotated with a wavelength of 550 nm.

From FIG. 34, it is found that, when the angle of the absorption axis of the polarizer 1 is 135.1 degrees, the highest contrast ratio is obtained and the angle of the absorption axis is deviated from 135 degrees of a cross nicol state by 0.1 degrees. According to FIG. 35, the maximum value of white transmisssivity is not exhibited in this rotation range, and according to FIG. 36, the angle of the absorption axis of the polarizer 1 at which black transmissivity is the lowest is 135.1 degrees. Therefore, the angle of the absorption axis of the polarizer 1 at which the contrast ratio is the highest is equal to that at which black transmissivity is the lowest. That is, the absorption axis of the polarizer 1 is deviated to have an angle at which black transmissivity is the lowest, whereby higher contrast can be achieved.

Figure 38:
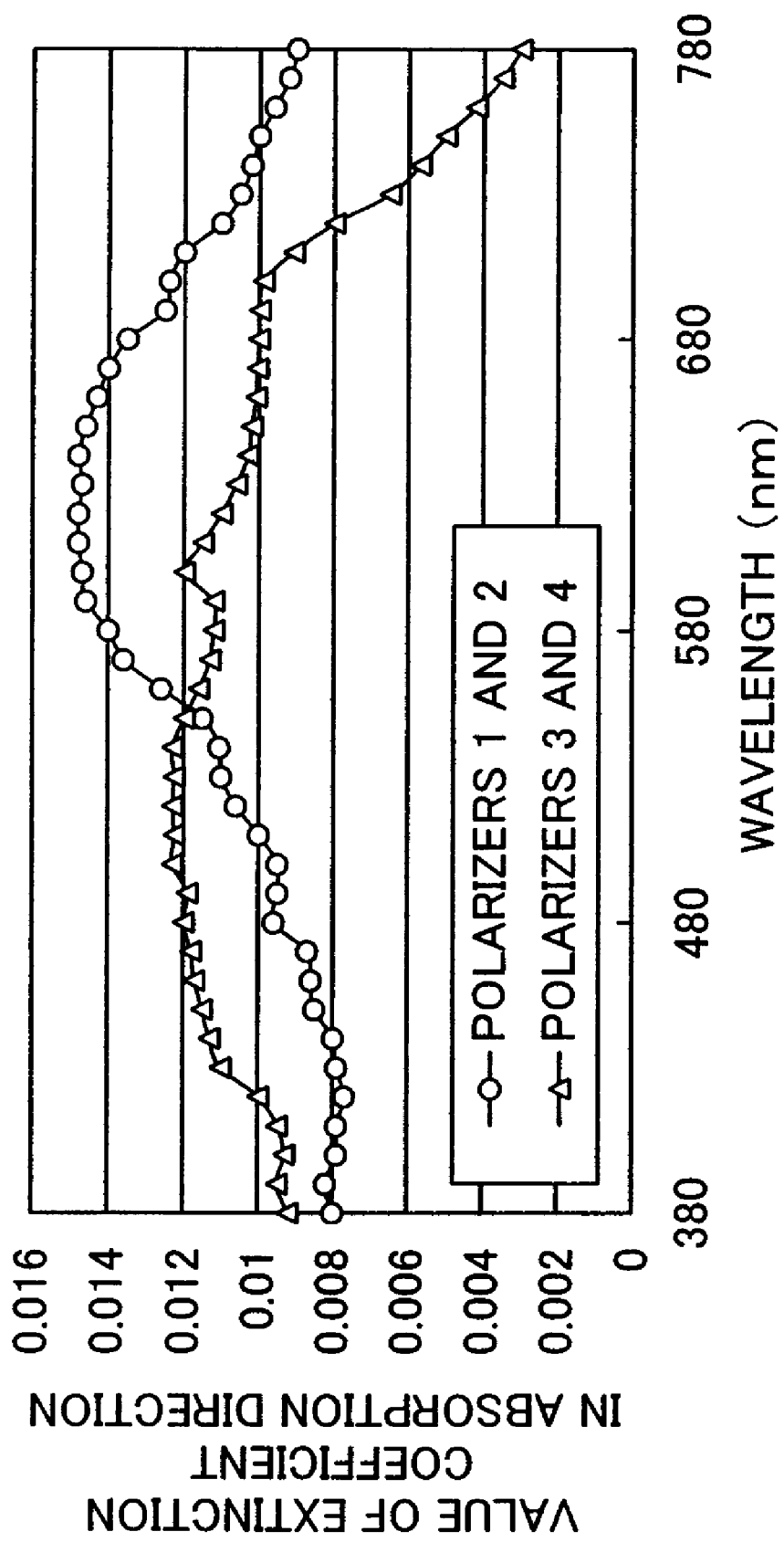
FIG. 38 is a graph showing an experiment result of Embodiment 2.

Next, comparison of the contrast ratio was conducted in accordance with the number of polarizers. Structure A of FIG. 37A is a structure of two polarizers, in which the polarizer 2, the retardation plate C2, a glass substrate, the VA liquid crystal, a glass substrate, the retardation plate C1, and the polarizer 1 are stacked from the backlight in this order. The absorption axis of the polarizer 1 on the viewing side makes an angle of 135.1 degrees with that of the polarizer 2 on the backlight side. That is, they are arranged to be deviated from a cross nicol state. Structure B of FIG. 37B is a structure of three polarizers, in which a polarizer 3, the polarizer 2, the retardation plate C2, a glass substrate, the VA liquid crystal, a glass substrate, the retardation plate C1, and the polarizer 1 are stacked from the backlight in this order. The absorption axis of the polarizer 1 on the viewing side makes an angle of 135.1 degrees with that of the polarizer 2 on the backlight side. That is, they are arranged to be deviated from a cross nicol state. Structure C of FIG. 37C is a structure of four polarizers, in which the polarizer 3, the polarizer 2, the retardation plate C2, a glass substrate, the VA liquid crystal, a glass substrate, the retardation plate C1, the polarizer 1, and a polarizer 4 are stacked from the backlight in this order. The absorption axis of the polarizer 1 and the polarizer 4 on the viewing side makes an angle of 135.1 degrees with that of the polarizer 2 on the backlight side. That is, they are arranged to be deviated from a cross nicol state. The polarizer 3 and the polarizer 4 have the same thickness of 30 μm as the polarizer 1 and the polarizer 2, but have different extinction coefficient values in an absorption axis direction as compared to the polarizer 1 and the polarizer 2 as shown in Table 11. FIG. 38 shows the wavelength distribution of extinction coefficient of the absorption axis of the polarizer 1 and the polarizer 2 and the wavelength distribution of extinction coefficient of the absorption axis of the polarizer 3 and the polarizer 4. According to FIG. 38, it is found that the extinction coefficient of the absorption axis of the polarizer 1 and the polarizer 2 is large on a longer wavelength side and the extinction coefficient of the absorption axis of the polarizer 3 and the polarizer 4 is small on a shorter wavelength side. Note that the property values of the polarizers 1 and 2; the property values of the liquid crystal, the retardation plates C1, and C2; and arrangement thereof are the same as those in Tables 7 to 10.

FIG. 39 shows the results of the contrast ratios of the 7 V transmissivity and 0 V transmissivity in the front of a display element in the structures A, B, and C. According to FIG. 39, it is found that the contrast ratio of the structure C in which stacks of polarizers, in which each polarizer has a different wavelength distribution of extinction coefficient, are arranged so as to be deviated from a cross nicol state is increased as compared to the structure A in which a pair of single polarizers are arranged so as to be in a cross nicol state in the whole wavelength range of 380 nm to 780 nm.

It is to be noted that a structure D, a structure E, and a structure F that are shown in FIGS. 40A to 40C can be considered as arrangements in which two different polarizers are stacked. The results of the contrast ratios in those structures are the same as that in the structure C in FIG. 37C. Therefore, any of the structures D, E, and F enables the high contrast ratio.

From the above result, polarizers each having a different wavelength distribution of extinction coefficient of an absorption axis are stacked, and the polarizer on the backlight side is deviated from a cross nicol state with respect to the polarizer on the viewing side, whereby the high contrast ratio can be obtained.

This application is based on Japanese Patent Application serial no. 2006-048063 filed in Japan Patent Office on 24 Feb. 2006, the entire contents of which are hereby incorporated by reference.

What is claimed is:

1. A display device comprising:
   a first light-transmissive substrate and a second light-transmissive substrate which are provided so as to face each other;
   a display element provided between the first light-transmissive substrate and the second light-transmissive substrate;
   a first layer including first stack of polarizers outside the first light-transmissive substrate; and
   a second layer including second stack of polarizers outside the second light-transmissive substrate,
   wherein:
   polarizers in each of the first stack of polarizers and the second stack of polarizers have different wavelength distributions of extinction coefficients of absorption axes,
   absorption axes of polarizers in the first stack of polarizers are in a parallel nicol state,
   absorption axes of polarizers in the second stack of polarizers are in a parallel nicol state,
   the absorption axes of a polarizers in the first stack of polarizers and those of a polarizers in the second stack of polarizers are deviated from a cross nicol state, and
   an absolute value of an angle of a deviation of the absorption axes of the polarizers in the first stack of polarizers from those of the polarizers in the second stack of polarizers is more than 0° and equal to or less than 3°.

2. A display device according to claim 1 wherein the absolute value of the angle of the deviation of the absorption axes of the polarizers in the first stack of polarizers from those of the polarizers in the second stack of polarizers is more than 0° and equal to or less than 0.5°.

3. A display device according to claim 1, wherein a polarizer is provided between a pair of protective layers in each of the first layer and the second layer.

4. A display device according to claim 1, wherein a light source is provided outside the second stack of polarizers.

5. A display device according to claim 1, wherein the display element is a liquid crystal element.

6. A display device according to claim 1 wherein the display device is incorporated into one selected from the group consisting of a portable information terminal, a digital video camera, a mobile phone, a television set and a portable computer.

7. A display device according to claim 1, wherein the absolute value of the angle of the deviation of the absorption axes of the polarizers in the first stack of polarizers from those of the polarizers in the second stack of polarizers is more than 0° and equal to or less than 0.1°.

8. A display device comprising:
   a first light-transmissive substrate and a second light-transmissive substrate which are provided so as to face each other;
   a display element provided between the first light-transmissive substrate and the second light-transmissive substrate;
   a first layer including first stack of polarizers outside the first light-transmissive substrate;
   a second layer including second stack of polarizers outside the second light-transmissive substrate;
   a first retardation plate between the first light-transmissive substrate and the first layer including the first stack of polarizers; and
   a second retardation plate between the second light-transmissive substrate and the second layer including the second stack of polarizers,
   wherein:
   polarizers in each of the first stack of polarizers and the second stack of polarizers have different wavelength distributions of extinction coefficient of absorption axes,
   absorption axes of polarizers in the first stack of polarizers are in a parallel nicol state,
   absorption axes of polarizers in the second stack of polarizers are in a parallel nicol state,
   the absorption axes of a polarizers in the first stack of polarizers and those of a polarizers in the second stack of polarizers are deviated from a cross nicol state,
   an absolute value of an angle of a deviation of the absorption axes of the polarizers in the first stack of polarizers from those of the polarizers in the second stack of polarizers is more than 0° and equal to or less than 3°.

9. display device according to claim 8 wherein the absolute value of the angle of the deviation of the absorption axes of the polarizers in the first stack of polarizers from those of the polarizers in the second stack of polarizers is more than 0° and equal to or less than 0.5°.

10. A display device according to claim 8, wherein a polarizer is provided between a pair of protective layers in each of the first layer and the second layer.

11. A display device according to claim 8, wherein a light source is provided outside the second stack of polarizers.

12. A display device according to claim 8, wherein the display element is a liquid crystal element.

13. A display device according to claim 8 wherein the display device is incorporated into one selected from the group consisting of a portable information terminal, a digital video camera, a mobile phone, a television set and a portable computer.

14. A display device according to claim 8, further comprising:
    a third retardation plate between the first retardation plate and the first layer including the first stack of polarizers; and
    a fourth retardation plate between the second retardation plate and the second layer including the second stack of polarizers.

15. A display device according to claim 8, wherein the absolute value of the angle of the deviation of the absorption axes of the polarizers in the first stack of polarizers from those of the polarizers in the second stack of polarizers is more than 0° and equal to or less than 0.1°.

* * * * *